(12) United States Patent
Ohwa et al.

(10) Patent No.: US 9,990,585 B2
(45) Date of Patent: Jun. 5, 2018

(54) INFORMATION PROCESSING APPARATUS, INFORMATION PROCESSING METHOD AND COMPUTER-READABLE STORAGE MEDIUM FOR GENERATING COURSE INFORMATION

(71) Applicant: SONY CORPORATION, Tokyo (JP)

(72) Inventors: Tsunayuki Ohwa, Kanagawa (JP); Atsushi Hashizume, Kanagawa (JP); Hideaki Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 573 days.

(21) Appl. No.: 14/427,715

(22) PCT Filed: Nov. 29, 2013

(86) PCT No.: PCT/JP2013/082266
§ 371 (c)(1),
(2) Date: Mar. 12, 2015

(87) PCT Pub. No.: WO2014/129042
PCT Pub. Date: Aug. 28, 2014

(65) Prior Publication Data
US 2015/0213362 A1    Jul. 30, 2015

(30) Foreign Application Priority Data
Feb. 21, 2013   (JP) .................................. 2013-031947

(51) Int. Cl.
*G06N 5/04* (2006.01)
*G01C 21/34* (2006.01)
(Continued)

(52) U.S. Cl.
CPC ............. *G06N 5/04* (2013.01); *G01C 21/343* (2013.01); *G01C 21/3647* (2013.01);
(Continued)

(58) Field of Classification Search
None
See application file for complete search history.

(56) References Cited

U.S. PATENT DOCUMENTS 8,972,177 B2 *  3/2015  Zheng ................. G06F 17/3087
                                                   340/995.27
2009/0197617 A1  8/2009  Jayanthi
(Continued)

FOREIGN PATENT DOCUMENTS

CN    101221562 A    7/2008
CN    101782908 A    7/2010
(Continued)

OTHER PUBLICATIONS

Combined Chinese Office Action and Search Report dated Sep. 1, 2016 in Patent Application No. 201380009450.0 (with English translation).
(Continued)

*Primary Examiner* — Alan S Chen
(74) *Attorney, Agent, or Firm* — Oblon, McClelland, Maier & Neustadt, L.L.P.

(57) ABSTRACT

Provided is an information processing apparatus including a course setting unit that sets a course containing at least one place associated with positional information, a course information generation unit that generates first course information regarding the course on the basis of first user behavior information generated from a behavior of a first user having visited the course, and a course information provision unit that provides the first course information to a second user different from the first user.

18 Claims, 47 Drawing Sheets

(51) Int. Cl.
*G01C 21/36* (2006.01)
*G06Q 10/10* (2012.01)
*G06Q 50/14* (2012.01)
*G06F 17/30* (2006.01)

(52) U.S. Cl.
CPC .... *G06F 17/3087* (2013.01); *G06F 17/30241* (2013.01); *G06Q 10/101* (2013.01); *G06Q 50/14* (2013.01)

(56) References Cited

U.S. PATENT DOCUMENTS

| | | | |
|---|---|---|---|
| 2009/0216704 A1 | 8/2009 | Zheng et al. | |
| 2010/0030740 A1* | 2/2010 | Higgins | G06F 17/30241 715/762 |
| 2010/0083169 A1* | 4/2010 | Athsani | H04M 1/72522 715/810 |
| 2010/0145608 A1* | 6/2010 | Kurtti | G01C 21/20 701/533 |
| 2010/0312464 A1* | 12/2010 | Fitzgerald | G01C 21/343 701/532 |
| 2011/0046878 A1 | 2/2011 | Sung et al. | |
| 2013/0090851 A1 | 4/2013 | Kurtti et al. | |
| 2013/0091472 A1 | 4/2013 | Terai | |
| 2013/0268886 A1* | 10/2013 | Sureshkumar | G06Q 10/025 715/810 |
| 2014/0038567 A1 | 2/2014 | Jayanthi | |
| 2015/0230060 A1 | 8/2015 | Sung et al. | |
| 2016/0202769 A1 | 7/2016 | Terai | |

FOREIGN PATENT DOCUMENTS

| | | |
|---|---|---|
| JP | 10-260994 A | 9/1998 |
| JP | 2004-242257 A | 8/2004 |
| JP | 2009-187233 A | 8/2009 |
| JP | 2012-26844 A | 2/2012 |
| JP | 2013-15965 A | 1/2013 |
| WO | WO 2011/021899 A2 | 2/2011 |
| WO | WO 2010/011226 A1 | 1/2012 |

OTHER PUBLICATIONS

Extended European Search Report dated Sep. 22, 2016 in Patent Application No. 13875588.9.
International Search Report dated Mar. 4, 2014 in PCT/JP2013/082266 (with English language translation).
Shigeru Nagasawa, "ALPSLAB route" Internet Watch, Apr. 3, 2010, 7 Pages (with English language translation).
Yoji Kanzaki, "Smartphone GPS Katsuyo Book," Nikkei Business Publications, Inc., First Edition, Mar. 19, 2012, pp. 142-149 (with English language translation).
Takahiro Shibata, Mokutekibetsu Chizu Site Katsuyoho, PC Japan, Softbank Creative Corp., vol. 13, No. 6, Jun. 1, 2008 pp. 84-91 (with English language translation).
Nikkei Personal Computing, Nikkei Business Publications, Inc., No. 653, Jul. 9, 2012, 6 Pages (with English language translation).
"We walk along pleasant walk courses centering around Kanagawa and Tokyo Website for introducing walking courses" 1.2 oh! Walking Team Sanpotai, Jul. 22, 2010, 4 Pages (with English language translation).
Japanese Office Action dated Aug. 1, 2017 in Patent Application No. 2014-531006 (with English Translation).

* cited by examiner

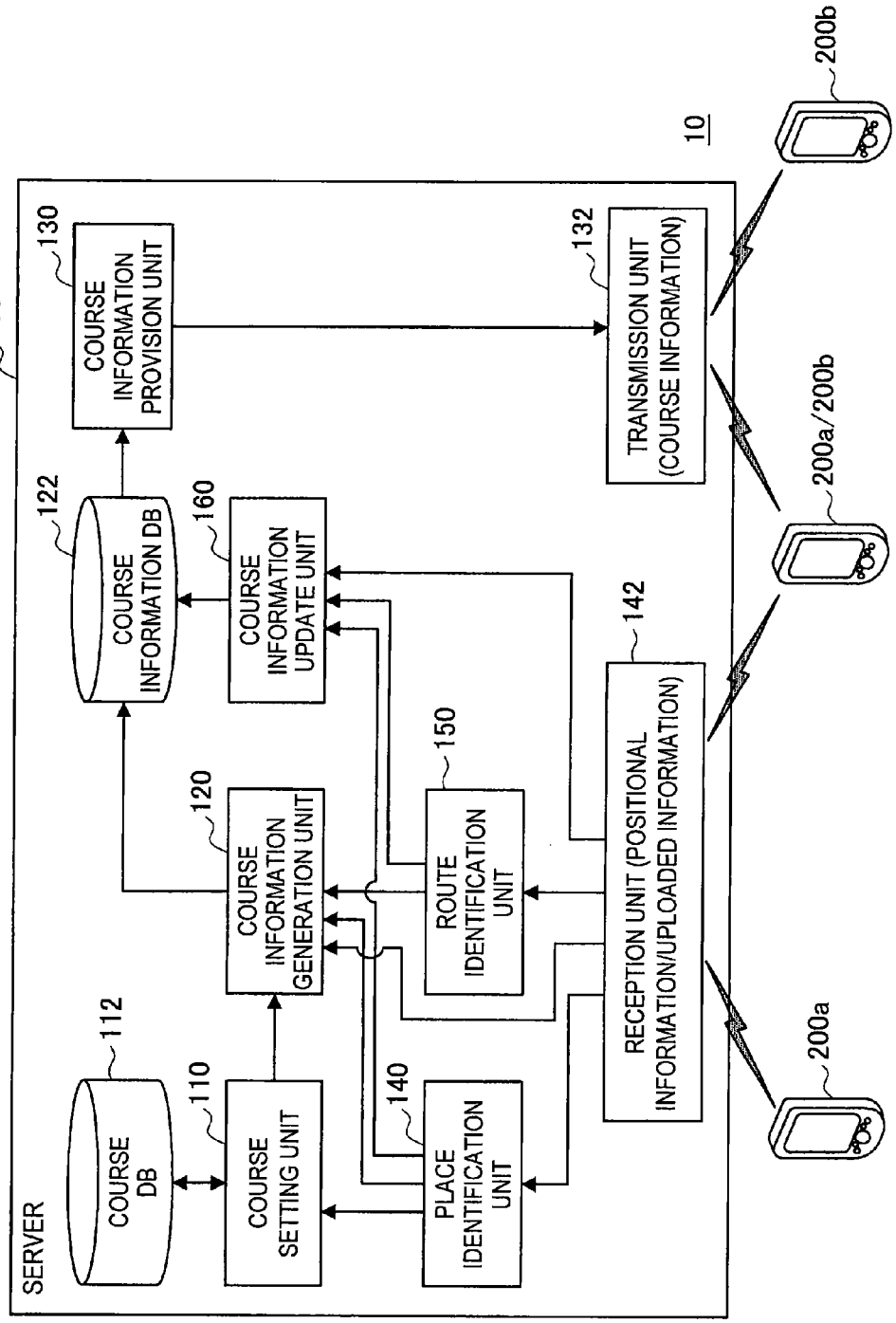

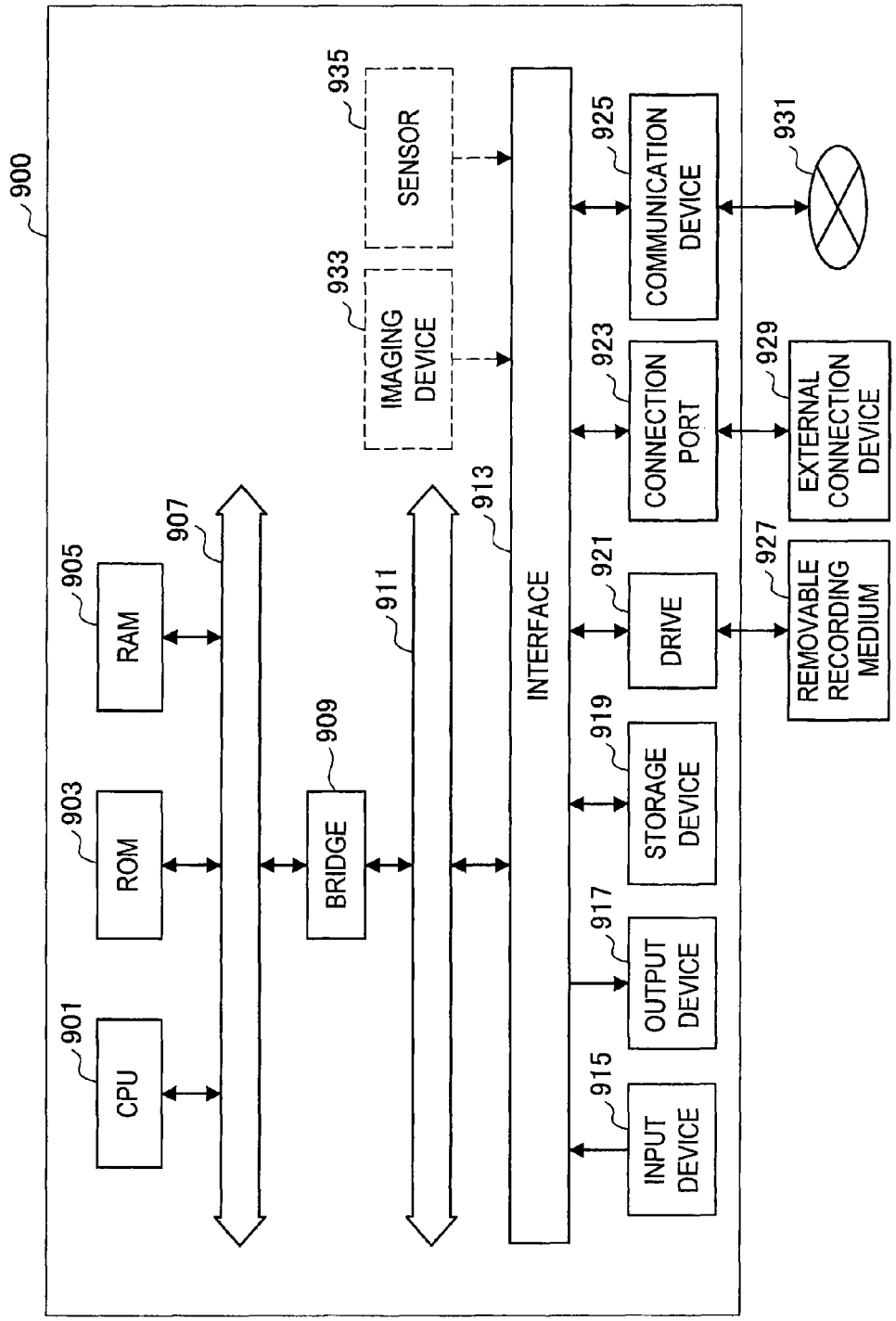

INFORMATION PROCESSING APPARATUS, INFORMATION PROCESSING METHOD AND COMPUTER-READABLE STORAGE MEDIUM FOR GENERATING COURSE INFORMATION

TECHNICAL FIELD

The present disclosure related to an information processing apparatus, and an information processing method, and a program.

BACKGROUND ART

In recent years, there has been developed a technology utilized in order that various pieces of information generated from a user's behavior, for example, sensing results including photographs taken by a user, comments input by a user and acceleration of a user, are uploaded to a server in association with user positional information to generate information for the user to think back on a behavior of himself/herself or share an experience with another user. Examples of such a technology are described in Patent Literature 1 and the like.

CITATION LIST

Patent Literature

Patent Literature 1: JP 2009-187233A

SUMMARY OF INVENTION

Technical Problem

However, the technology described in Patent Literature 1 still has had a room for improvement in ease of search or browse since shared information or a way of putting together the information varies depending on the user in the case of sharing the experience with another user.

Therefore, the present disclosure proposes a novel and improved information processing apparatus capable of allowing the various pieces of information generated from a user's behavior to be effectively utilized in association with positional information, an information processing method, and a program.

Solution to Problem

According to the present disclosure, there is provided an information processing apparatus including a course setting unit that sets a course containing at least one place associated with positional information, a course information generation unit that generates first course information regarding the course on the basis of first user behavior information generated from a behavior of a first user having visited the course, and a course information provision unit that provides the first course information to a second user different from the first user.

According to the present disclosure, there is provided an information processing method including setting a course containing at least one place associated with positional information, generating first course information regarding the course on the basis of first user behavior information generated from a behavior of a first user having visited the course, and providing the first course information to a second user different from the first user.

According to the present disclosure, there is provided a program causing a computer to execute a function of setting a course containing at least one place associated with positional information, a function of generating first course information regarding the course on the basis of first user behavior information generated from a behavior of a first user having visited the course, and a function of providing the first course information to a second user different from the first user.

The course is set which contains the place associated with the positional information, and using the course as a unit, the information generated from the behavior of the first user is provided as the course information to the second user, which facilitates referring the information generated from the behavior of the first user in determining the behavior of the second user himself/herself, resulting in that the information generated from the behavior of the first user can be more effectively utilized.

Advantageous Effects of Invention

As described above, according to the present disclosure, the various pieces of information generated from a user's behavior can be effectively utilized in association with the positional information.

BRIEF DESCRIPTION OF DRAWINGS

FIG. 48 is a block diagram schematically illustrating a functional configuration according to some embodiments of the present disclosure.

FIG. 49 is a block diagram for explaining a hardware configuration of an information processing apparatus.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Figure 1:
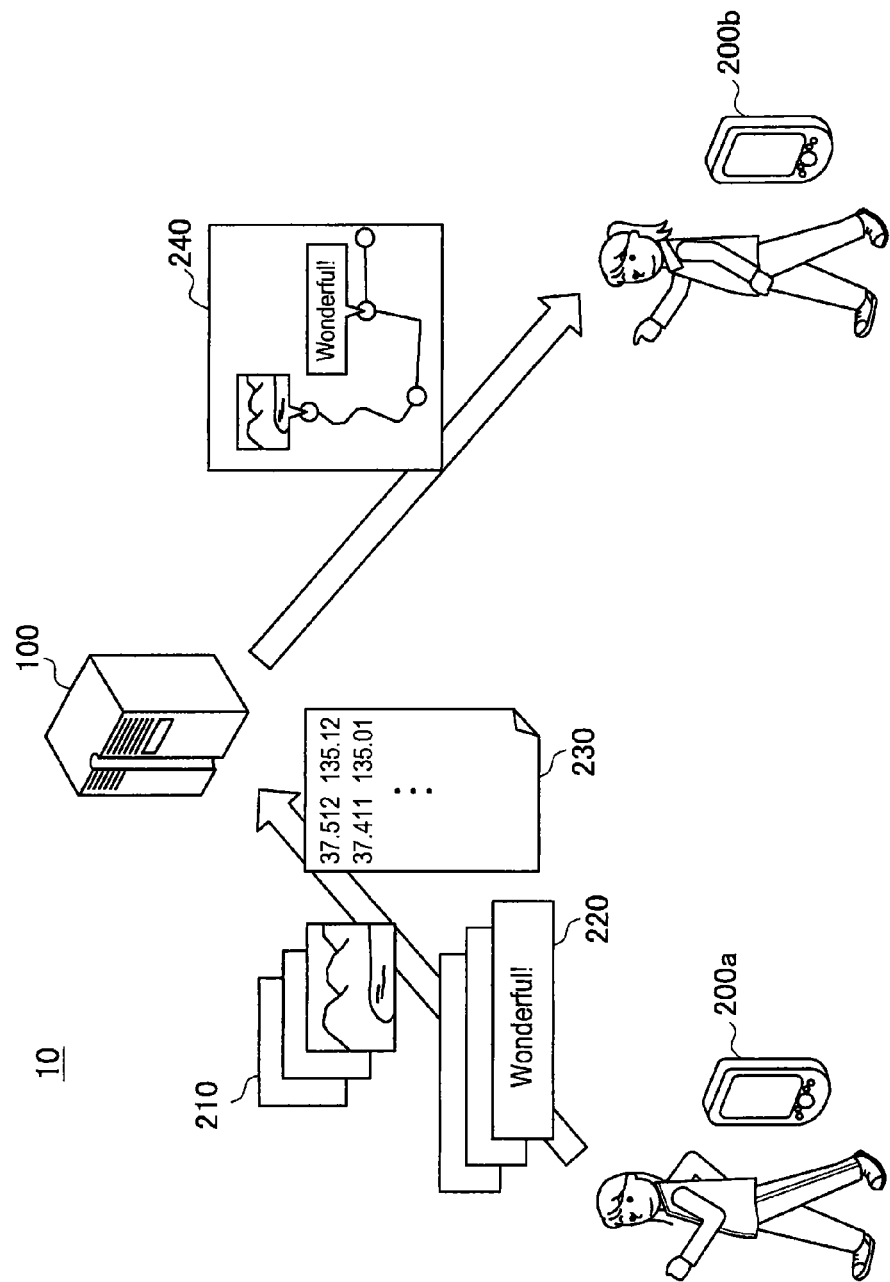
FIG. 1 is a diagram for explaining an outline according to some embodiments of the present disclosure.

A description is given in the following order.
1. Outline
2. Exemplary display screen
2-1. First embodiment
2-2. Second embodiment
2-3. Third embodiment
3. Usable technology
3-1. Journey division
3-2. Positional noise removal
4. Functional configuration
5. Hardware configuration
6. Supplemental Remarks 1. Outline FIG. 1 is a diagram for explaining an outline of some embodiments of the present disclosure described below. With reference to FIG. 1, some embodiments of the present disclosure relate to a system 10 including a server 100 and a terminal device 200. The server 100 is implemented by one or more server devices and capable of communicating with each of terminal devices 200a and 200b carried by each of a plurality of users.

The terminal device 200a is a smartphone or a tablet terminal, for example, and is carried by a user A. The user A goes outside (goes on a trip) cal lying the terminal device 200a, and takes a photograph 210 or inputs a comment 220 on the way thereof. The photograph 210 and the comment 220 are provided together with a positional information history 230 of the user A from the terminal device 200a to the server 100.

The server 100 generates course information 240 on the basis of information provided from the terminal device 200a and provides this to the terminal device 200b carried by a user B. The course information 240 may be is, as shown in the figure, for example, information for displaying on a map the photograph 210 and comment 220 provided by the user A from the terminal device 200a together with a course the user A has gone through.

At this time, the server 100 identifies places the user A has visited, for example, on the basis of the positional information history 230 of the user A and sets a course including those places. Further, the server 100 generates the course information 240 by use of information generated from a behavior of the user A in the course, the photograph 210, the comment 220 and the like, for example.

The user B refers the course information 240 by use of the terminal device 200b to be able to obtain information as a guide useful in taking a walk or going on a trip to the course similar to that of the user A. The terminal device 200b used by the user B may be a portable terminal device such as a smartphone or a tablet terminal like the terminal device 200a. In this case, the user B carrying the terminal device 200b can go on a trip while navigated in real time on the basis of the course information 240. Alternatively, the terminal device 200b may be a non-portable terminal device such as a stationary PC (Personal Computer), game console, or TV set. In such a case also, the user B can browse the course information 240 using the terminal device 200b to plan his/her trip or enjoy simply, for example.

Moreover, in some embodiments, roles of the terminal device 200a and the terminal device 200b are compatible with each other. In other words, there may be a terminal device functioning as the terminal device 200a and terminal device 200b. For example, it may be such that when the user B goes on a trip carrying the terminal device 200b while navigated in real time on the basis of the course information 240, the photograph 210 and the comment 220 taken and input by the user B are provided together with the positional information history 230 of the user B from the terminal device 200b to the server 100, and other course information 240 is generated on the basis of the information or the original course information 240 is updated.

According to a configuration as above, for example, many variations of the course information 240 slightly different from each other are generated, which increases a possibility that the user referring the course information 240 can find information meeting his/her preference (e.g., matter of interest, food preference or the like) and a condition (e.g., restriction on means of transportation such as presence or absence of a car, or the like). In a case where the course information 240 is updated on the basis of information provided by a user having visited the course, a new spot is added to the course, or information on the spot or the transportation means therebetween is maintained to be up-to-date, for example, which allows more accurate and enriched information to be provided to a user who is going to visit there.

A description below is given of some of such embodiments with reference to exemplary screens displayed in the terminal device 200. An exemplary technology or device functional configuration used for explaining these display screens will be described later.

2. Exemplary Display Screen 2-1. First Embodiment

A description of a first embodiment of the present disclosure describes an exemplary display screen on a terminal device carried by a user such as a smartphone or a tablet terminal, for example. The following description refers to a display screen diagram for the smartphone, but applications according to the embodiments may be provided for not only the smartphone, but also various portable terminal devices such as a tablet terminal, portable game console, notebook PC, or the like.

Figure 2:
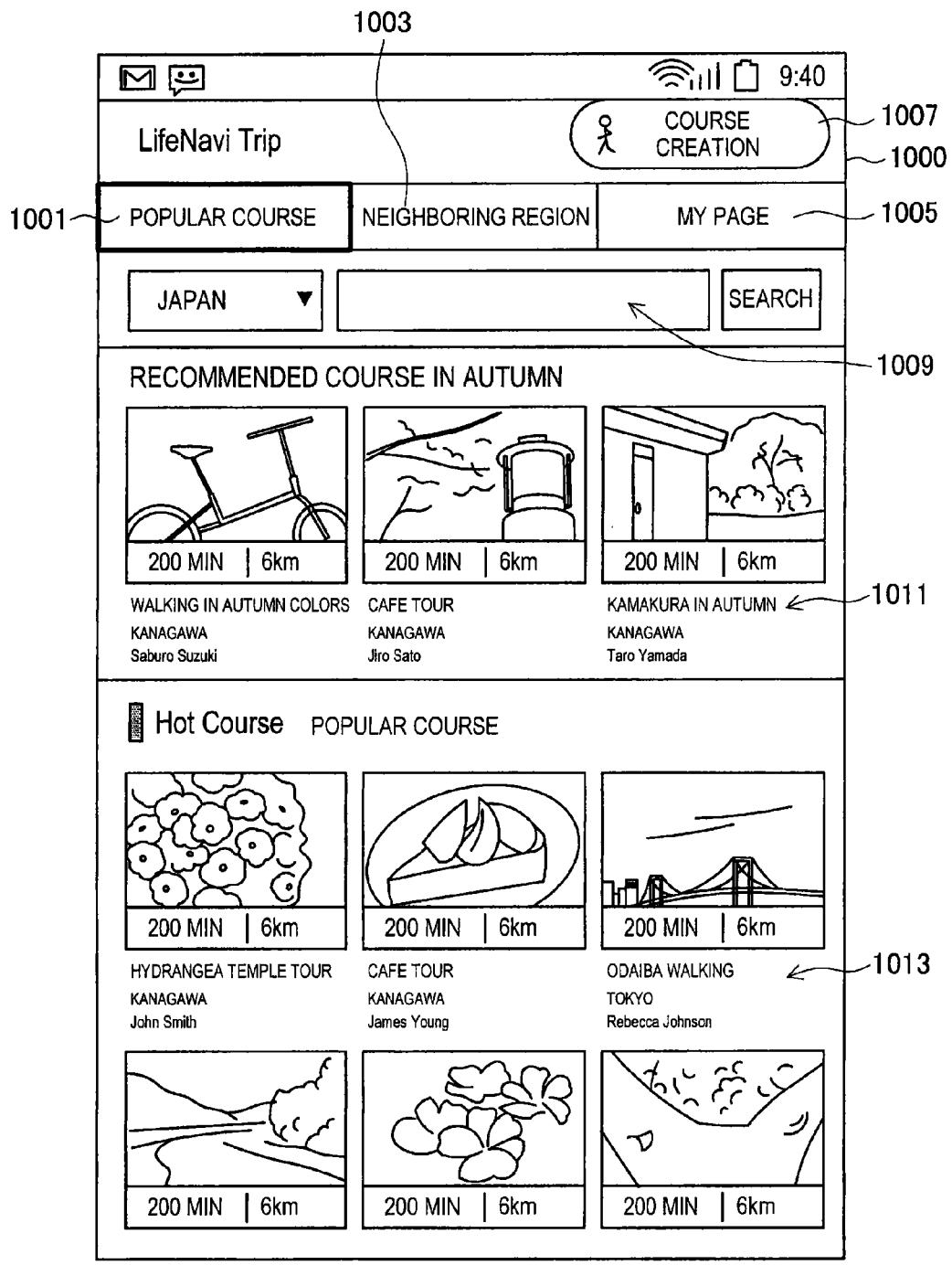
FIG. 2 is a diagram illustrating a first example of a display screen according to a first embodiment of the present disclosure.

FIG. 2 is a diagram illustrating a first example of the display screen according to the first embodiment of the present disclosure. With reference to FIG. 2, a screen 1000 includes as a tab a tab "popular course" 1001, a tab "neighboring region" 1003, and a tab "my page" 1005. A button "course creation" 1007 is also displayed above the tabs. In the example shown, the tab "popular course" 1001 is selected, and the screen has a search display 1009, recommended course information 1011, and popular course information 1013 further displayed thereon. The search display 1009 is a display for selecting a region and inputting a keyword to search the course information meeting the condition. The recommended course information 1011 may be information on a recommended course selected by a service administrator depending on a season or the like, for example. The popular course information 1013 may be information on a popular course extracted on the basis of a history of browsing by the user or actually explored course, for example. The course information may be displayed together with an image representing the course accompanied by a time required, course distance, title, region, and course creator information as shown in the figure, for example.

Figure 3:
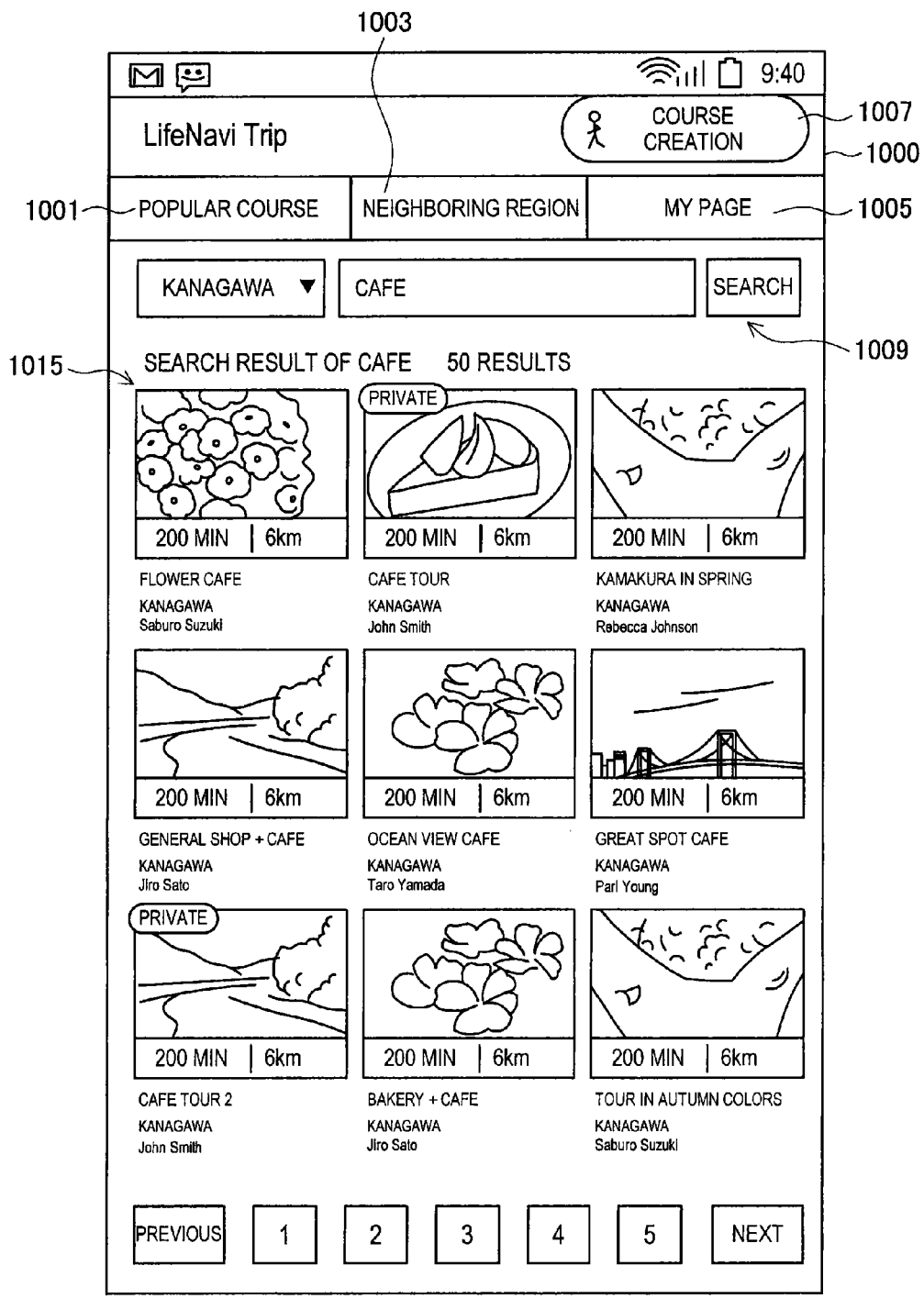
FIG. 3 is a diagram illustrating a second example of a display screen according to the first embodiment of the present disclosure.

FIG. 3 is a diagram illustrating a second example of the display screen according to the first embodiment of the present disclosure. FIG. 3 shows a screen displayed in a case where the search is performed using the search display 1009 in the screen 1000 shown in FIG. 2. In this case, a search result 1015 is displayed on the screen 1000. In the example shown, a region "Kanagawa" and a keyword "cafe" are set as search criteria. Therefore, displayed on the search result 1015 are the course information on the "Kanagawa" region and relating to the "cafe". Here, for example, the search may be performed for an item containing the keyword in the title of the course information or for an item containing the keyword in content of the course information. The example shown, which is the latter, includes the item not containing the "cafe" in the title of the course information.

Figure 4:
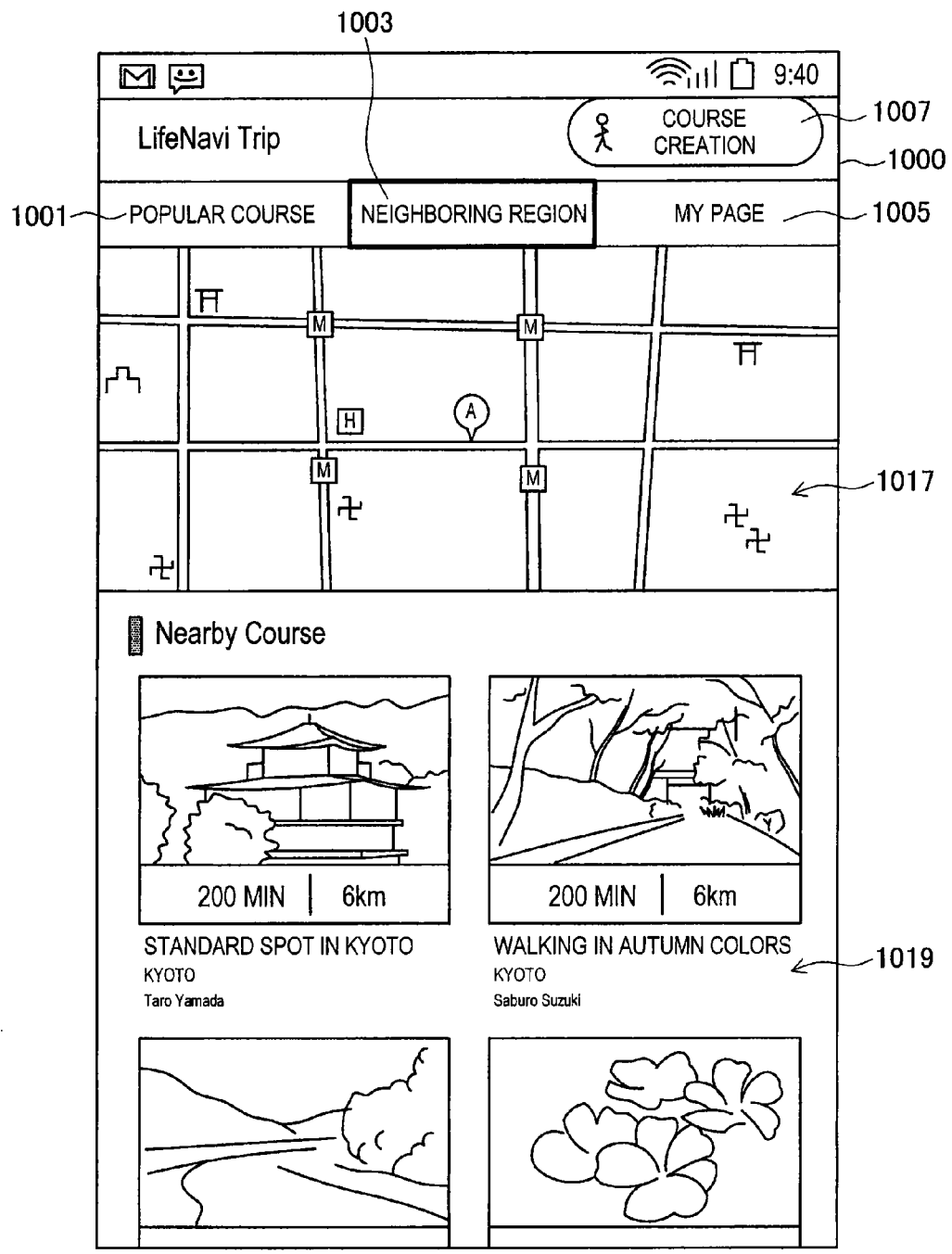
FIG. 4 is a diagram illustrating a third example of a display screen according to the first embodiment of the present disclosure.

FIG. 4 is a diagram illustrating a third example of the display screen according to the first embodiment of the present disclosure. FIG. 4 shows a screen displayed in a case where the tab "neighboring region" 1003 is selected in the screen 1000s shown in FIG. 2 and FIG. 3. In this case, a neighboring map display 1017 and neighboring course information 1019 are displayed on the screen 1000. In the example shown, the user uses an application in a state of being in Kyoto, and the neighboring map display 1017 displays a neighboring map of a user location in Kyoto. The neighboring course information 1019 displays the course information on a region "Kyoto" including the neighboring region of the user location.

Figure 5:
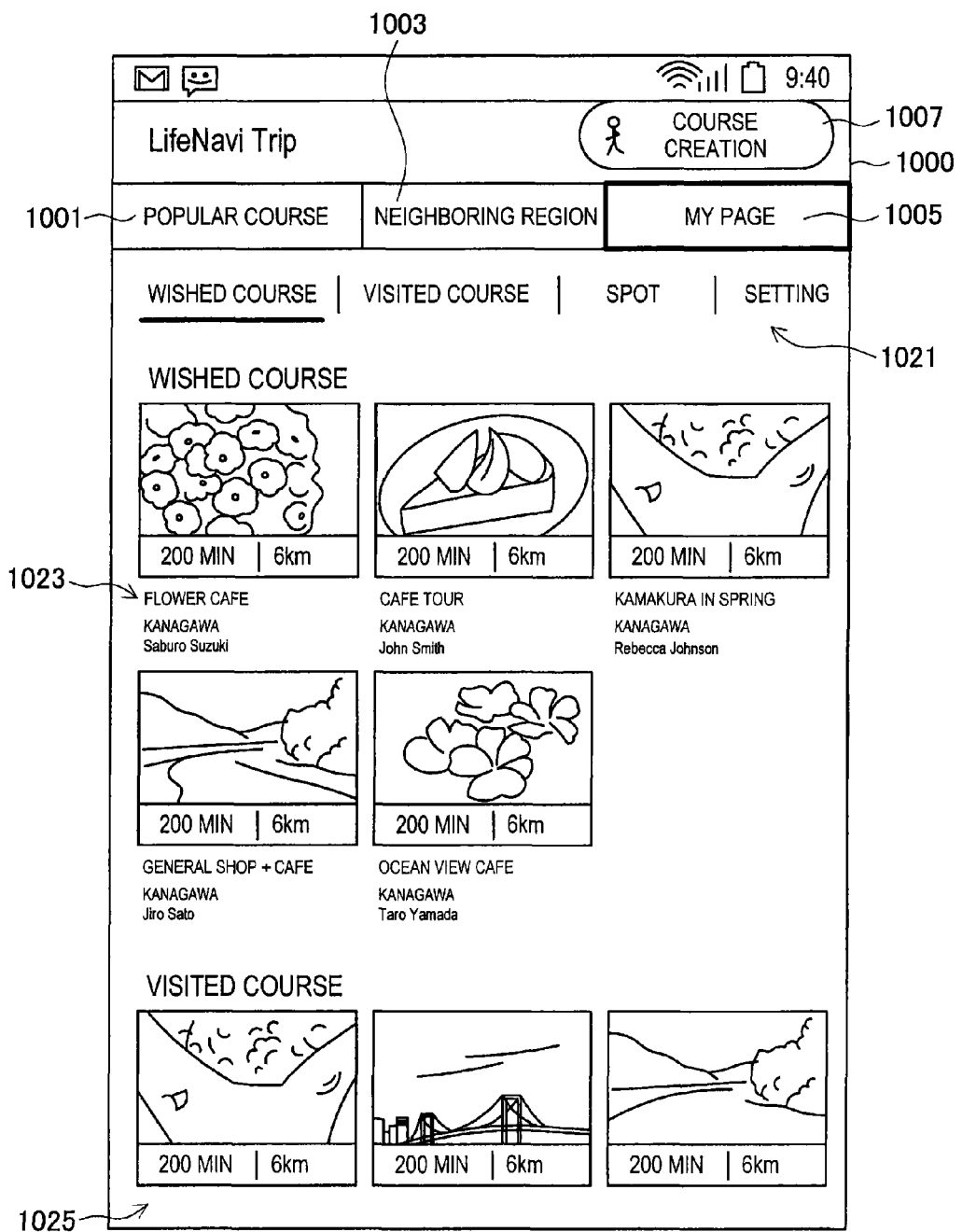
FIG. 5 is a diagram illustrating a fourth example of a display screen according to the first embodiment of the present disclosure.

FIG. 5 is a diagram illustrating a fourth example of the display screen according to the first embodiment of the present disclosure. FIG. 5 shows a screen displayed in a case where the tab "my page" 1005 is selected in the screens 1000 shown in FIG. 2 to FIG. 4. In this case, a sub-tab 1021, information "wished course" 1023 and information "visited course" 1025 are displayed on the screen 1000. The sub-tab 1021 includes, for example, a tab "wished course", a tab "visited course", a tab "spot", and a tab "setting". The tab "wished course" and the tab "visited course" may be used for in-screen transition to the information "wished course" 1023 and the information "visited course" 1025. The tab "spot" may be a tab for transiting to a screen displaying a spot the user wises to go or has visited for the spot contained in the course. The information "wished course" 1023 is information on the course the user registered as a wished course of the courses registered in the service. The information "visited course" 1025 is information on the course the user already has visited of the courses registered in the service.

Figure 6:
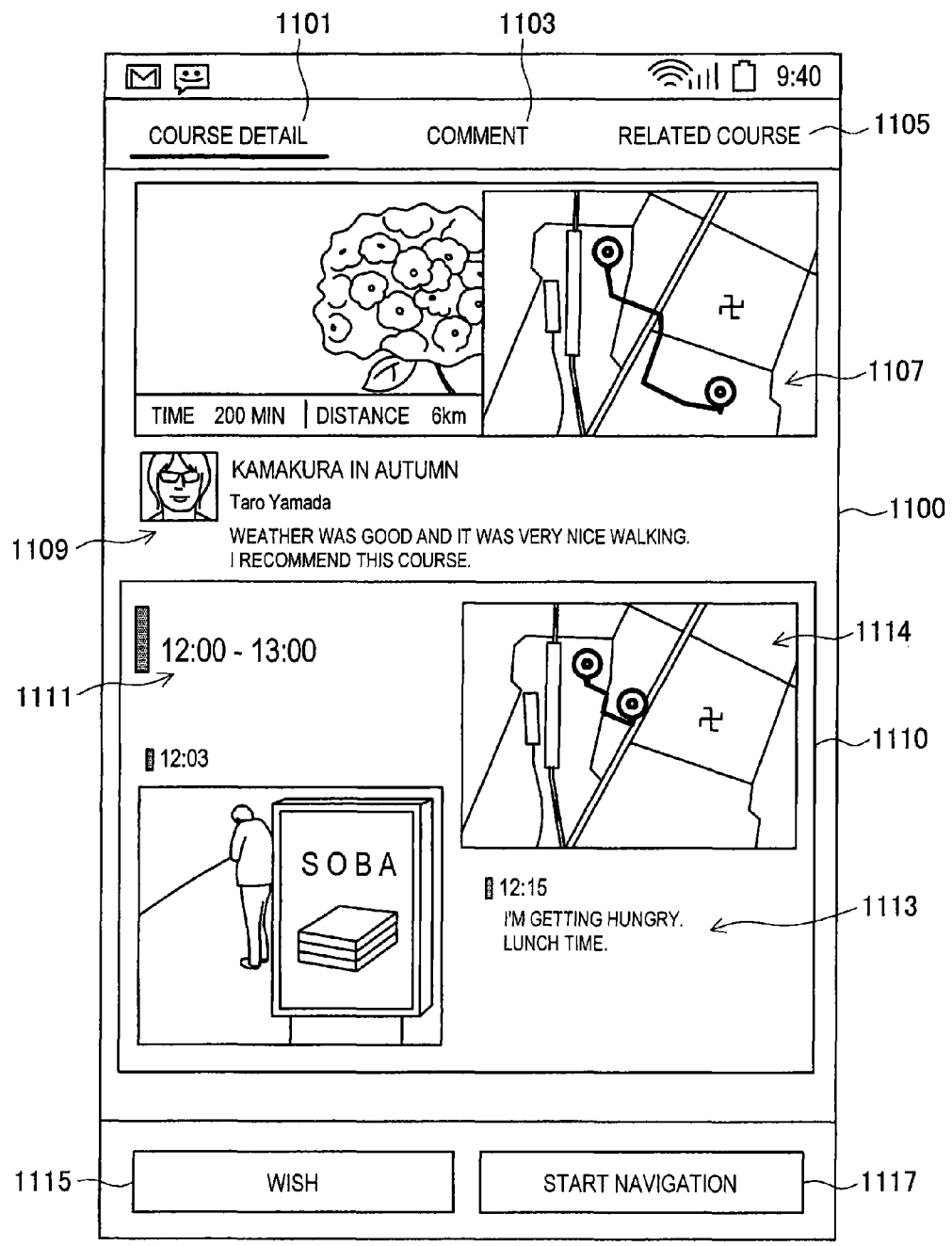
FIG. 6 is a diagram illustrating a fifth example of a display screen according to the first embodiment of the present disclosure.

FIG. 6 is a diagram illustrating a fifth example of the display screen according to the first embodiment of the present disclosure. FIG. 6 shows a course information screen 1100 displayed in a case where any course information is selected in the screens 1000 shown in FIG. 2 to FIG. 5. The course information screen 1100 includes as a tab a course detail tab 1101, a comment tab 1103, and a tab "related course" 1105. In the example shown, the course detail tab 1101 is selected, and further displayed on the course information screen 1100 are a course map 1107, a course title display 1109, and a travel report 1110. The course map 1107 displays a route actually gone through by the user who has registered the relevant course or who has visited the relevant course (possibly a user himself/herself who is using the application in some cases). The course title display 1109 may display, for example, the title, region, and course creator information which are displayed as the course information in the screen 1000 and may display the title, course creator information, and creator comment, as the example shown.

The travel report 1110 includes the photograph or comment uploaded or input by the user. The travel report 1110 may display an event 1113 for each journey section 1111, for example. The journey section 1111 is set by way of dividing all journeys gone through by the user according to a predetermined rule. In the example shown, one journey section 1111 is set for 12:00 to 13:00. For each journey section 1111, the title (12:00 to 13:00) is displayed and a sub-map 1114 showing the journey section thereof is displayed.

Here, if the course displayed on the course information screen 1100 is a course another user has visited (the user who is using the application here has not still visited), a wish button 1115 is displayed. If the "wish" button 1115 is selected, this course is set as a wished course of the user and is displayed as the information "wished course" 1023 in the screen 1000 shown in FIG. 5, for example. In a case where a present location of the user is contained in the displayed course and this course can be followed soon, a start navigation button 1117 is brought into a selectable state. If the start navigation button 1117 is selected, a navigation going through the course is started as described later.

Figure 7:
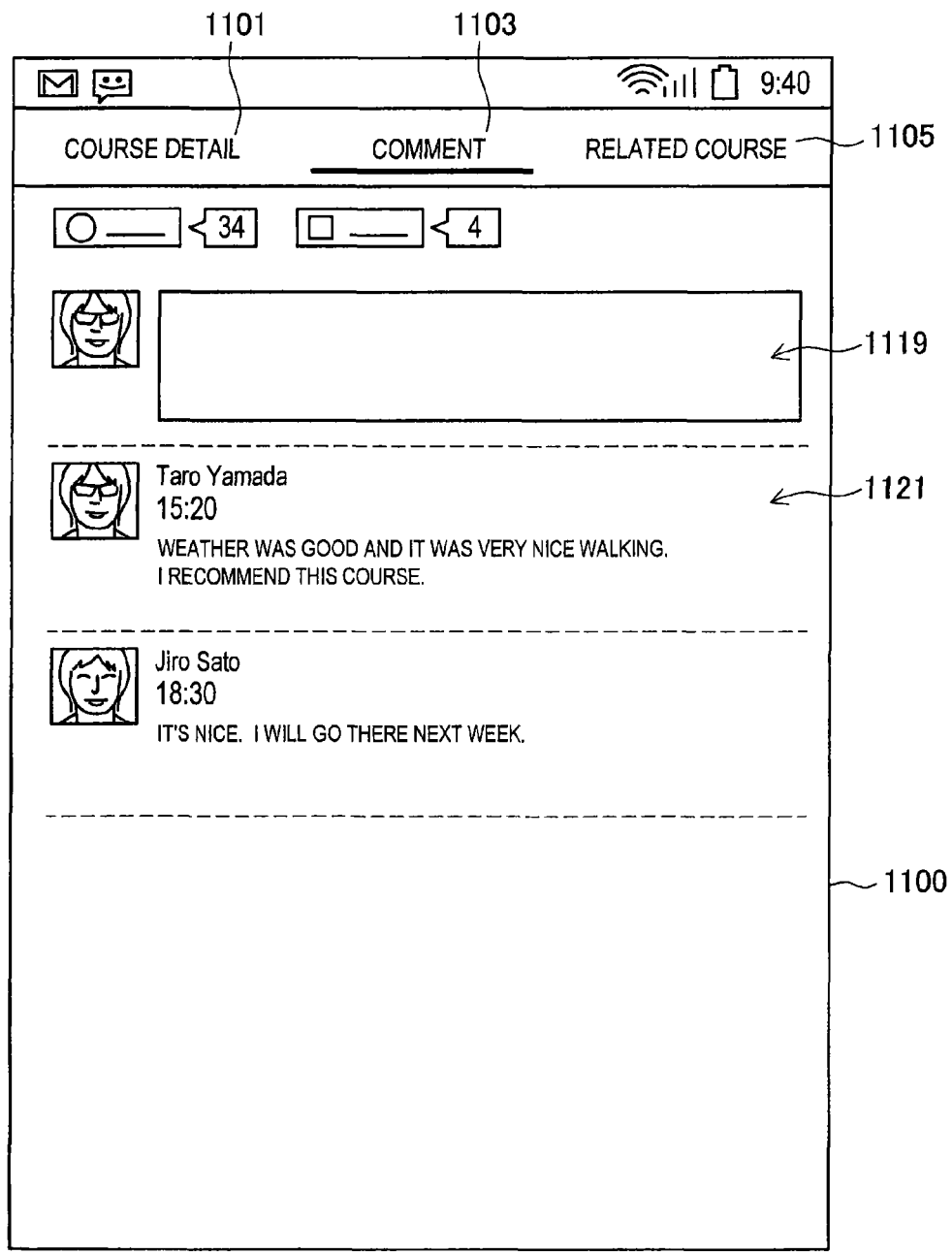
FIG. 7 is a diagram illustrating a sixth example of a display screen according to the first embodiment of the present disclosure.

FIG. 7 is a diagram illustrating a sixth example of the display screen according to the first embodiment of the present disclosure. FIG. 7 shows a screen displayed in a case where the comment tab 1103 is selected in the course information screen 1100 shown in FIG. 6. In this case, a comment input field 1119 and a comment display 1121 are displayed on the course information screen 1100. The comment input field 1119 is a display for inputting a comment including impression by a user having visited the course or by another user browsing the travel report 1110 or the like. The comment input by use of the comment input field 1119 is displayed as the comment display 1121. As shown in the figure, the comment input field 1119 may include a link to social media.

Figure 8:
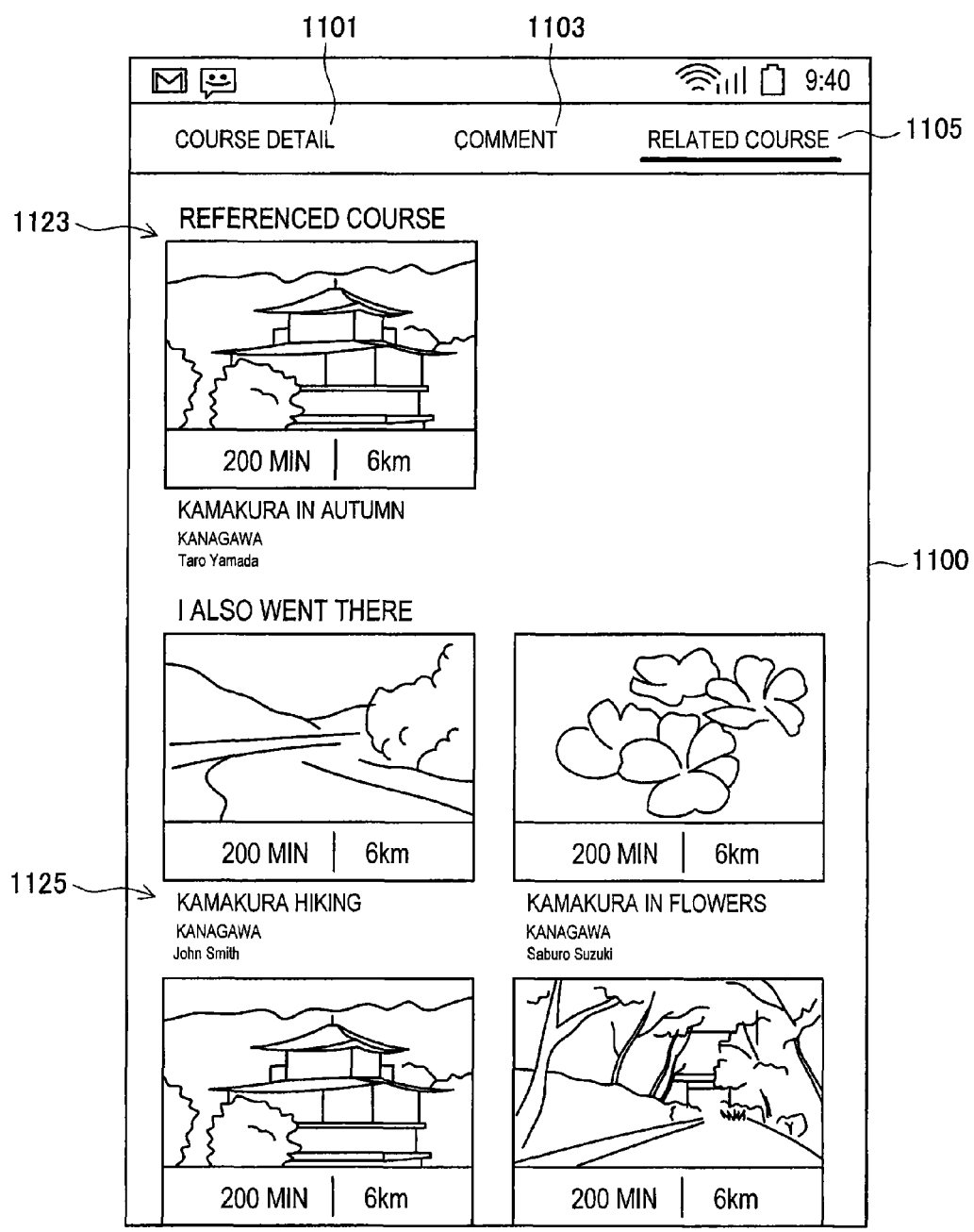
FIG. 8 is a diagram illustrating a seventh example of a display screen according to the first embodiment of the present disclosure.

FIG. 8 is a diagram illustrating a seventh example of the display screen according to the first embodiment of the present disclosure. FIG. 8 shows a screen displayed in a case where the tab "related course" 1105 is selected in the course information screen 1100 shown in FIG. 6 or FIG. 7. In this case, referenced course information 1123 and reference-based course information 1125 are displayed on the course information screen 1100. The referenced course information 1123 is information on a course referenced by the user when visiting a target course of the course information screen 1100 (course displayed in detail in FIG. 6). On the other hand, the reference-based course information 1125 is information on a course visited by another user with referring to the target course.

Figure 9:
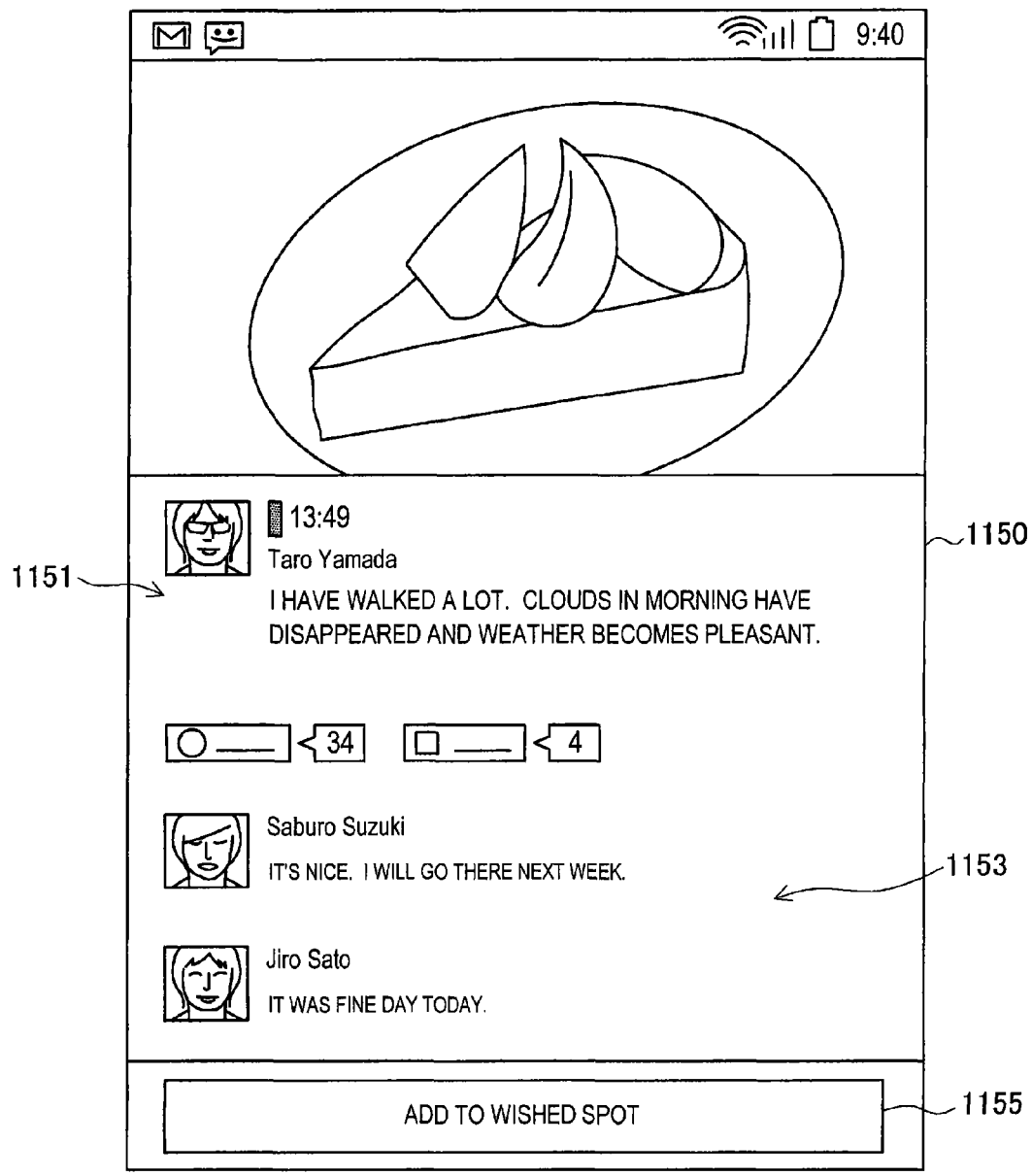
FIG. 9 is a diagram illustrating an eighth example of a display screen according to the first embodiment of the present disclosure.

FIG. 9 is a diagram illustrating an eighth example of the display screen according to the first embodiment of the present disclosure. FIG. 9 shows a spot information screen 1150 displayed in a case where the information on the spot displayed as the event 1113 in the travel report 1110 is selected in the course information screen 1100 shown in FIG. 6. A poster comment display 1151, a comment display 1153, and a button "spot registration" 1155 are displayed on the spot information screen 1150. The poster comment display 1151 displays a time when the user posted this spot information, poster name, poster comment and the like. The comment display 1153 displays a comment including impression by the poster of the spot information or another user browsing the post. As shown in the figure, the comment display 1153 may include a link to social media. If the button "spot registration" 1155 is selected, this spot is set as a wished spot of the user and is displayed as the wished spot in the screen 1000 shown in FIG. 5, for example.

Figure 10:
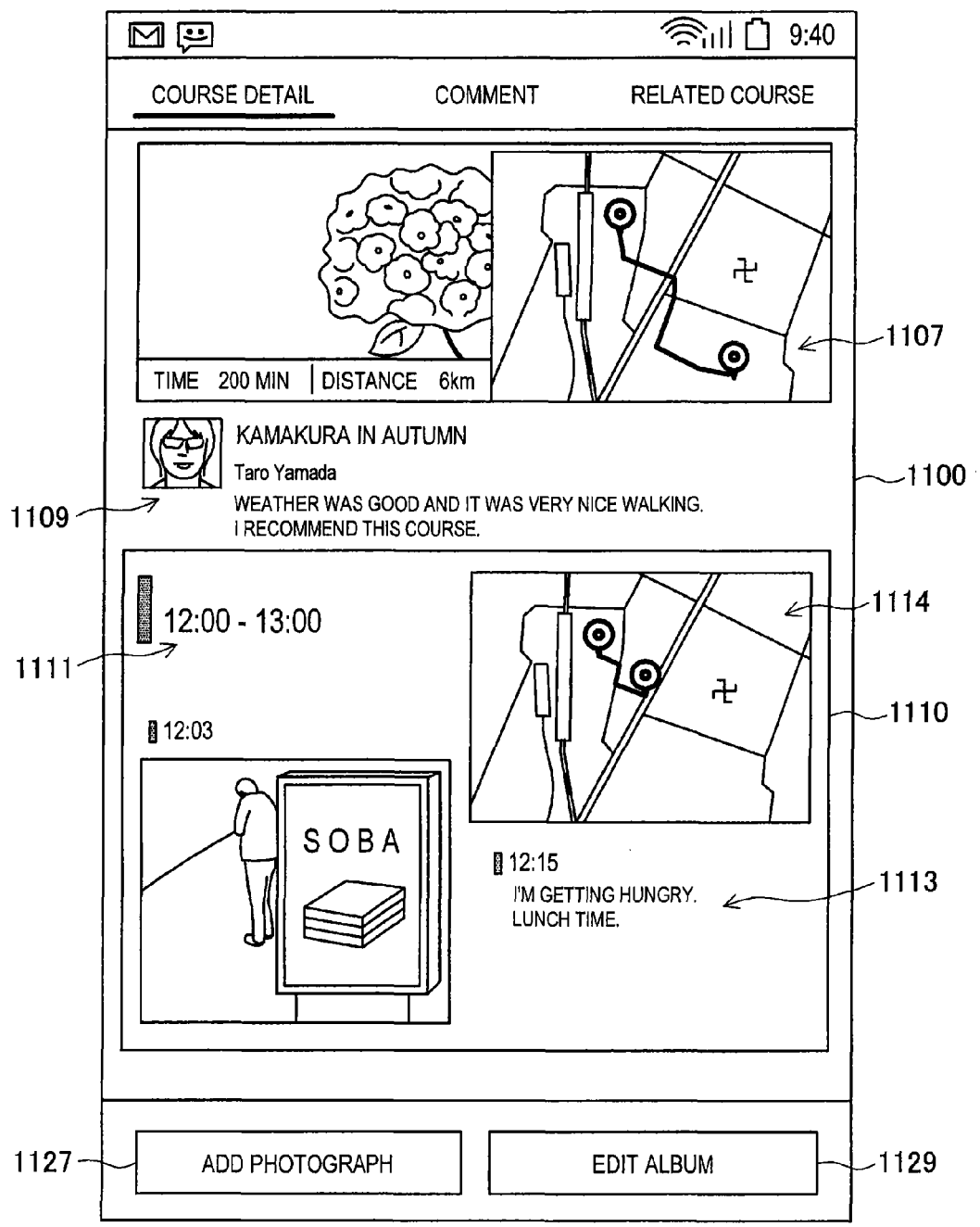
FIG. 10 is a diagram illustrating a ninth example of a display screen according to the first embodiment of the present disclosure.

FIG. 10 is a diagram illustrating a ninth example of the display screen according to the first embodiment of the present disclosure. FIG. 10 shows another example of the course information screen 1100 shown in FIG. 6. The example shown illustrates a case where the course displayed on the course information screen 1100 is a course already visited by the user who is using the application here. In this case, a button "photograph addition" 1127 and a button "album edit" 1129 are displayed on the course information screen 1100. The user can edit the course information on the course the user himself/herself has already visited (generated on the basis of behavior information of the user himself/herself) by, for example, selecting the button "photograph addition" 1127 or the button "album edit" 1129.

Figure 11:
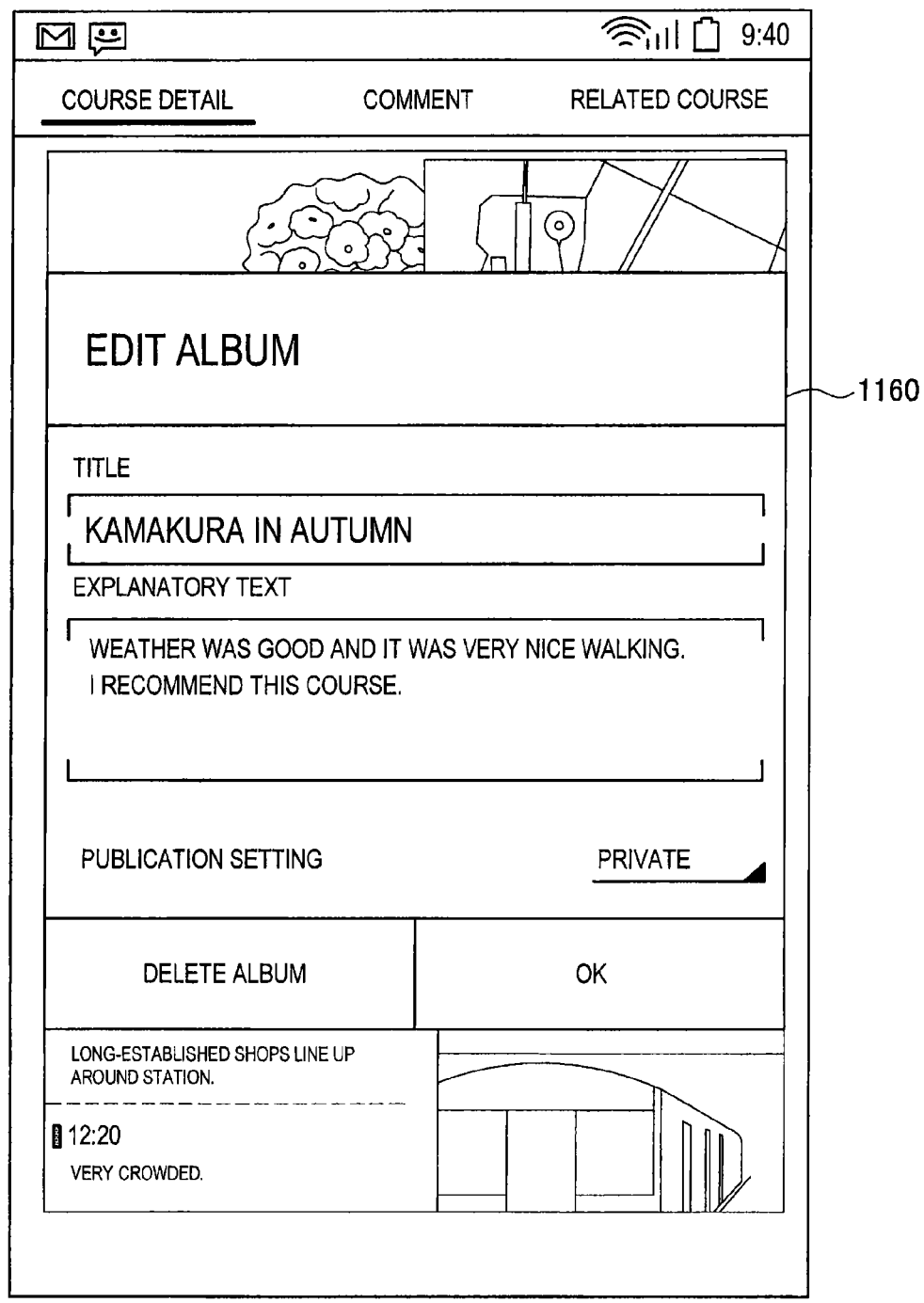
FIG. 11 is a diagram illustrating a tenth example of a display screen according to the first embodiment of the present disclosure.

FIG. 11 is a diagram illustrating a tenth example of the display screen according to the first embodiment of the present disclosure. FIG. 11 shows an album edit screen 1160 displayed in a case where the button "album edit" 1129 is selected in the course information screen 1100 shown in FIG. 10. In the album edit screen 1160, a title or explanatory text of an album can be edited or a publication setting can be changed. The title or explanatory text set here may be displayed as the course title display 1109 in the course information screen 1100 shown in FIG. 6, for example. If the publication setting is changed, a range of the users who can browse the course information screen 1100 is changed. Depending on this setting, for example, the course information in the screens 1000 shown in FIG. 2 to FIG. 5 may be not displayed for the user whom the course information is set to be not published and the course information is displayed together with an icon "private". If the album is deleted at the album edit screen 1160, the course information is deleted. In this case, the course information is not displayed in the screens 1000 shown in FIG. 2 to FIG. 5 and the course information screen as shown in FIG. 6 cannot be browsed.

Figure 12:
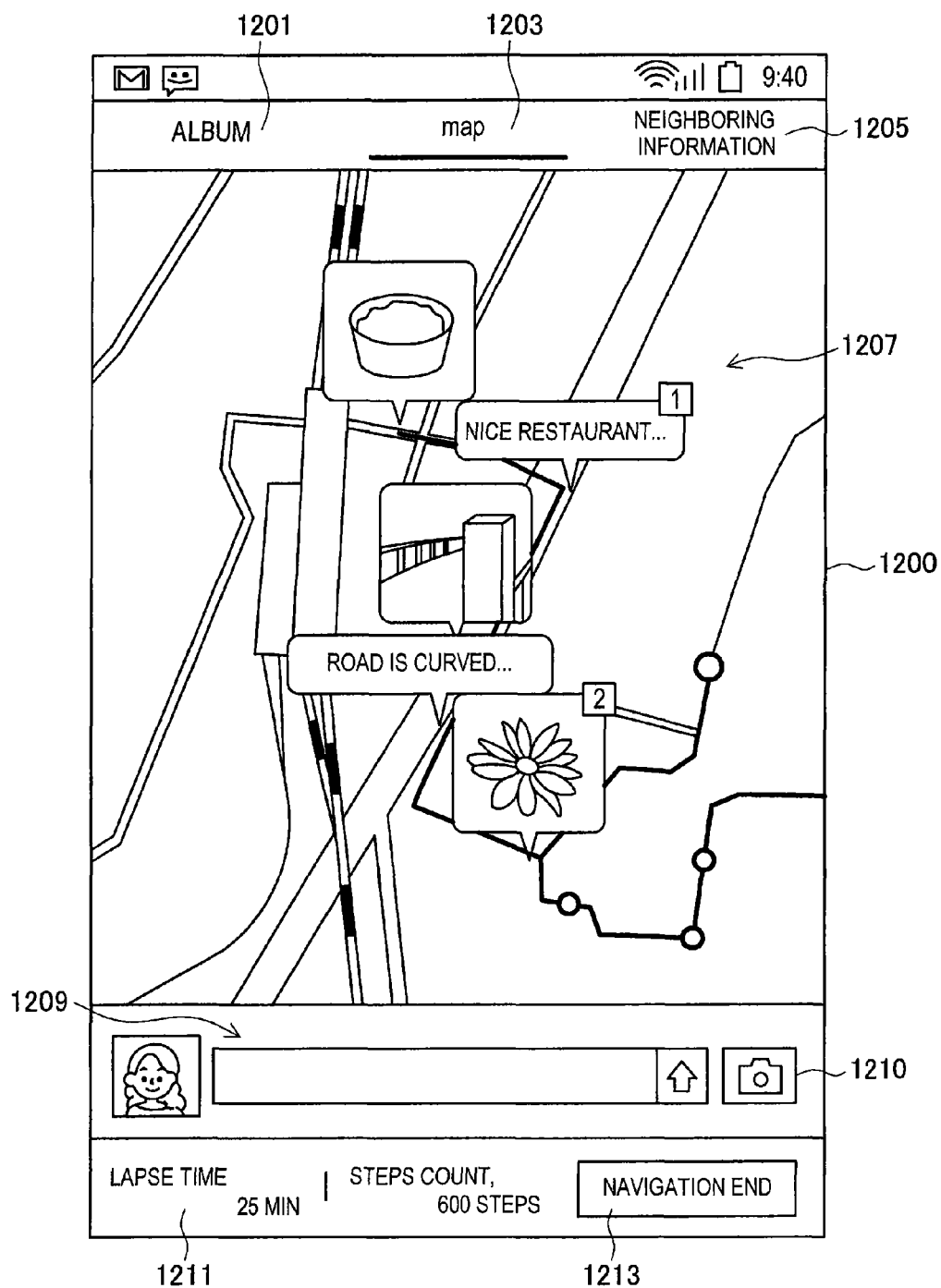
FIG. 12 is a diagram illustrating an eleventh example of a display screen according to the first embodiment of the present disclosure.

FIG. 12 is a diagram illustrating an eleventh example of the display screen according to the first embodiment of the present disclosure. FIG. 12 shows a navigation screen 1200 displayed in a case where the button "course creation" 1007 is selected in the screens 1000 shown in FIGS. 2 to 4 and in a case where the start navigation button 1117 is selected in the course information screen 1100 shown in FIG. 6. The navigation screen 1200 includes as a tab a tab "album" 1201, a tab "map" 1203, a tab "neighboring information" 1205. In the example shown, the tab "map" 1203 is selected and the map 1207, a comment input field 1209, a camera button 1210, a time and distance display 1211, and a navigation end button 1213 are further displayed.

Here, in a case where the button "course creation" 1007 is selected in the screen 1000 and transition to the navigation screen 1200 is made, displayed on the map 1207 are a route the user going through, a spot on the way of the route, and information such as the photograph or comment taken or input at the spot. New course information is generated from the route and spot input in this way. On the other hand, in a case where the start navigation button 1117 is selected in the course information screen 1100 and the transition to the navigation screen 1200 is made, displayed on the map 1207 are a route of the referenced course as well as the route the user going through. The user refers the route of the displayed referenced course to pursue his/her journey. Moreover, in this case, the map 1207 may further display the photograph or comment recorded as the course information on the referenced course in association with the spot.

In the navigation screen 1200, the user can input the comment by use of the comment input field 1209. The input comment may be registered in association with the user positional information at that time and be displayed on the map 1207 as shown in the figure. The user can initiate a camera by use of the camera button 1210 to take a photograph. The taken photograph may be also registered in association with the user positional information at that time and be displayed on the map 1207 as shown in the figure. The time and distance display 1211 displays a time elapsed from the start of the navigation and a moving distance. The distance may be displayed by way of a steps count or the like as the example shown. If the navigation end button 1213 is selected, the navigation is ended, and the course information is generated on the basis of the information on the route the user has gone through and the information such as the photograph or comment taken or input at the spot on the way of the route. Whether or not to register the generated course information may be selected by the user by way of a course registration screen not shown in the figure. In the case of registering the course, the title of the course or the comment is input and a tag or a publication range may be set in the course registration screen.

Figure 13:
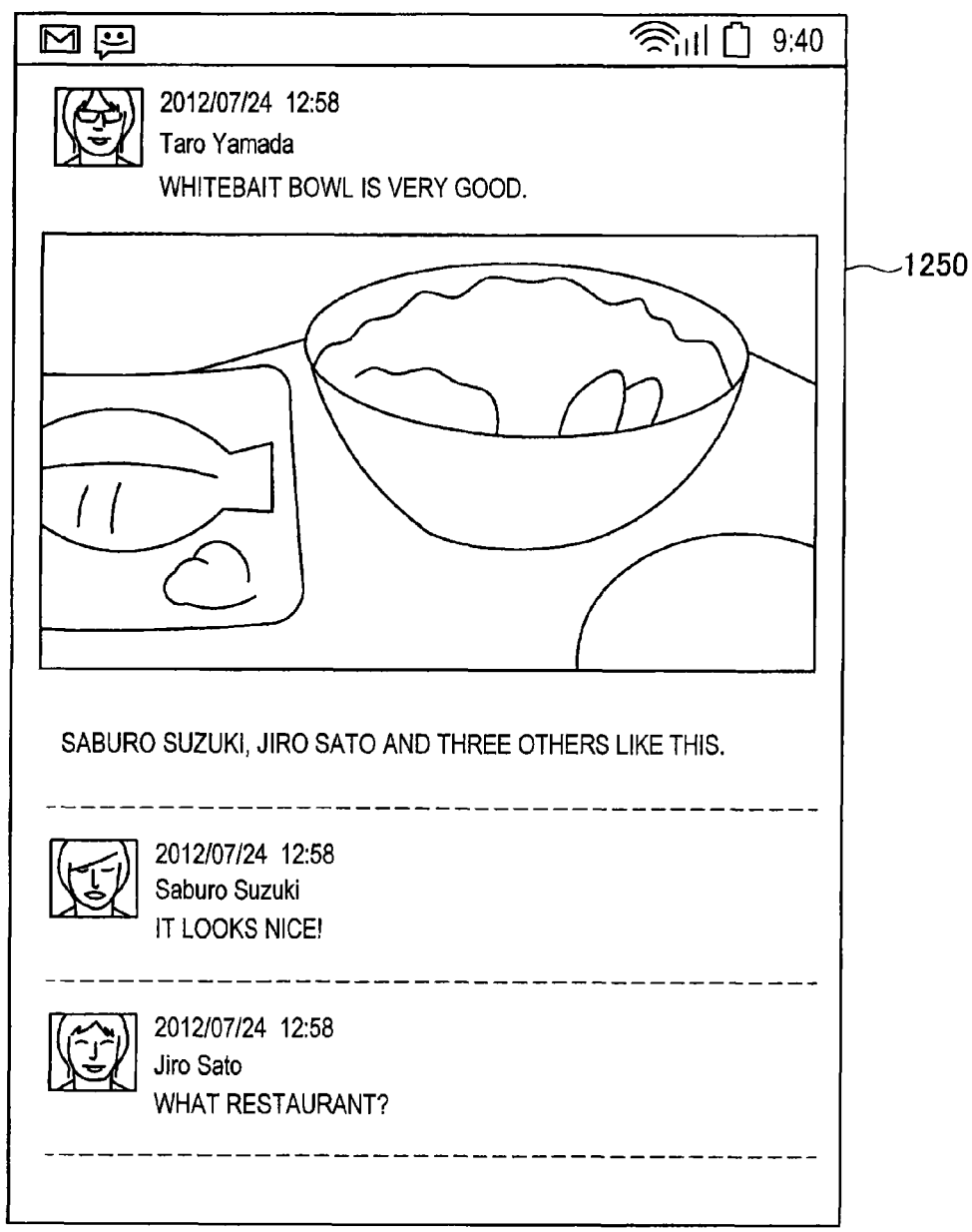
FIG. 13 is a diagram illustrating a twelfth example of a display screen according to the first embodiment of the present disclosure.

FIG. 13 is a diagram illustrating a twelfth example of the display screen according to the first embodiment of the present disclosure. FIG. 13 shows a spot information screen 1250 displayed in a case where the spot displayed on the map 1207 or the photograph or comment associated with the spot is selected in the navigation screen 1200 shown in FIG. 12. Information such as the photograph or comment regis- tered at each spot or the like is displayed on the spot information screen 1250. Another user comment with respect to the registered information may be displayed. In a case where the spot information is of another user, a button "go to this spot" or the like is displayed and the navigation for going to this spot may be able to be started.

According to the first embodiment of the present disclosure described above, the user can obtain the course information registered on the basis of the setting by the service administrator and an exploration result by another user as a model course of his/her behavior. A user's behavior itself of visiting the model course is collected as information for generating another course and information on a new course using the original model course as the referenced course may be generated. Alternatively, the model course itself may be updated due to the user's behavior of visiting the model course. In this way, registration of a wide variety of course information allows that, for example, the user being newly going to a course can select a model course more suitable to his/her taste or situation and use the information registered as the course information on the model course to have more enriched support for the behavior.

2-2. Second Embodiment

A description of the second embodiment of the present disclosure describes an exemplary display screen on a terminal device not necessarily carried by the user such as the stationary PC. The following description refers to a display screen diagram for the PC, but applications according to the embodiments may be provided for the PC, but also various terminal devices such as a tablet terminal, game console, TV set or the like. As described above, the terminal device may not necessarily be portable, but may be portable. In this embodiment, since the terminal is not necessarily portable differently from the first embodiment, the application mainly provides a function for browsing the course information on the course the user himself/herself or another user has visited.

Figure 14:
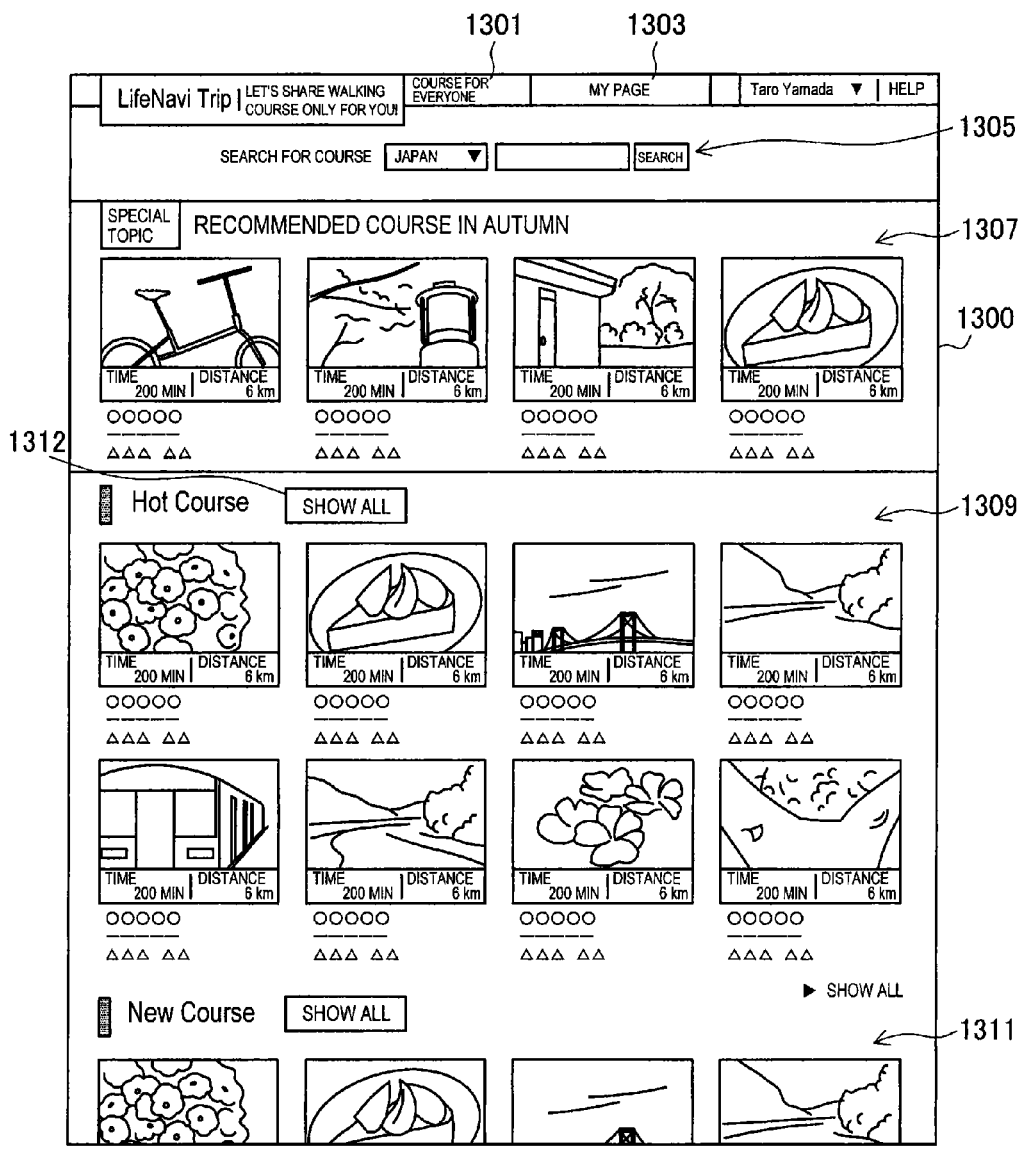
FIG. 14 is a diagram illustrating a first example of a display screen according to a second embodiment of the present disclosure.

FIG. 14 is a diagram illustrating a first example of a display screen according to a second embodiment of the present disclosure. With reference to FIG. 14, a screen 1300 includes as a tab a tab "course for everyone" 1301 and a tab "my page" 1303. In the example shown, the tab "course for everyone" 1301 is selected, and further displayed on the screen are a search display 1305, recommended course information 1307, popular course information 1309, and fresh arrival course information 1311. The search display 1305, recommended course information 1307, and popular course information 1309 may be respectively similar to the search display 1009, recommended course information 1011, and popular course information 1013 in the screen 1000 shown in FIG. 2, for example. The fresh arrival course information 1311 may be information on a course recently registered by the service administrator or another user, for example. The recommended course information 1307, popular course information 1309, and course information displayed in the fresh arrival course information 1311 may be displayed accompanied by the image, time required, course distance, title, region, and information of the course creator similarly to the example in FIG. 2. For the popular course information 1309 and the fresh arrival course information 1311, a button "show all" 1312 may be displayed. Selection of the button "show all" 1312 allows the popular course information and fresh arrival course information to be seen all as described later. Elements similar to the fresh arrival course information 1311 and the button "show all" 1312 may be displayed on the screen 1000 shown in FIG. 2 in the first embodiment.

Figure 15:
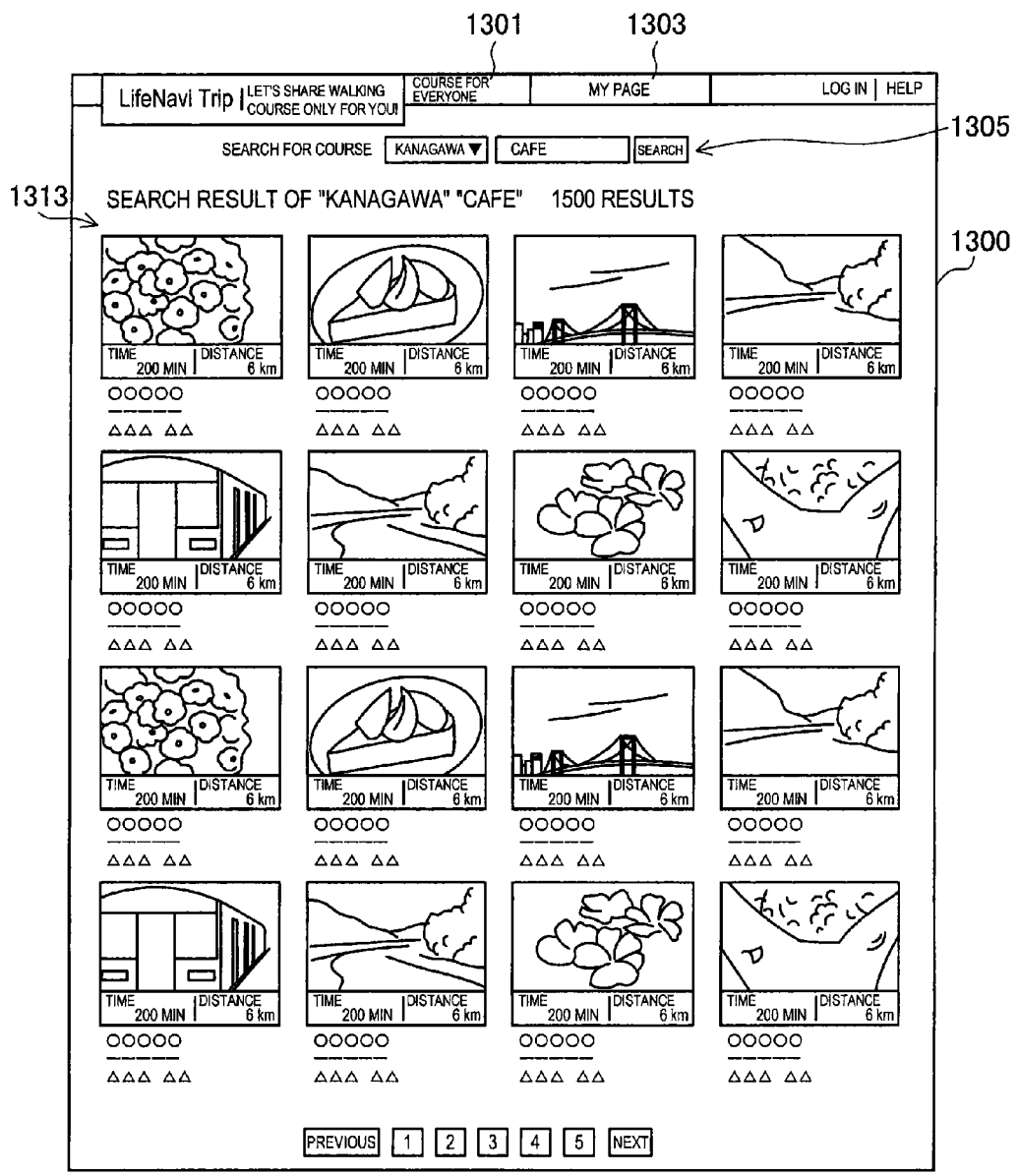
FIG. 15 is a diagram illustrating a second example of a display screen according to the second embodiment of the present disclosure.

FIG. 15 is a diagram illustrating a second example of the display screen according to the second embodiment of the present disclosure. FIG. 15 shows a screen displayed in a case where the search is performed using the search display 1305 in the screen 1300 shown in FIG. 14. In this case, a search result 1313 is displayed on the screen 1300. In the example shown, region "Kanagawa" and a keyword "cafe" are set as search criteria. Therefore, displayed on the search result 1313 are the course information on the "Kanagawa" region and relating to the "cafe". Here, for example, the search may be performed for an item containing the keyword in the title of the course information or for an item containing the keyword in content of the course information.

Figure 16:
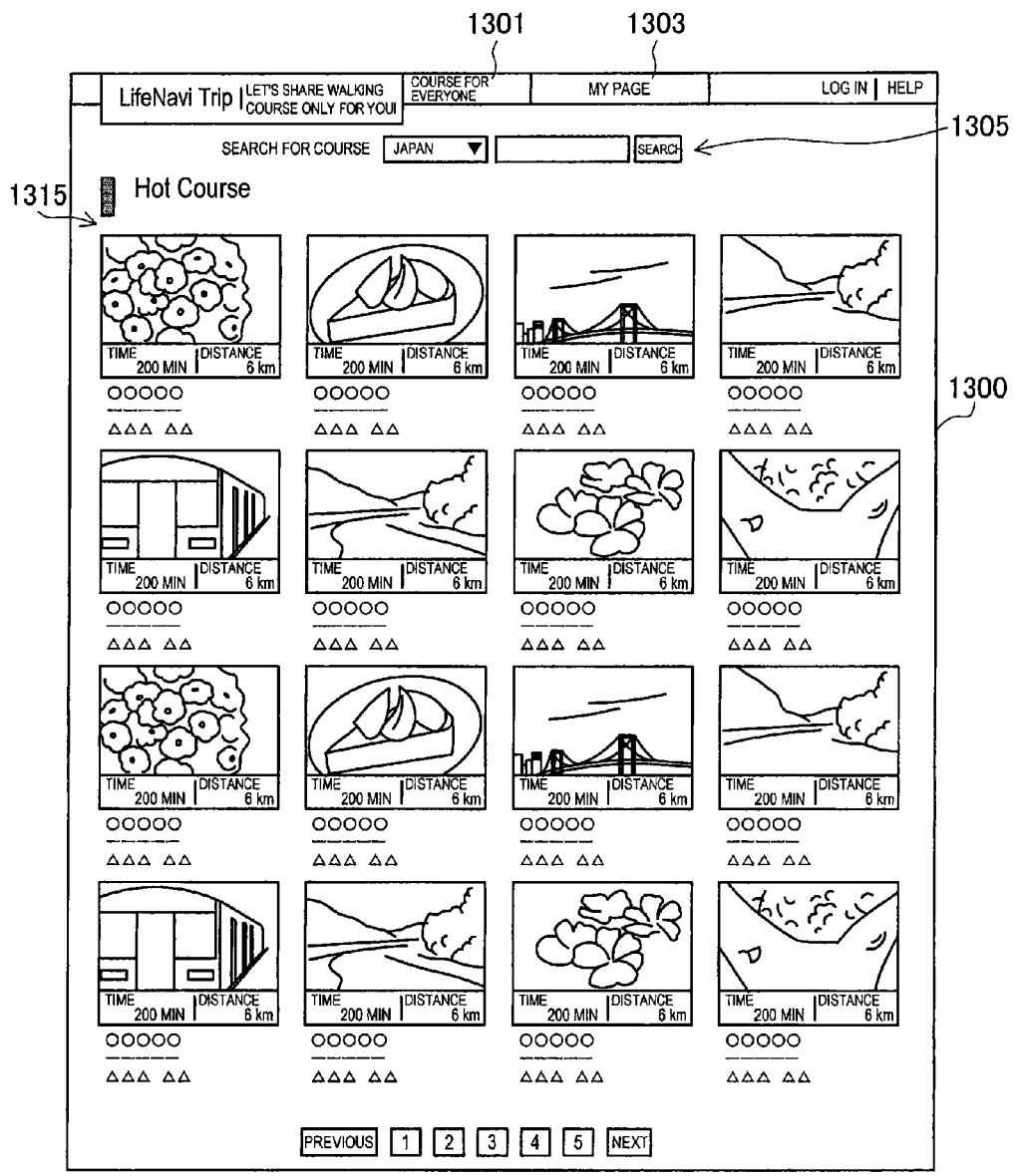
FIG. 16 is a diagram illustrating a third example of a display screen according to the second embodiment of the present disclosure.

FIG. 16 is a diagram illustrating a third example of the display screen according to the second embodiment of the present disclosure. FIG. 16 shows a screen displayed in a case where the button "show all" 1312 displayed for the popular course information 1309 is selected in the screen 1300 shown in FIG. 14. In this case, an all-display 1315 of the popular course information is displayed on the screen 1300.

Figure 17:
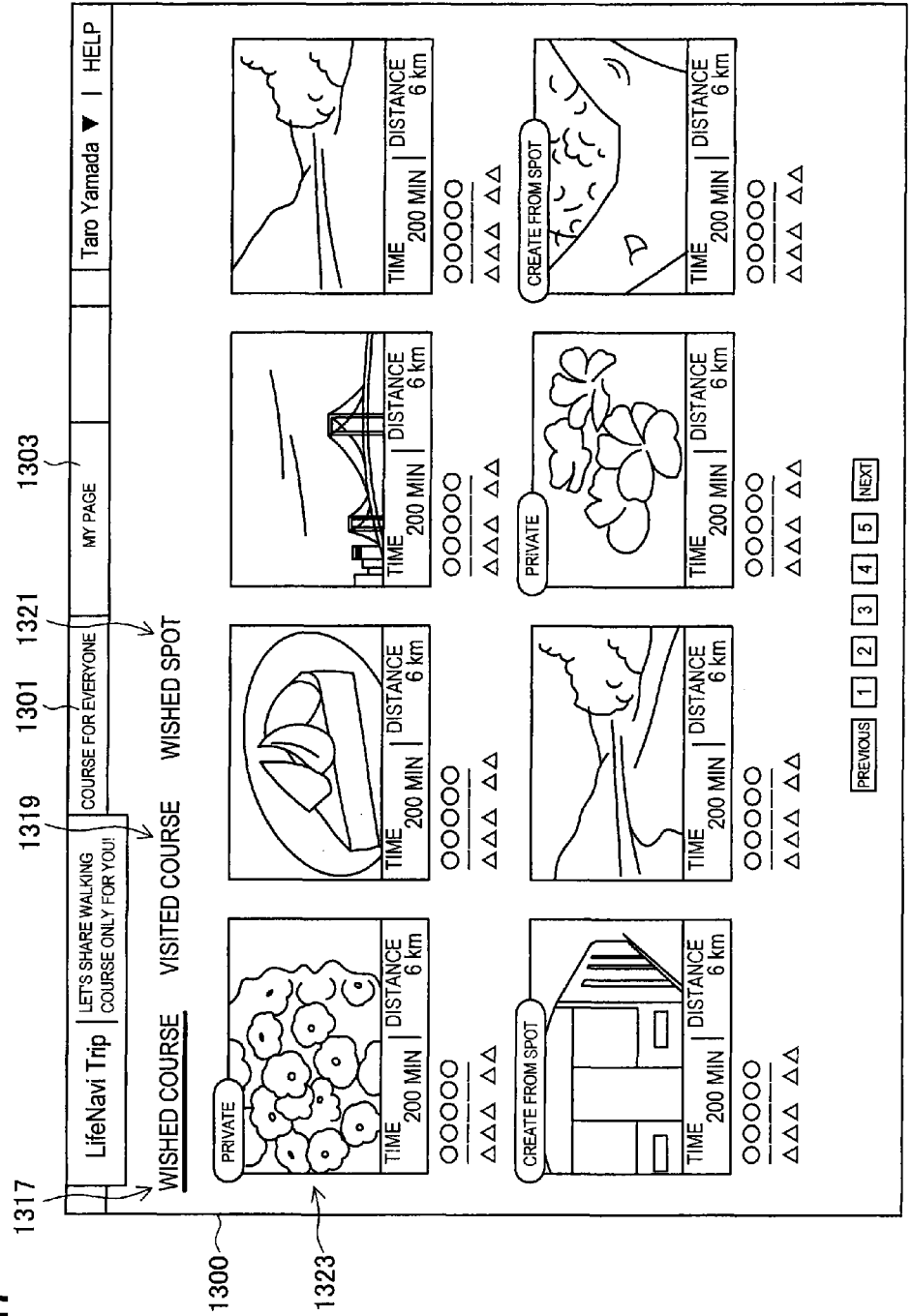
FIG. 17 is a diagram illustrating a fourth example of a display screen according to the second embodiment of the present disclosure.

FIG. 17 is a diagram illustrating a fourth example of the display screen according to the second embodiment of the present disclosure. FIG. 17 shows a screen displayed in a case where the tab "my page" 1303 is selected in the screens 1300 shown in FIG. 14 to FIG. 16. In this case, as a sub-tab a tab "wished course" 1317, a tab "visited course" 1319, and a tab wished "spot" 1321 are displayed on the screen 1300. In the example shown, the tab "wished course" 1317 is selected and information "wished course" 1323 is further is displayed on the screen 1300.

Figure 18:
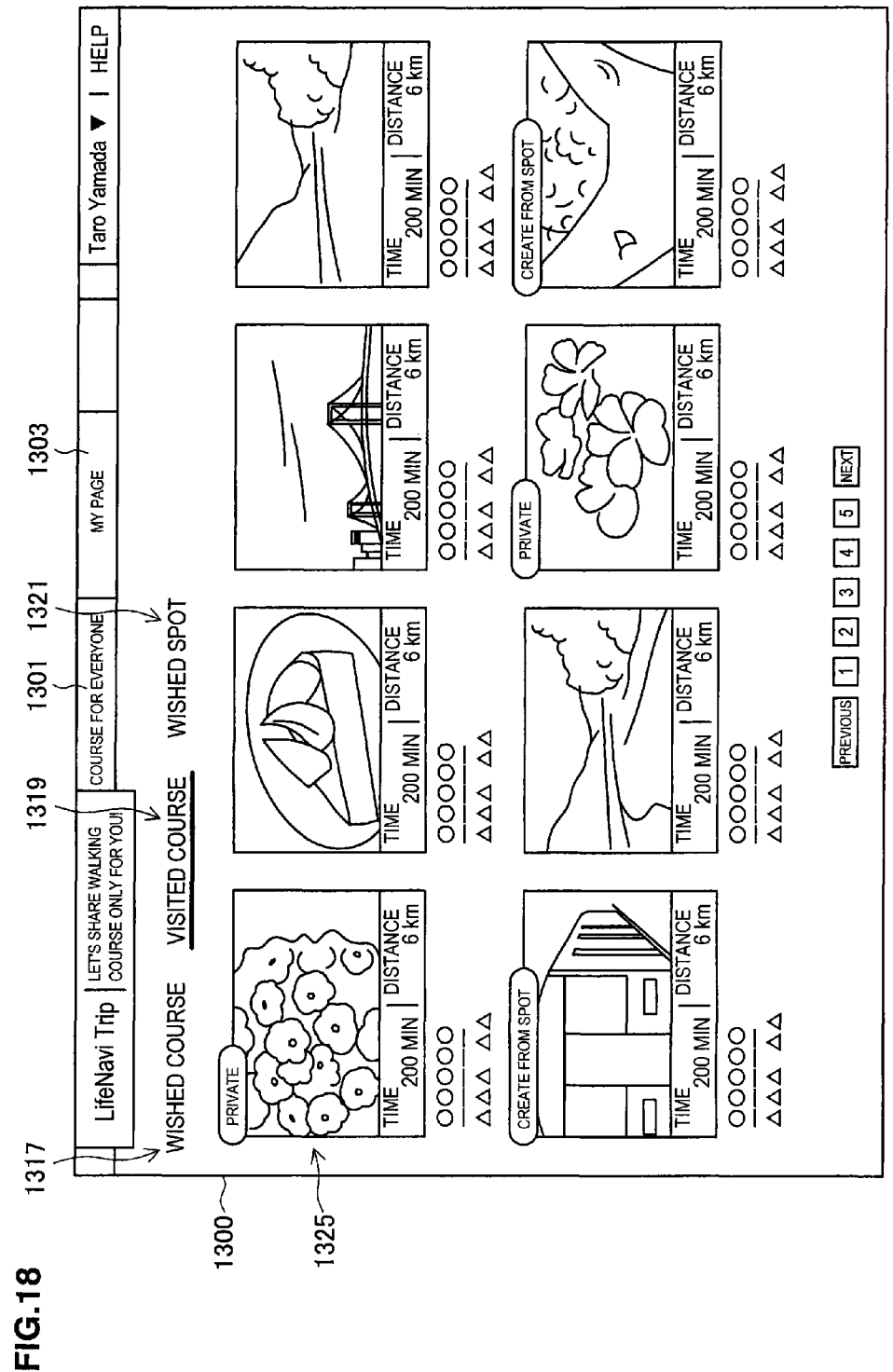
FIG. 18 is a diagram illustrating a fifth example of a display screen according to the second embodiment of the present disclosure.

FIG. 18 is a diagram illustrating a fifth example of the display screen according to the second embodiment of the present disclosure. FIG. 18 shows a screen displayed in a case where the tab "visited course" 1319 is selected from among the sub-tabs in the screen 1300 shown in FIG. 17. In this case, information "visited course" 1325 is displayed on the screen 1300.

Figure 19:
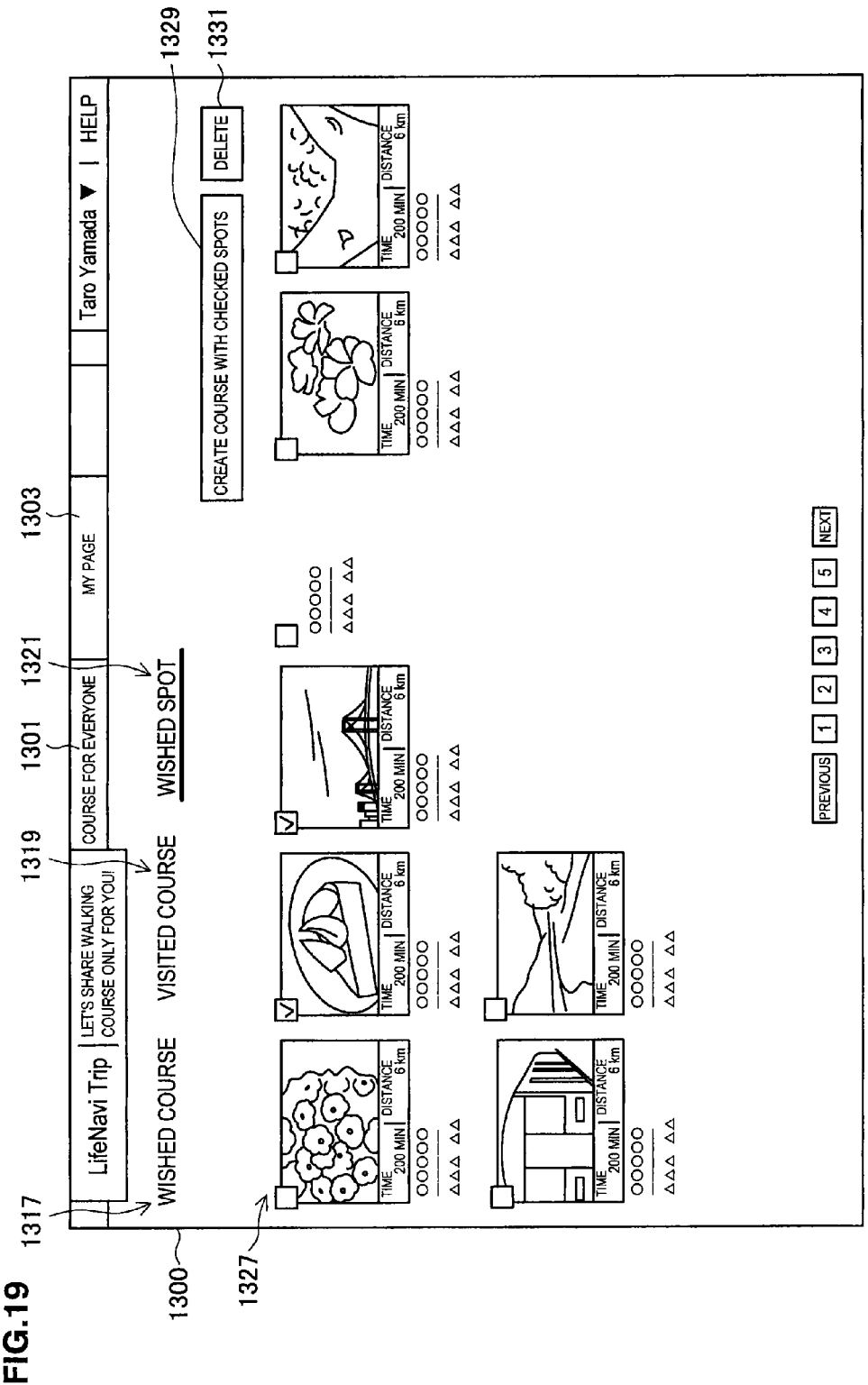
FIG. 19 is a diagram illustrating a sixth example of a display screen according to the second embodiment of the present disclosure.

FIG. 19 is a diagram illustrating a sixth example of the display screen according to the second embodiment of the present disclosure. FIG. 19 shows a screen displayed in a case where the tab wished "spot" 1321 is selected from among the sub-tabs in the screens 1300 shown in FIG. 17 and FIG. 18. In this case, "wished spot" information 1327, a button "course creation" 1329, and a delete button 1331 are displayed on the screen 1300. The "wished spot" information 1327 is information on a spot registered by the user in the spot information screen which is described later, for example. The spot information 1327 may display, for example, an image representing the spot, spot name, region, and information on a person providing the spot information. Further, the "wished spot" information 1327 displays a checkbox by which each spot can be selected. This checkbox and the button "course creation" 1329 or the delete button 1331 can be used to perform an operation on each spot. In a case where the "button "course creation" 1329 is selected, the course information for pursuing the checked spot is automatically generated. The generated course information may be added to the information "wished course" 1323 shown in FIG. 17, for example. If the delete button 1331 is selected, the checked spot information is deleted from the "wished spot" information 1327.

Figure 20:
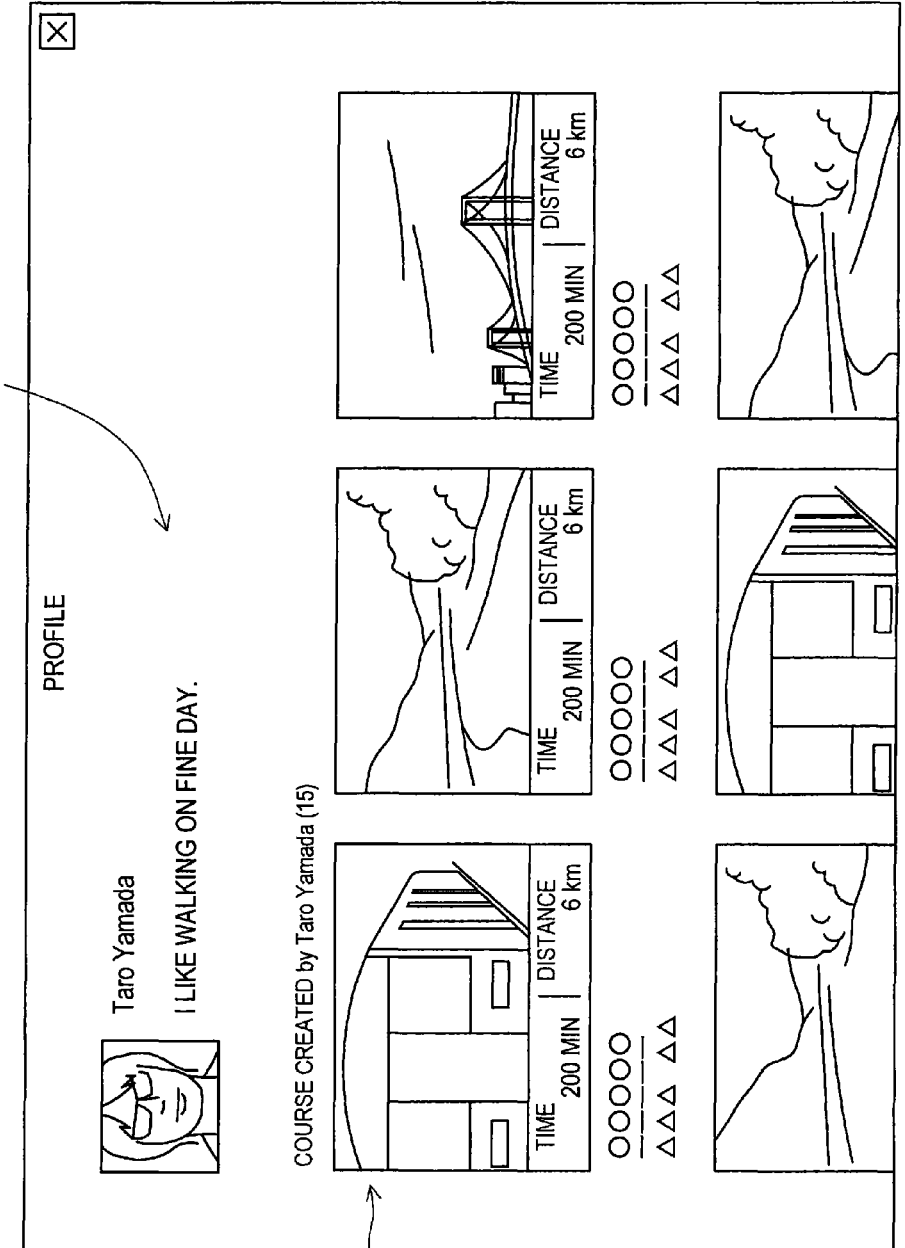
FIG. 20 is a diagram illustrating a seventh example of a display screen according to the second embodiment of the present disclosure.

FIG. 20 is a diagram illustrating a seventh example of the display screen according to the second embodiment of the present disclosure. FIG. 20 shows a user profile screen 1350 displayed in a case where a user name of another user displayed as the course information or spot information is selected in the screens 1300 shown in FIG. 14 to FIG. 19. Profile information 1351 and created course information 1353 are displayed on the user profile screen 1350. The profile information 1351 may contain, for example, a user name, year of birth, sex, residence, and information such as the comment. The created course information 1353 is information of the course created by the user whose profile information 1351 is displayed. In this way, the application according to the embodiments can obtain the profile information of each user as well as the information of the course created by the user. Similarly, the information on the visited course or wished course by each user may be provided.

Figure 21:
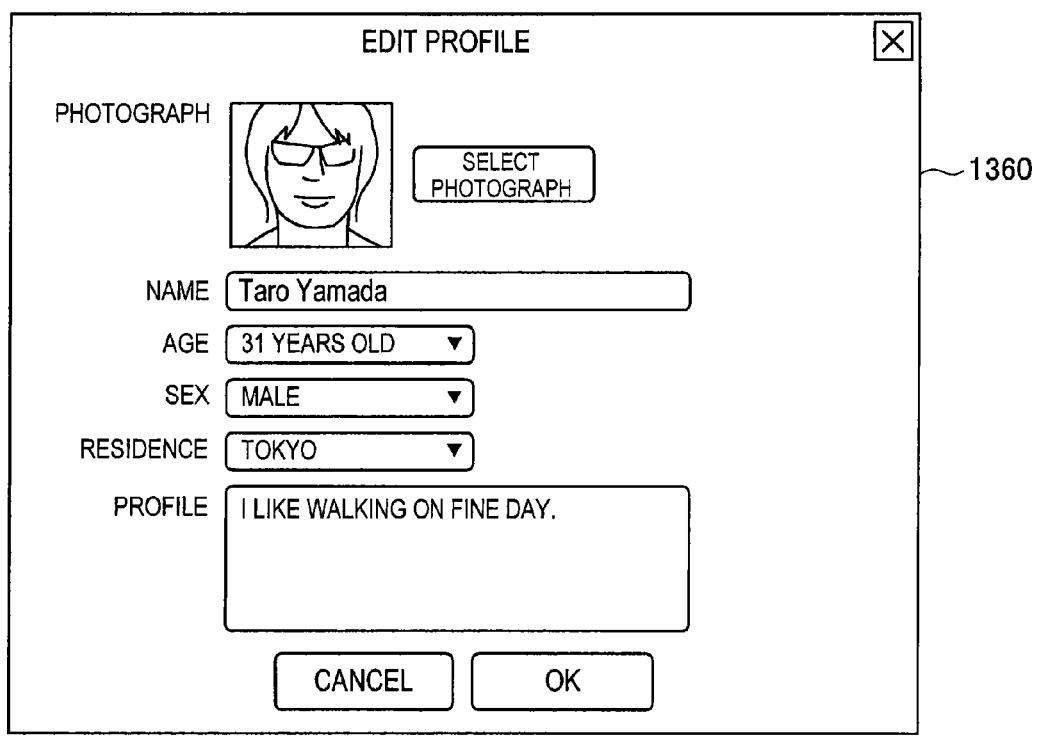
FIG. 21 is a diagram illustrating an eighth example of a display screen according to the second embodiment of the present disclosure.

FIG. 21 is a diagram illustrating an eighth example of the display screen according to the second embodiment of the present disclosure. FIG. 21 shows a profile edit screen 1360 displayed in a case where the user name displayed on the upper right (name of the user himself/herself who is using the application) is selected in the screens 1300 shown in FIG. 14 to FIG. 19. In the profile edit screen 1360, an image, name, age, sex, residence, and information such as comment of the user himself/herself can be edited, which are to be displayed in the user profile screen 1350 browsed by another user, for example.

Figure 22:
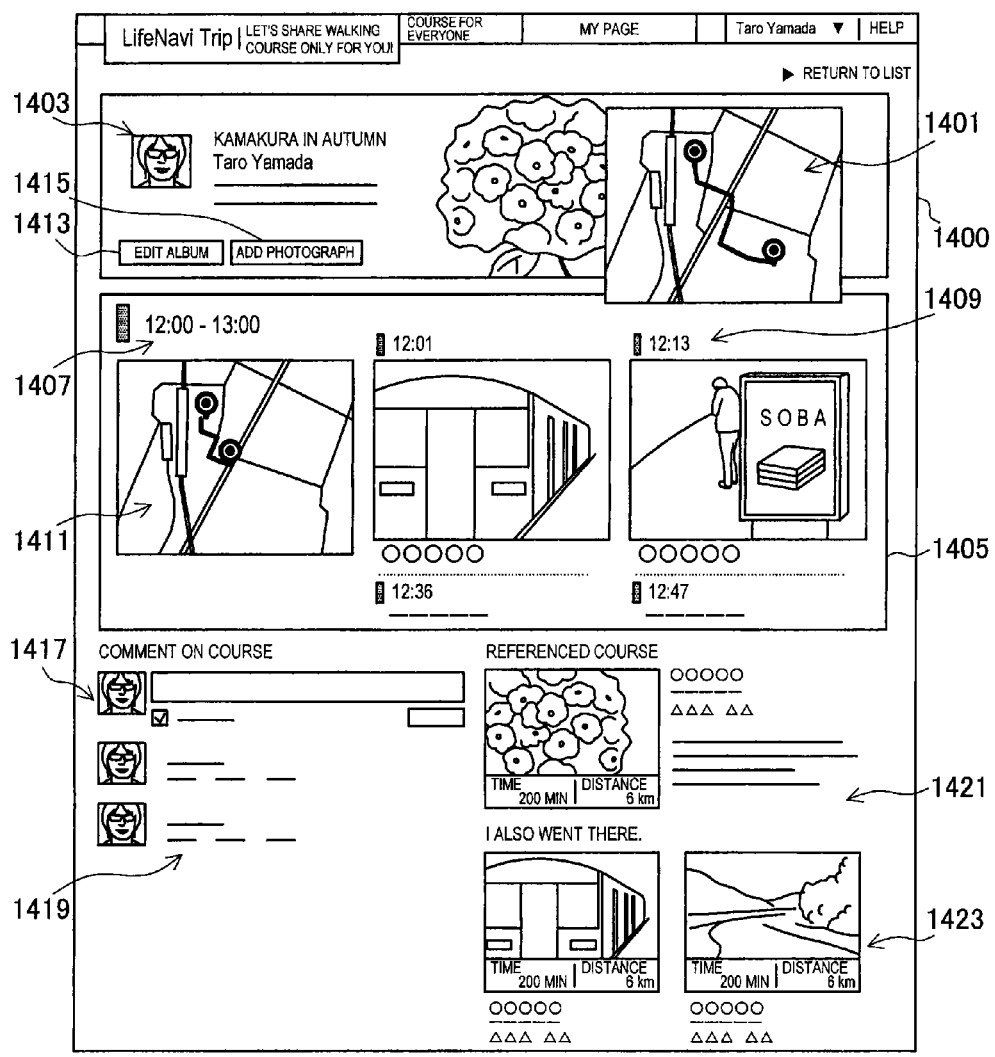
FIG. 22 is a diagram illustrating a ninth example of a display screen according to the second embodiment of the present disclosure.

FIG. 22 is a diagram illustrating a ninth example of the display screen according to the second embodiment of the present disclosure. FIG. 22 shows a course information screen 1400 displayed in a case where any course information is selected in the screens 1300 shown in FIG. 14 to FIG. 18 and FIG. 20 or in the user profile screen 1350. A course map 1401, a course title display 1403, and a travel report 1405 are displayed on the course information screen 1400. The course map 1401 displays a route actually gone through by the user who has registered the relevant course or who has visited the relevant course (possibly a user himself/herself who is using the application in some cases). The course title display 1403 may display, for example, an image representing the course, time required, course distance, title, region, and information such as a course creator which are displayed as the course information in the screen 1300 or user profile screen 1350 and may further display the creator comment as the example shown.

Here, in a case where the displayed course is a course already visited by the user who is using the application, the button "album edit" 1413 or the button "photograph addition" 1415 may be displayed together with the course title display 1403. On the other hand, in a case where the displayed course is a course another user has visited (the user who is using the application here has not still visited), in place of the above, button the button "wished" or the start navigation button may be displayed. The operations of these buttons may be similar to those of the above first embodiment, for example.

The travel report 1405 includes the photograph or comment uploaded or input by the user and the like. The travel report 1405 may display an event 1409 for each journey section 1407, for example. The journey section 1407 is set by way of dividing all routes gone through by the user according to a predetermined rule. In the example shown, one journey section 1407 is set for 12:00 to 13:00. For each journey section 1407, the title (12:00 to 13:00) is displayed and a sub-map 1411 showing the journey section thereof is displayed.

Moreover, a comment input field 1417 and a comment display 1419 are displayed on the course information screen

1400. The comment input field 1417 is a display for inputting a comment including impression by a user having visited the course or by another user browsing the travel report 1405 or the like. The comment input by use of the comment input field 1417 is displayed as the comment display 1419. As shown in the figure, the comment input field 1417 may include a link to social media.

Further, referenced course information 1421 and reference-based course information 1423 are displayed on the course information screen 1400. The referenced course information 1421 is information on a course referenced by the user when visiting a target course of the course information screen 1400. On the other hand, the reference-based course information 1423 is information on a course visited by another user with referring to the target course.

As is seen from the description above, in the course information screen 1400, displayed are on the same screen together the pieces of information which are displayed on another screen via some tabs in the course information screen 1100 in the above first embodiment. In this way, in the display screen according to the embodiment of the present disclosure, it may be arbitrarily set whether or not a plurality of displayed elements are displayed together on the same screen or on another screen via the tab and the like.

Figure 23:
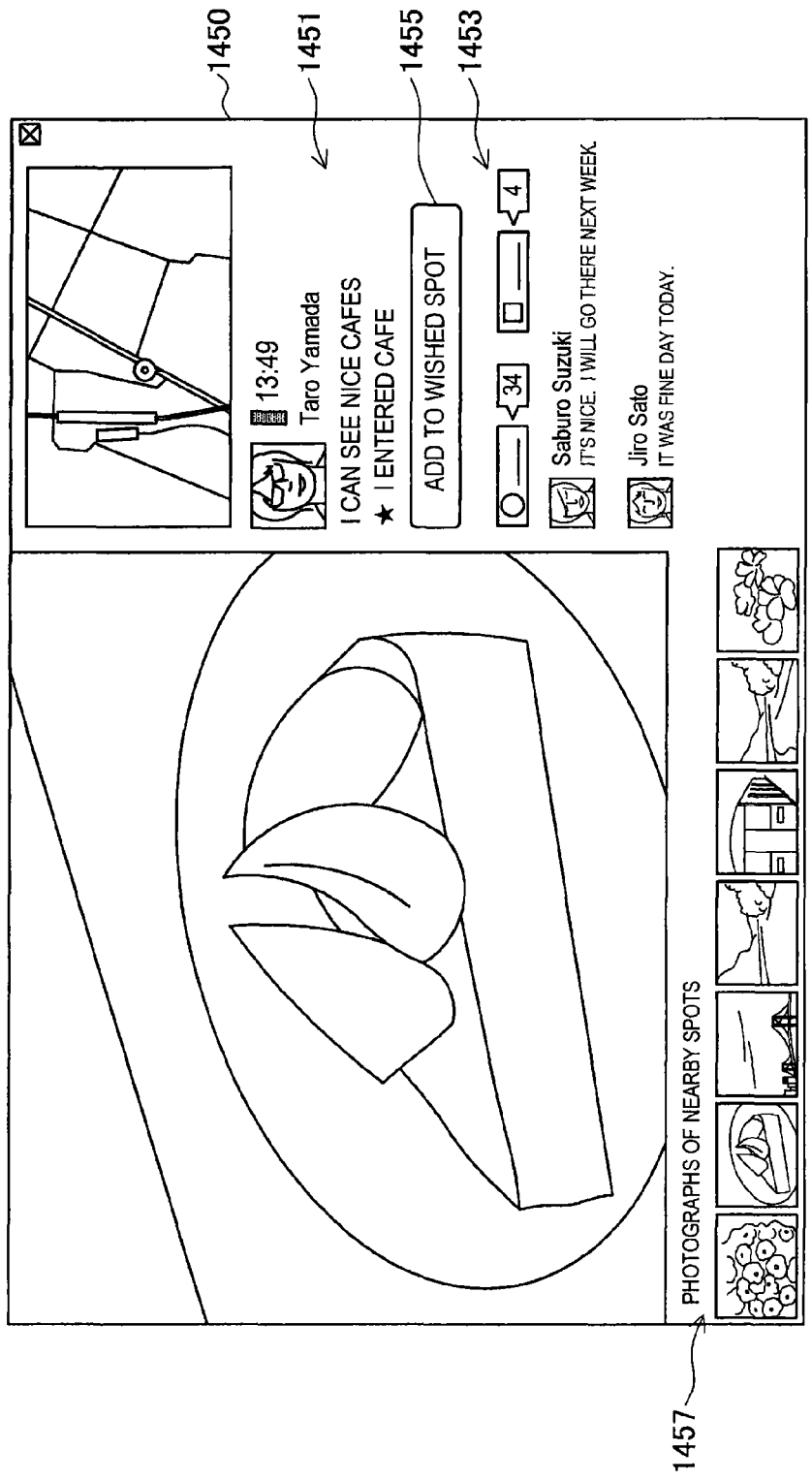
FIG. 23 is a diagram illustrating a tenth example of a display screen according to the second embodiment of the present disclosure.

FIG. 23 is a diagram illustrating a tenth example of the display screen according to the second embodiment of the present disclosure. FIG. 23 shows spot information screen 1450 displayed in a case the spot information displayed as the event 1409 is selected in the course information screen 1400 shown in FIG. 22. A poster comment display 1451, a comment display 1453, and button "spot registration" 1455 are displayed on displayed the spot information screen 1450. The poster comment display 1451 displays a time when the user posted this spot information, poster name, poster comment and the like. The comment display 1453 displays a comment including impression by the poster of the spot information or another user browsing the post. As shown in the figure, the comment display 1453 may include a link to social media. If the button "spot registration" 1455 is selected, this spot is set as a wished spot of the user and is displayed as the wished spot in the screen 1300 shown in FIG. 19, for example. Further, a photograph taken at another spot close in distance to a target spot may be displayed as a related image display 1457 on the spot information screen 1450.

Figure 24:
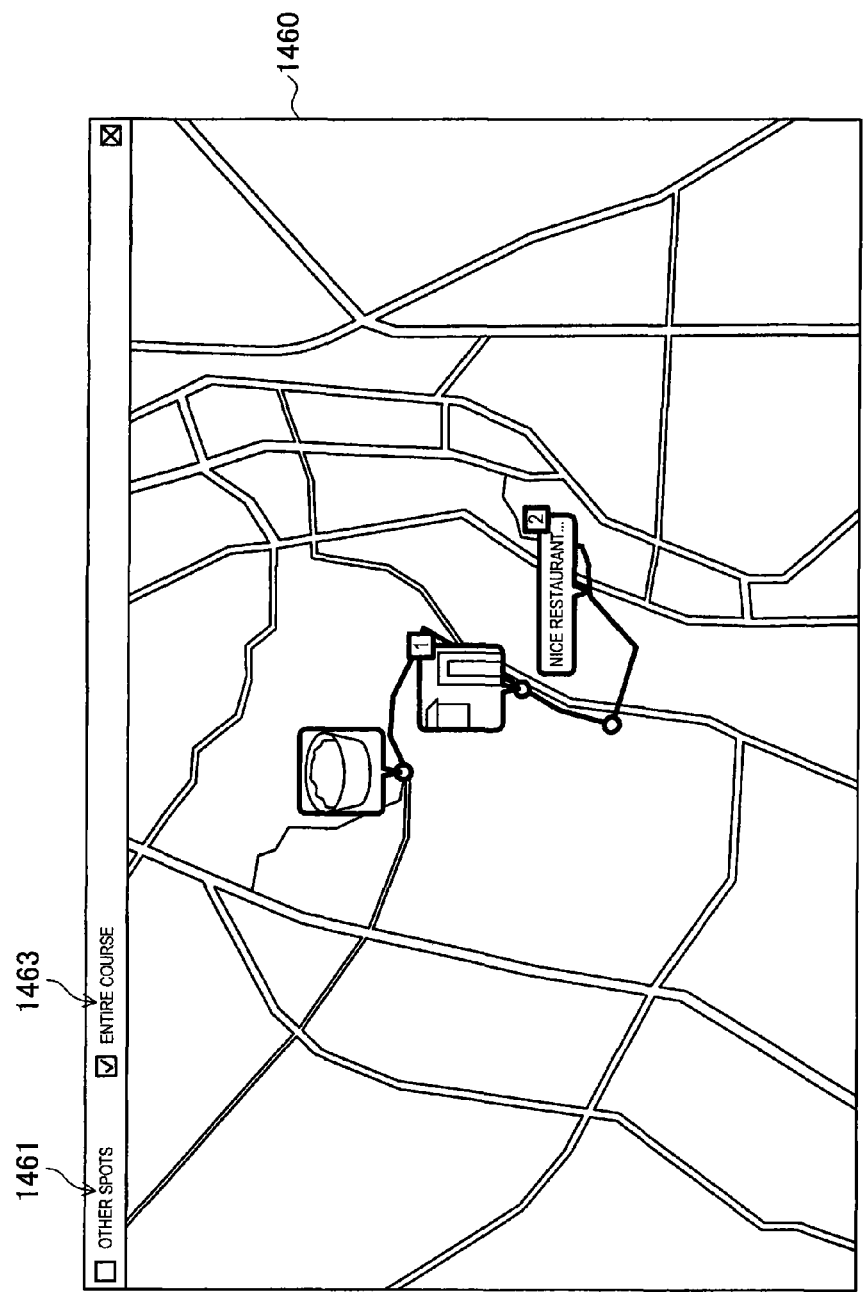
FIG. 24 is a diagram illustrating an eleventh example of a display screen according to the second embodiment of the present disclosure.

FIG. 24 is a diagram illustrating an eleventh example of the display screen according to the second embodiment of the present disclosure. FIG. 24 shows a zoomed-in map screen 1460 displayed in a case where the course map 1401 or the sub-map 1411 is selected in the course information screen 1400 shown in FIG. 22. Displayed on the zoomed-in map screen 1460 are the route of the course, spot on the way of the route, and information such as the photograph or comment taken or input at the spot which are displayed in the course information screen 1400. On the zoomed-in map screen 1460, a checkbox 1461 for displaying a spot out of the target course and a checkbox 1463 for displaying a course other than the target course may be displayed.

Figure 25:
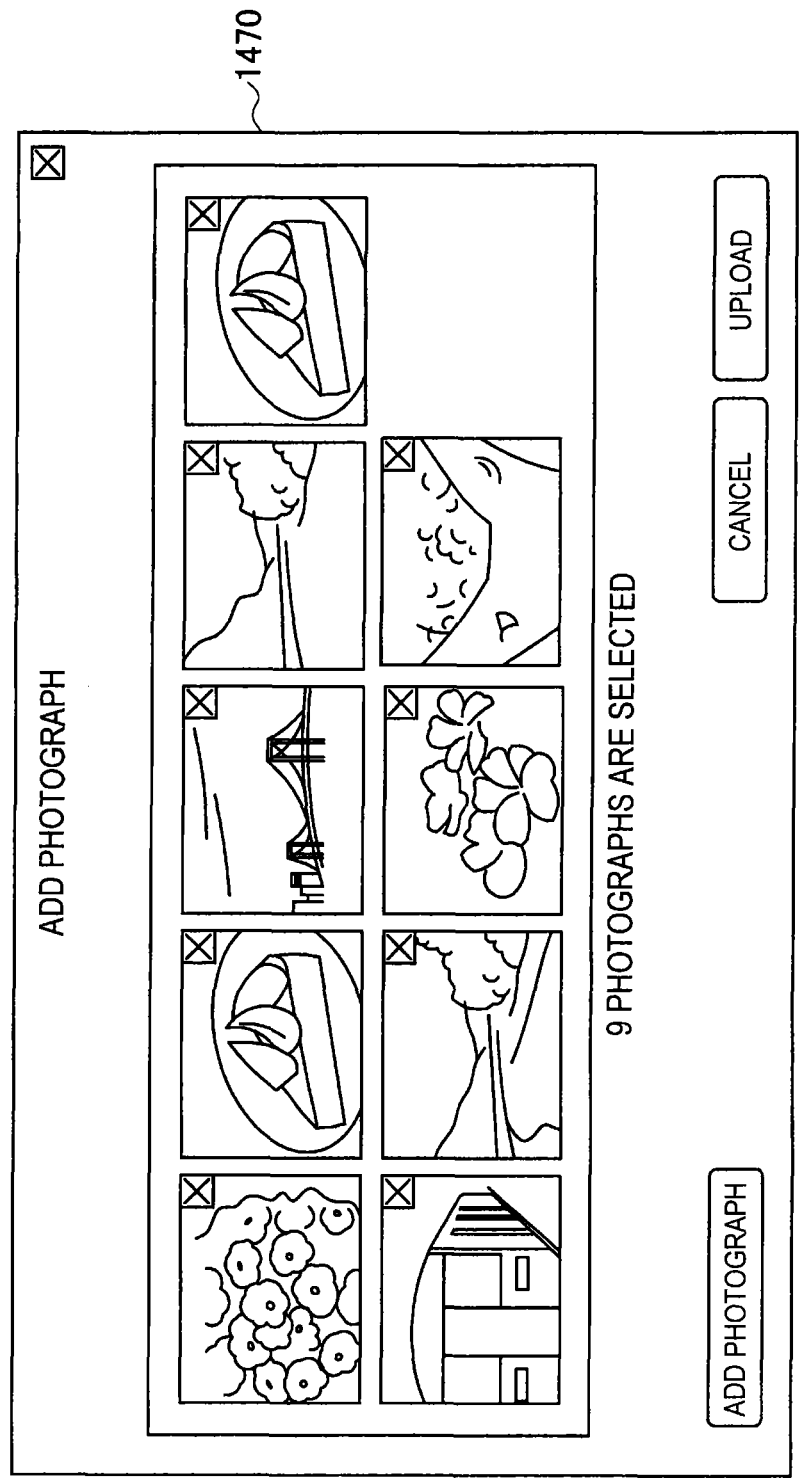
FIG. 25 is a diagram illustrating a twelfth example of a display screen according to the second embodiment of the present disclosure.

FIG. 25 is a diagram illustrating a twelfth example of the display screen according to the second embodiment of the present disclosure. FIG. 25 shows a photograph addition screen 1470 displayed in a case where the button "photograph addition" 1415 is selected in the course information screen 1400 shown in FIG. 22. In the photograph addition screen 1470, as the example shown, it may be such that photographs taken on the date when the user visited the course are displayed as an additional candidate, from which a photograph to be added to the course information may be able to be selected.

Figure 26:
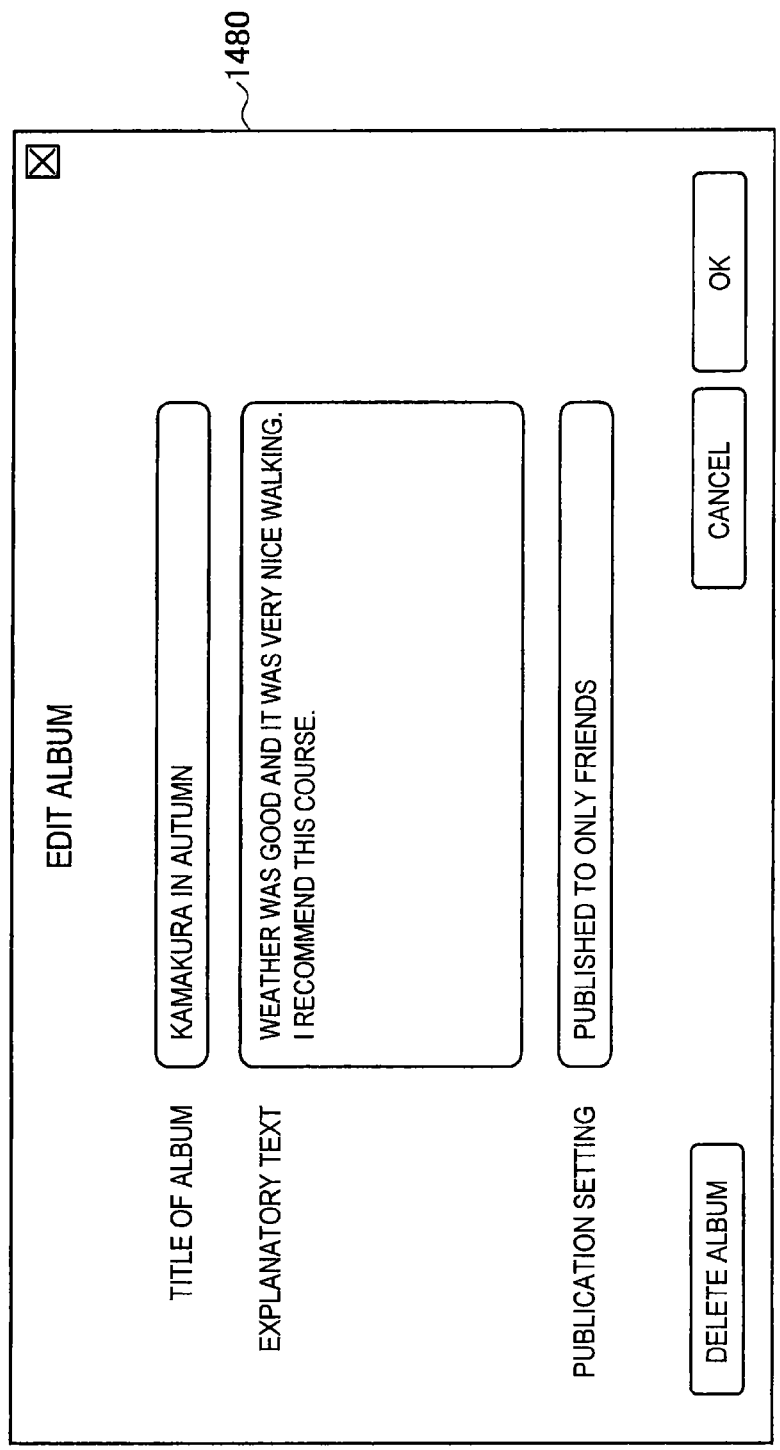
FIG. 26 is a diagram illustrating a thirteenth example of a display screen according to the second embodiment of the present disclosure.

FIG. 26 is a diagram illustrating a thirteenth example of the display screen according to the second embodiment of the present disclosure. FIG. 26 shows an album edit screen 1480 displayed in a case where the button "album edit" 1413 is selected in the course information screen 1400 shown in FIG. 22. In the album edit screen 1480, similar to the album edit screen 1160 shown in the above first embodiment in FIG. 11, the title or explanatory text of the course information may be edited, the publication setting may be changed, and the course information may be deleted.

According to the second embodiment of the present disclosure described above, the user can browse the course information registered on the basis of the setting by the service administrator and an exploration result by another user as reference for his/her behavior, or browse the course information on the course he/she has visited to think back on his/her visit. Such an application specialized in browsing is provided to, for example, a non-portable device such as a stationary PC, TV set or game console, and further may be combined with the application according to the first embodiment provided for a portable terminal such as a smartphone or a tablet terminal.

2-3. Third Embodiment

A third embodiment of the present disclosure provides, in the application for sharing the course information introduced as the first and second embodiment, those having the purpose of the course specialized in "touring places used as content stage". For other than that purpose, a configuration of this embodiment is common to that of the first embodiment or second embodiment above. Therefore, a description of the configuration common to the first or second embodiment is partially omitted in the following description.

Note that in the application according to the embodiment, a trip with the purpose of "touring places used as content stage" (so-called pop-culture tourism) is liken to an act of visiting a religious holy site and called "pilgrimage". A target for "pilgrimage" is not limited to a place used as a stage of video content such as a movie (either live-action film or animation may be) as in the example of the embodiment, but may be a place used as a stage of content such as literature, music and game which involve no video. In the following description, such a place used as a content stage may be figuratively called a "holy site" and action of visiting the holy site" may be called the "pilgrimage".

(Application for Browsing)

Figure 27:
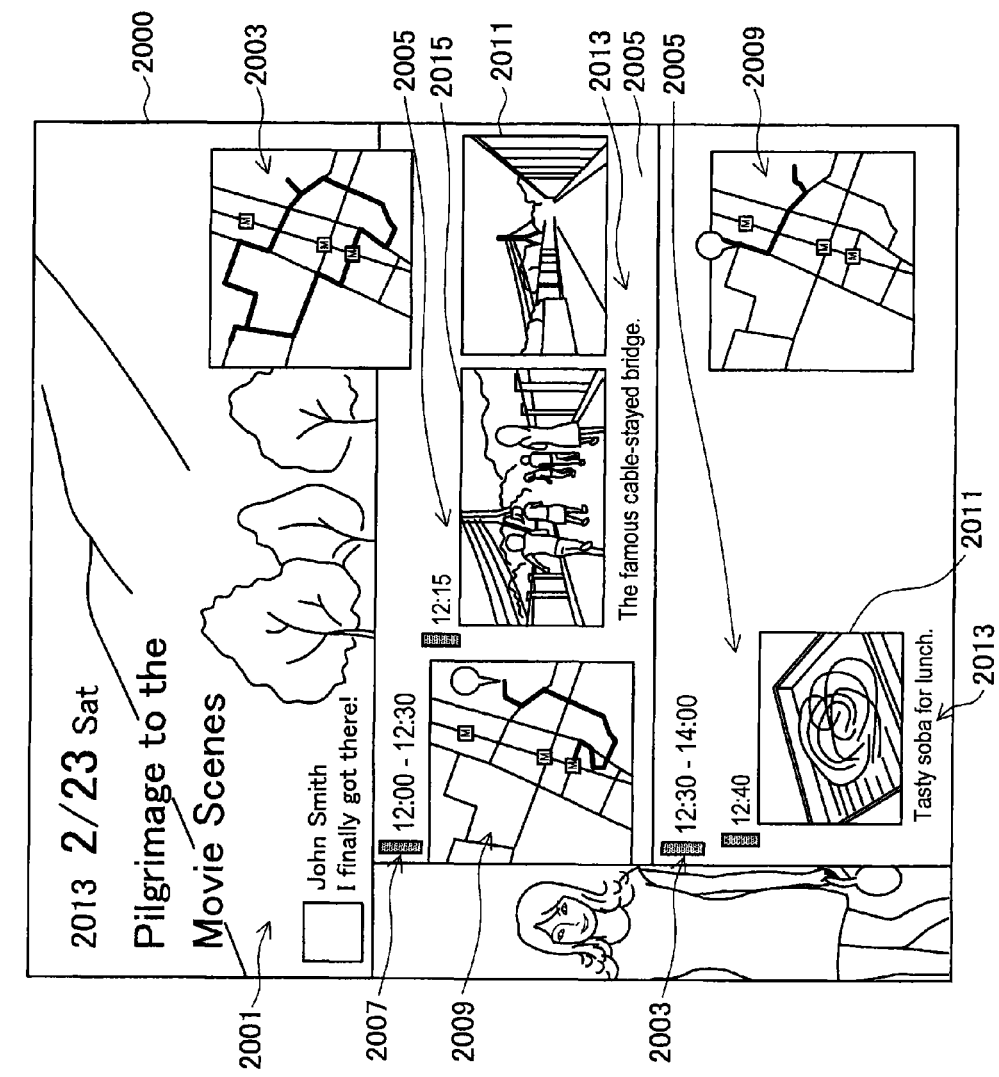
FIG. 27 is a diagram illustrating a first example of a browse display screen according to a third embodiment of the present disclosure.

FIG. 27 is a diagram illustrating a first example of a browse display screen according to a third embodiment of the present disclosure. With reference to FIG. 27, a course information screen 2000 is a screen for displaying a result of a "pilgrimage" made by a user as the course information, a title display 2001, a course map 2003, and a travel report 2005 are displayed thereon. The travel report 2005 is divided, for example, into journey sections 2007 and includes a sub-map 2009 indicating the journey section, a photograph 2011 uploaded by the user, a comment input by a user 2013 and the like. A portion for the "holy site" (bridge in this example) visited by the user may display, along with the photograph 2011 uploaded by the user, a scene of movie 2015 filmed using this bridge as a stage (or bridge is drawn as a stage in a case of animation). The travel report 2005 may not necessarily consist of a record of visiting the "holy site", but may include, for example, an ordinary trip element as "Tasty soba for lunch" in the journey section of "12:30-14:00" in the example shown.

For example, in a case where the user refers the "pilgrimage" made by himself/herself by way of the course information screen 2000, displaying is associated with the original movie scene or the like to allow him/her to think back on the result of the "pilgrimage". In a case where the user refers the result of the "pilgrimage" made by another user by way of the course information screen 2000, the result of the "pilgrimage" is figured out to be easily understandable, which likely inspires him/her to wish to go.

Figure 28:
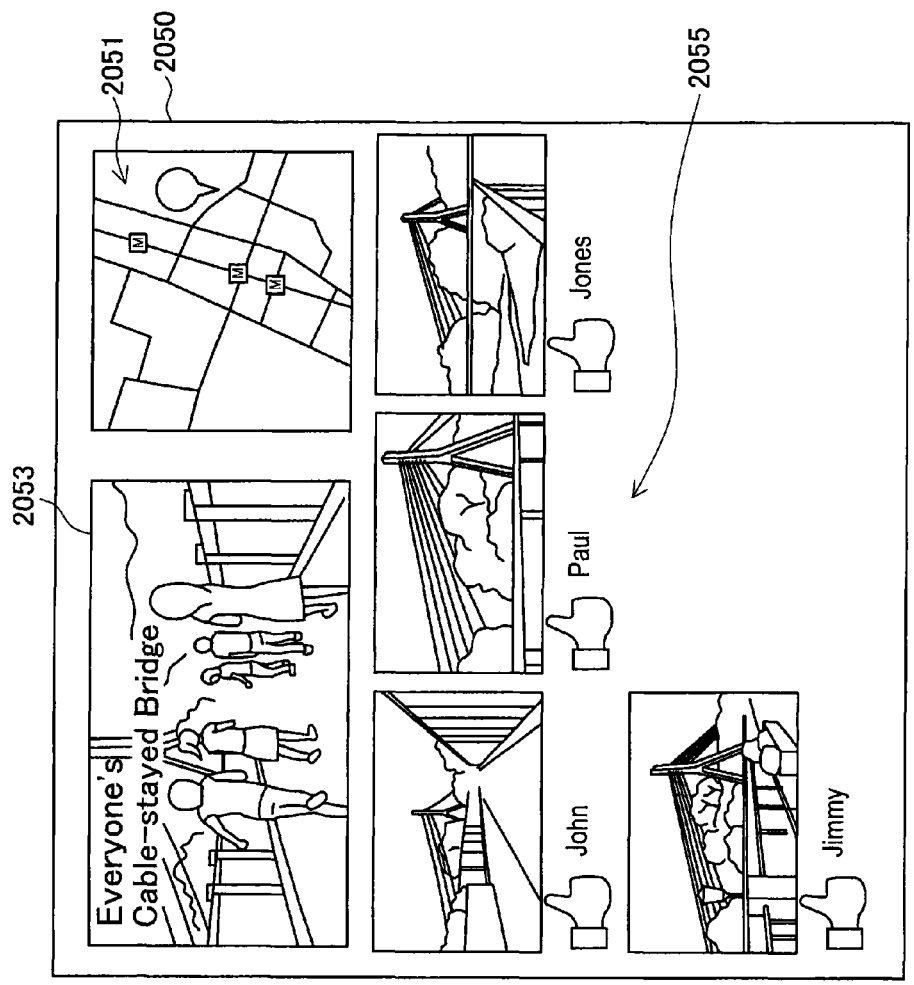
FIG. 28 is a diagram illustrating a second example of a browse display screen according to the third embodiment of the present disclosure.

FIG. 28 is a diagram illustrating a second example of the browse display screen according to the third embodiment of the present disclosure. FIG. 28 shows a screen 2050 displayed in a case where the photograph 2011 (or scene 2015) is selected in the course information screen 2000 shown in FIG. 27 at the portion in the travel report 2005 for the "holy site" being visited. A map 2051 indicating a position of the "holy site" and a scene of movie 2053 filmed using the "holy site" as a stage (or the "holy site" is drawn as a stage in a case of animation), a photograph 2055 taken by another user at the "holy site" are displayed on the screen 2050. The user can share an experience with another user who has visited the same "holy site" by way of this screen 2050. The photograph 2055 of another user may be ranked according to, for example, quality of the photograph or degree of similarity to the scene 2053. Action such as evaluation for the photograph 2055 of each user may be able to be transmitted.

(Application for Navigation)

Figure 29:
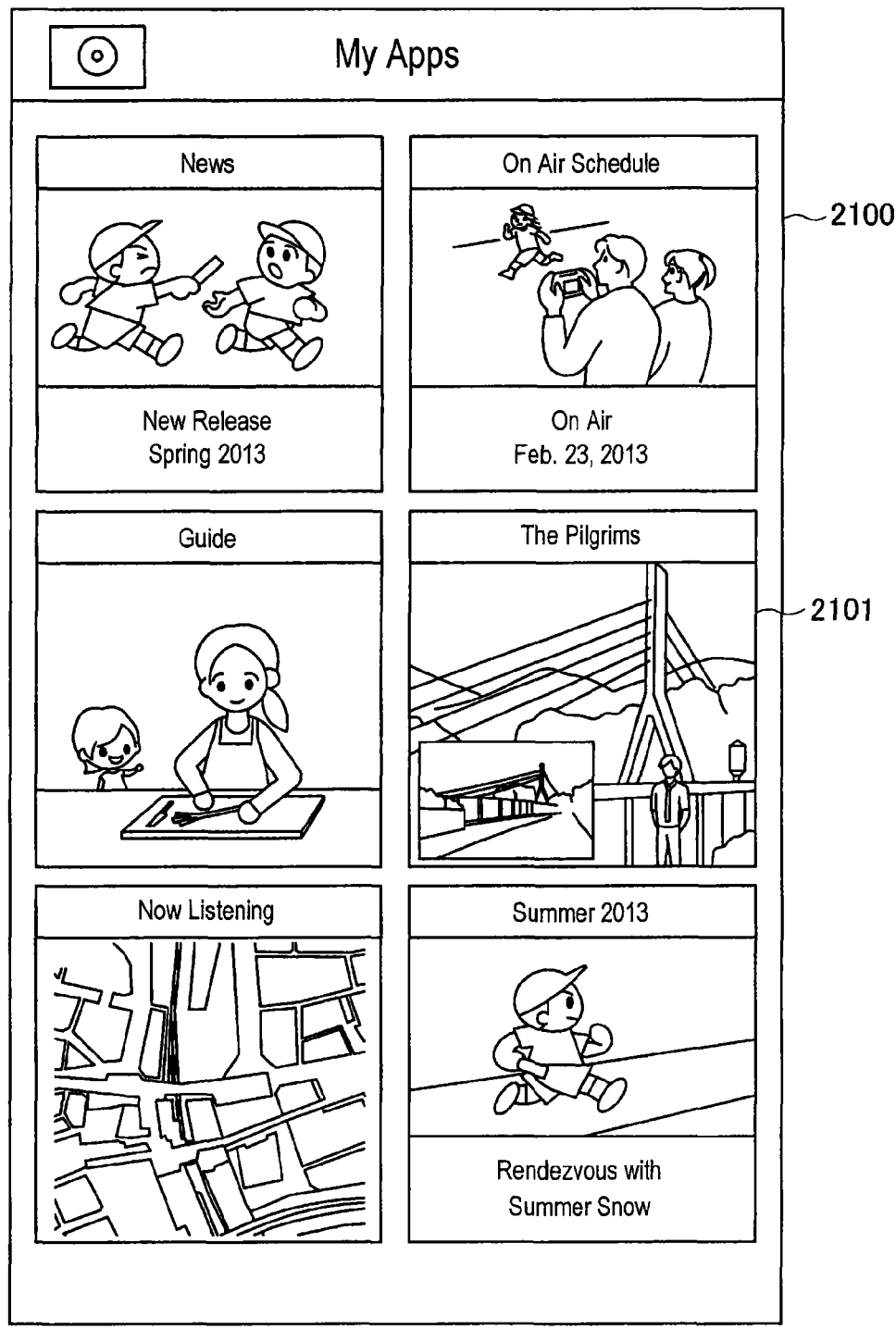
FIG. 29 is a diagram illustrating a first example of a navigation display screen according to the third embodiment of the present disclosure.

FIG. 29 is a diagram illustrating a first example of a navigation display screen according to the third embodiment of the present disclosure. FIG. 29 shows a screen 2100 at startup of the application. Some applications are displayed together with titles and representative images (application display 2101) on the screen 2100. The application for navigation according to the embodiment is named "The Pilgrims". If the user selects the application display 2101 in "The Pilgrims", the application for navigation according to the embodiment is started up.

Figure 30:
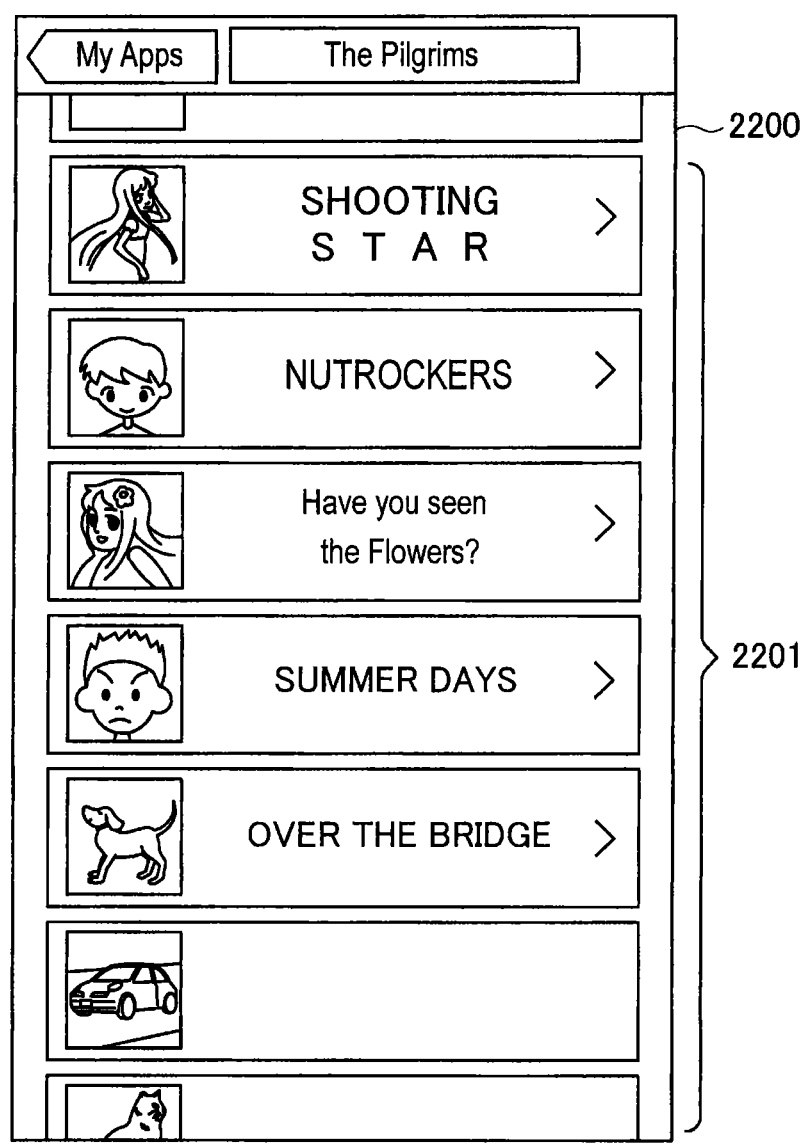
FIG. 30 is a diagram illustrating a second example of a navigation display screen according to the third embodiment of the present disclosure.

FIG. 30 is a diagram illustrating a second example of the navigation display screen according to the third embodiment of the present disclosure. FIG. 30 shows a content selection screen 2200 displayed after startup of the application. Content selectable as a target of the "pilgrimage" is displayed by a banner 2201 on the content selection screen 2200. The user selects any of the banners 2201 to determine the content as the target of the "pilgrimage".

Figure 31:
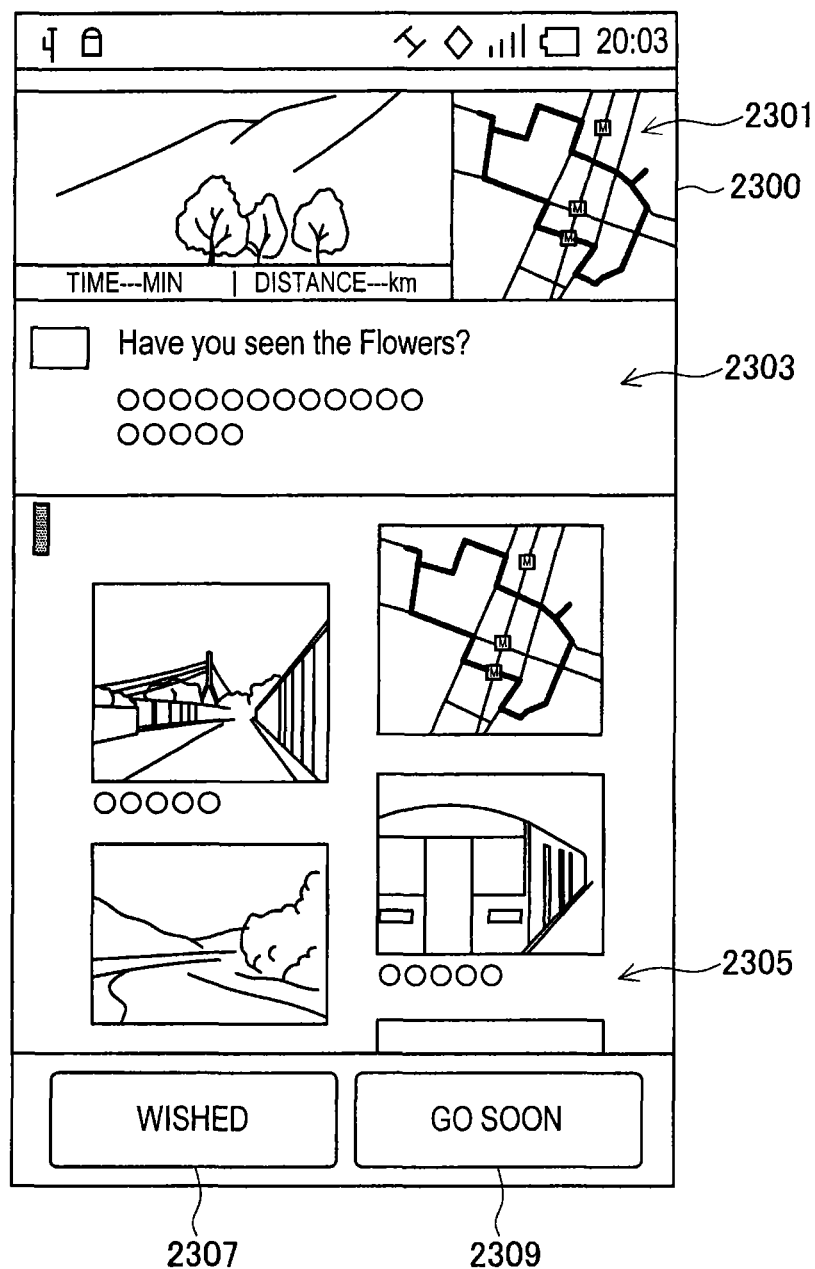
FIG. 31 is a diagram illustrating a third example of a navigation display screen according to the third embodiment of the present disclosure.

FIG. 31 is a diagram illustrating a third example of the navigation display screen according to the third embodiment of the present disclosure. FIG. 31 shows a course information screen 2300 displayed in a case where the target content of the "pilgrimage" is determined in the content selection screen 2200 shown in FIG. 30. A course map 2301, a course title 2303, and a course content 2305 are displayed on the course information screen 2300. The course information displayed on the course information screen 2300 may be, for example, one provided by a content creator and registered by the service administrator or one generated on the basis of a result of a "pilgrimage" made by a user.

Here, the course map 2301 displays the course containing the "holy sites" set to the selected content, that is, places used as a content stage. A route following these places may not be necessarily displayed on the course map 2301. However, for example, in a case where the course information is generated on the basis of the result of the "pilgrimage" made by another user, or in a case where the order of following the "holy sites" is important in terms of storyline of the content, the route may be displayed. The course title 2303 displays a title given to the course. The course title 2303 may further display kinds of course (course provided by the content creator, course generated on the basis of the result of the "pilgrimage" by another user, or the like), caption, comment or the like. The course content 2305 displays information on the "holy site" contained in the course, by use of an image, comment or the like similarly, for example, to the travel report 2005 in the course information screen 2000 of the application for browsing shown in FIG. 27.

In a case where the displayed course is a course the user has not visited, displayed on the course information screen 2300 are a button "wished" 2307 and a button "go soon" 2309. If the button "wished" 2307 is selected, the displayed course is registered to the "wished course" of the user. If the button "go soon" 2309 is selected, the navigation for going through the displayed course is started.

Figure 32:
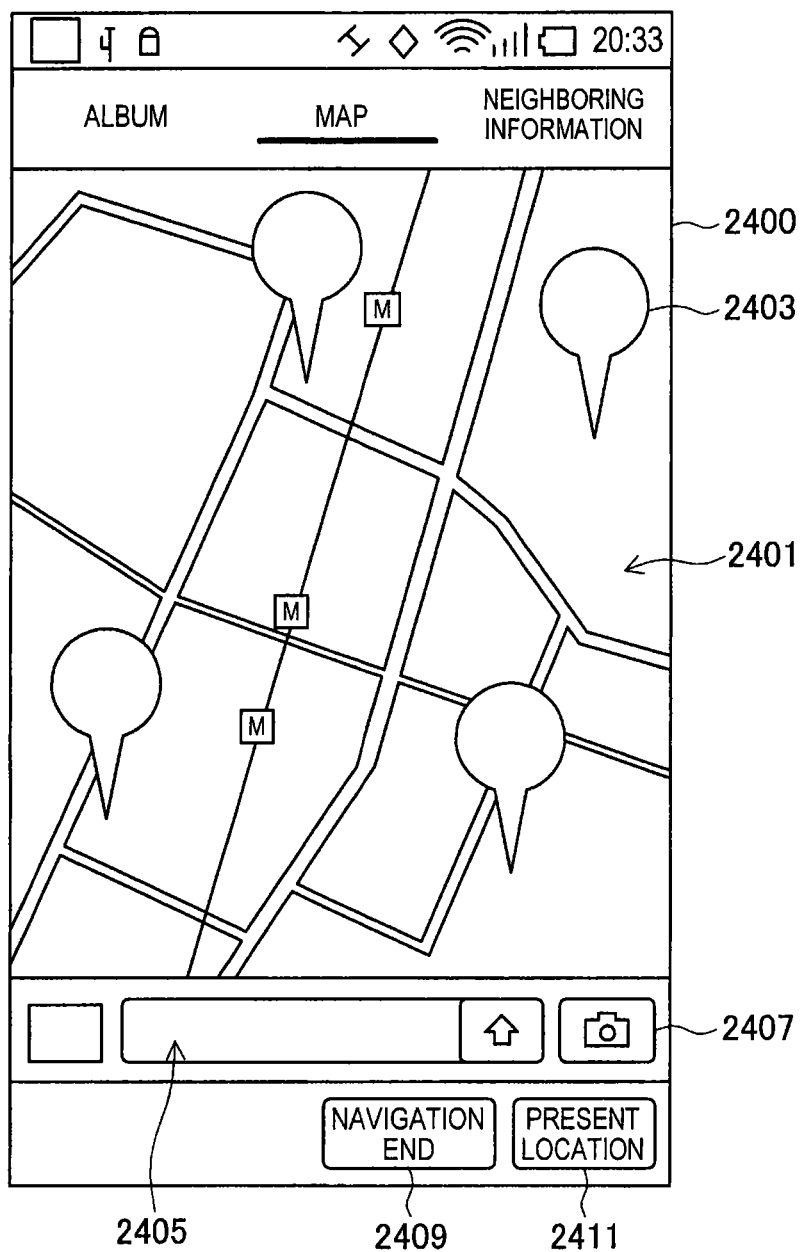
FIG. 32 is a diagram illustrating a fourth example of a navigation display screen according to the third embodiment of the present disclosure.

FIG. 32 is a diagram illustrating a fourth example of the navigation display screen according to the third embodiment of the present disclosure. FIG. 32 shows a navigation screen 2400 displayed in a case where the button "go soon" 2309 is selected in the course information screen 2300 shown in FIG. 31. A map 2401 is displayed on the navigation screen 2400, and a spot display 2403 is displayed on the map 2401. The spot display 2403 displays the "holy site" contained the course, for example. Similarly to the course map 2301 in the above described course information screen 2300, the map 2401 may not necessarily display the route. Further, displayed on the navigation screen 2400 are a comment input field 2405, a camera button 2407, a navigation end button 2409, and a present location button 2411.

In the navigation screen 2400, the user can input the comment by use of the comment input field 2405. The user can also initiate a camera by use of the camera button 2407 to take a photograph. The input comment or taken photograph is registered in association with the user positional information at that time. If this positional information corresponds to the "holy site" contained in the course, the comment or photograph is registered as the user comment or photograph at the "holy site" and may be compared with the comment or photograph of another user, for example, in a manner of the screen 2050 shown in FIG. 28. On the other hand, if the positional information does not correspond to the "holy site" contained in the course, the user may be able to select whether that place is registered as a new "holy site", that is, as a content stage newly found by the user, or as a place for meal or rest independent from the "holy site".

If the navigation end button 2409 is selected, the navigation is ended, and the course information is generated on the basis of the information on the route the user has gone through and the information such as the photograph or comment taken or input at the spot including the "holy site" on the way of the route. Whether or not to register the generated course information may be selected by the user by way of a course registration screen not shown in the figure. In the case of registering the course, the title of the course or the comment is input and a tag or a publication range may be set in the course registration screen. If the present location button 2409 is selected, the map 2401 is made to return to the display centering on the present location.

Figure 33:
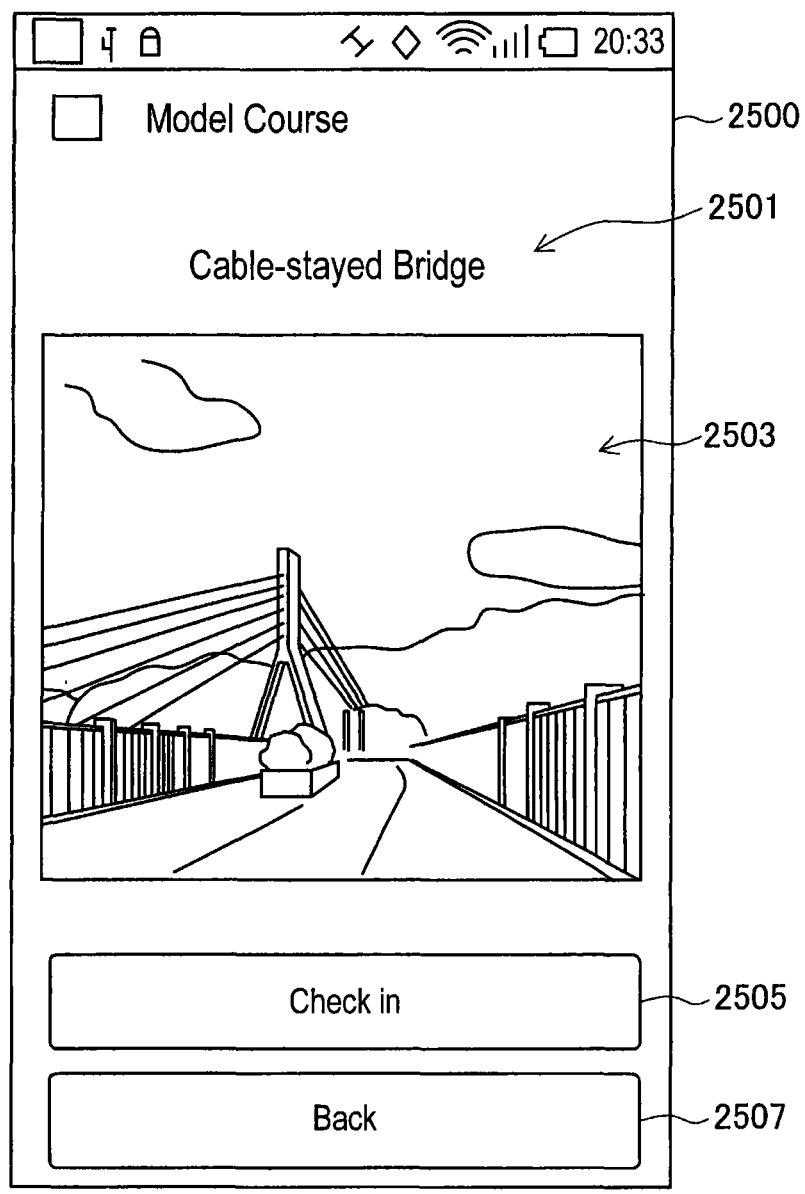
FIG. 33 is a diagram illustrating a fifth example of a navigation display screen according to the third embodiment of the present disclosure.

FIG. 33 is a diagram illustrating fifth example of the navigation display screen according to the third embodiment of the present disclosure. FIG. 33 shows a check-in screen 2500 displayed when the user actually visits the course while referring the navigation screen 2400 shown in FIG.

32, and reaches a predetermined spot, for example, a "holy site". Reach of the user to a predetermined spot may be determined by, for example, a positioning function utilizing the GPS (Global Positioning System) built in a portable terminal of the user or the like.

Displayed on the check-in screen 2500 area a spot name 2501, a spot image 2503, a check-in button 2505, and a back button 2507. The spot name 2501 and the spot image 2503 may be, for example, those registered as the course information. In the case of the above "holy site", the spot image 2503 may be a captured image of the content shot at that place. If the check-in button 2505 is selected, the user can check in that spot. The checking-in may by simply a memory or may be means for acquiring an incentive item as described below.

Figure 34:
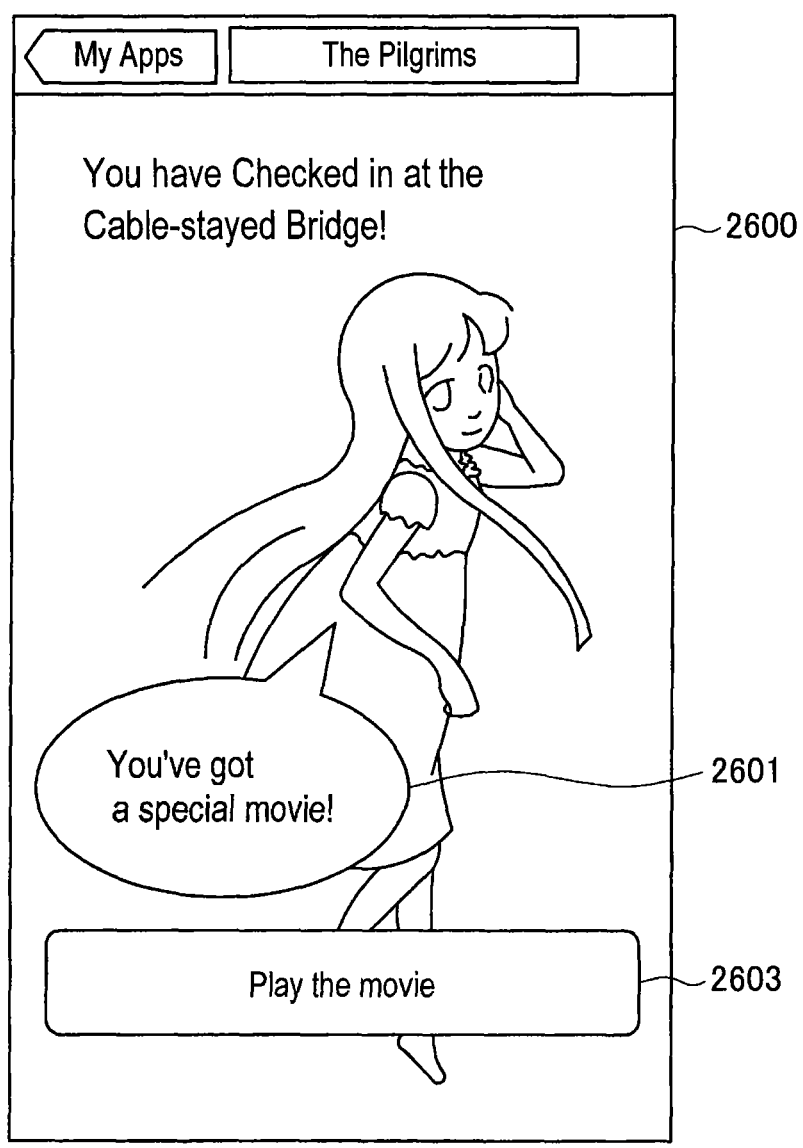
FIG. 34 is a diagram illustrating a sixth example of a navigation display screen according to the third embodiment of the present disclosure.

FIG. 34 is a diagram illustrating a sixth example of the navigation display screen according to the third embodiment of the present disclosure. FIG. 34 shows an item acquisition screen 2600 displayed in a case where the user checks in a predetermined spot from the check-in screen 2500 shown in FIG. 33. An item acquisition button 2603 is displayed together with a message 2601 on the item acquisition screen 2600. In the example shown, if the item acquisition button 2603 is selected, a special moving picture can be viewed. This moving picture may be, for example, one accessible only to the item acquisition screen 2600 and incapable of storage in the user's terminal because of being distributed in streaming. In reproducing the moving picture, a condition may be set such as that the user is in a state of checking in a predetermined spot by checking again the user positional information.

Figure 35:
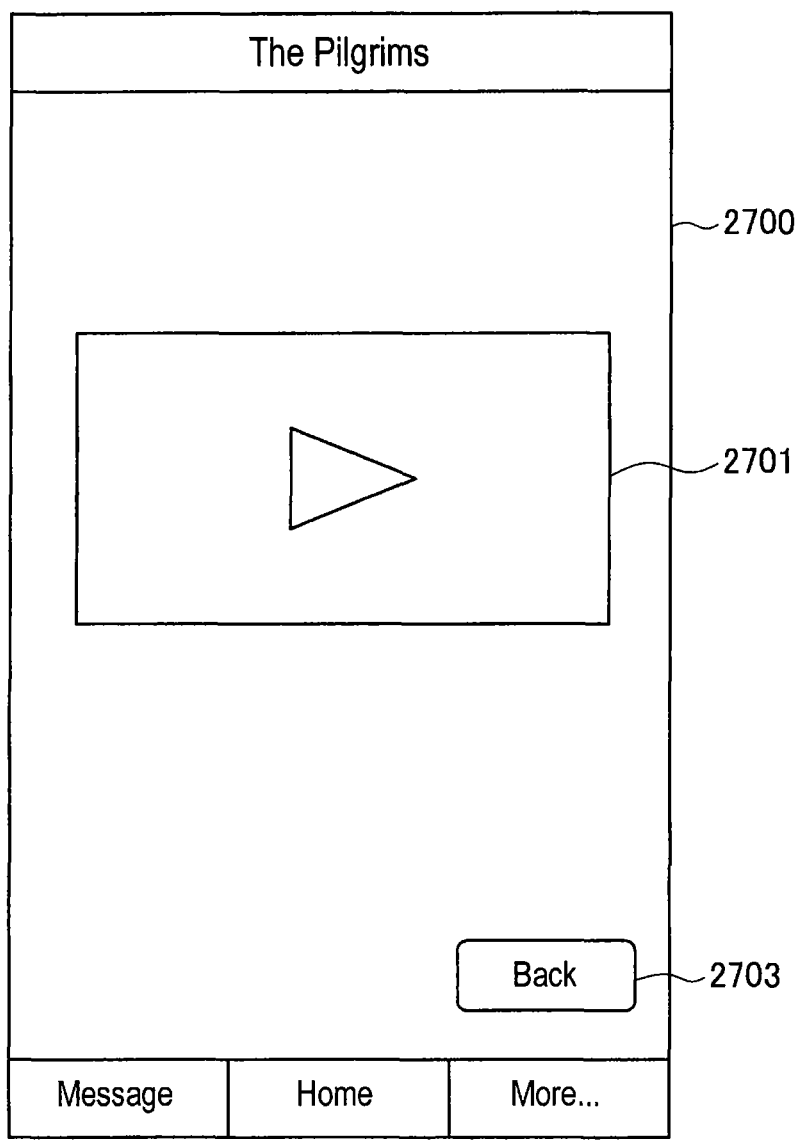
FIG. 35 is a diagram illustrating a seventh example of a navigation display screen according to the third embodiment of the present disclosure.

FIG. 35 is a diagram illustrating a seventh example of the navigation display screen according to the third embodiment of the present disclosure. FIG. 35 shows a moving picture reproduction screen 2700 displayed in a case where the user selects the item acquisition button 2603 in the item acquisition screen 2600 shown in FIG. 34. A moving picture screen 2701 and a back button 2703 are displayed on the moving picture reproduction screen 2700. This example shows a case where the incentive item acquirable by checking in a certain spot, for example, "holy site" is a moving picture. The incentive item is not limited to this example and may be a still image or voice, for example.

According to the third embodiment of the present disclosure described above, the user can readily obtain a hint for a trip ("pilgrimage") with the purpose of "touring places used as content stage". The result of the "pilgrimage" can be shared between the users, allowing a communication using the "pilgrimage" as medium to be activated. Moreover, in addition to the spot ("holy site") set to the course in advance, the "holy site" independently found by the user can be added to the course, allowing the course of the "pilgrimage" to be enriched by use of collective wisdom of the users.

3. Usable Technology

Next, a description is given of some technologies which may be usable for providing the display screen described in the some embodiments above.

3-1. Journey Division

First, with reference to FIG. 36 to FIG. 41, a journey division technology is described. In the embodiment as described above, for example, the photograph or comment included in the travel report of when the user visited the course is divided into journey sections in the course information screens illustrated in FIG. 6, FIG. 22, and FIG. 27. The display like this allows, for example, the user (including the user himself/herself having visited the course) browsing the course information to readily figure out the journey.

Setting of the journey section as above is preferably made in line with the user's behavior. For example, if the user takes a meal and a dessert at the same place, it is natural for the user browsing the course information that information concerning those events (e.g., photograph of dish, impression by the user) is included in the same journey section.

However, for example, in a case where the journey section is set on the basis of a time stamp of the photograph or comment as the information provided by the user, there have been cases where the user's behavior not appearing in the photograph or comment is not reflected to the journey section, or the journey section is not correctly set if a difference in frequency of being provided with the photograph or comment is low. As an example of the former, in the above example of the restaurant, chatting with an accompanying friend for a long time between the meal and the dessert may possibly cause the meal and the dessert to be separate events. As an example of the latter, because of continuously taking photographs the whole time due to many rare things, or taking few photographs due to many photography prohibited areas, a place really leaving impression may not be possibly recognized correctly as the journey section.

Therefore, the example of the present technology proposes a method for calculating a moving speed of the user on the basis of the positional information history provided by the user, and distinguishing between a staying period and moving period of the user on the basis of the moving speed. The staying period is a period for which moving of the user is small, and estimated to be a period for which the user may stay in a spot anywhere. The moving period is a period for which moving of the user is large, and estimated to be a period for which the user may move between the spots. By way of an approach of journey division like this, the journey division in line with user's actual behavior can be achieved with a simple process. A description is given below of a procedure of the present technology with reference to specific data examples.

(Calculating and Smoothing of Moving Speed)

Figure 36:
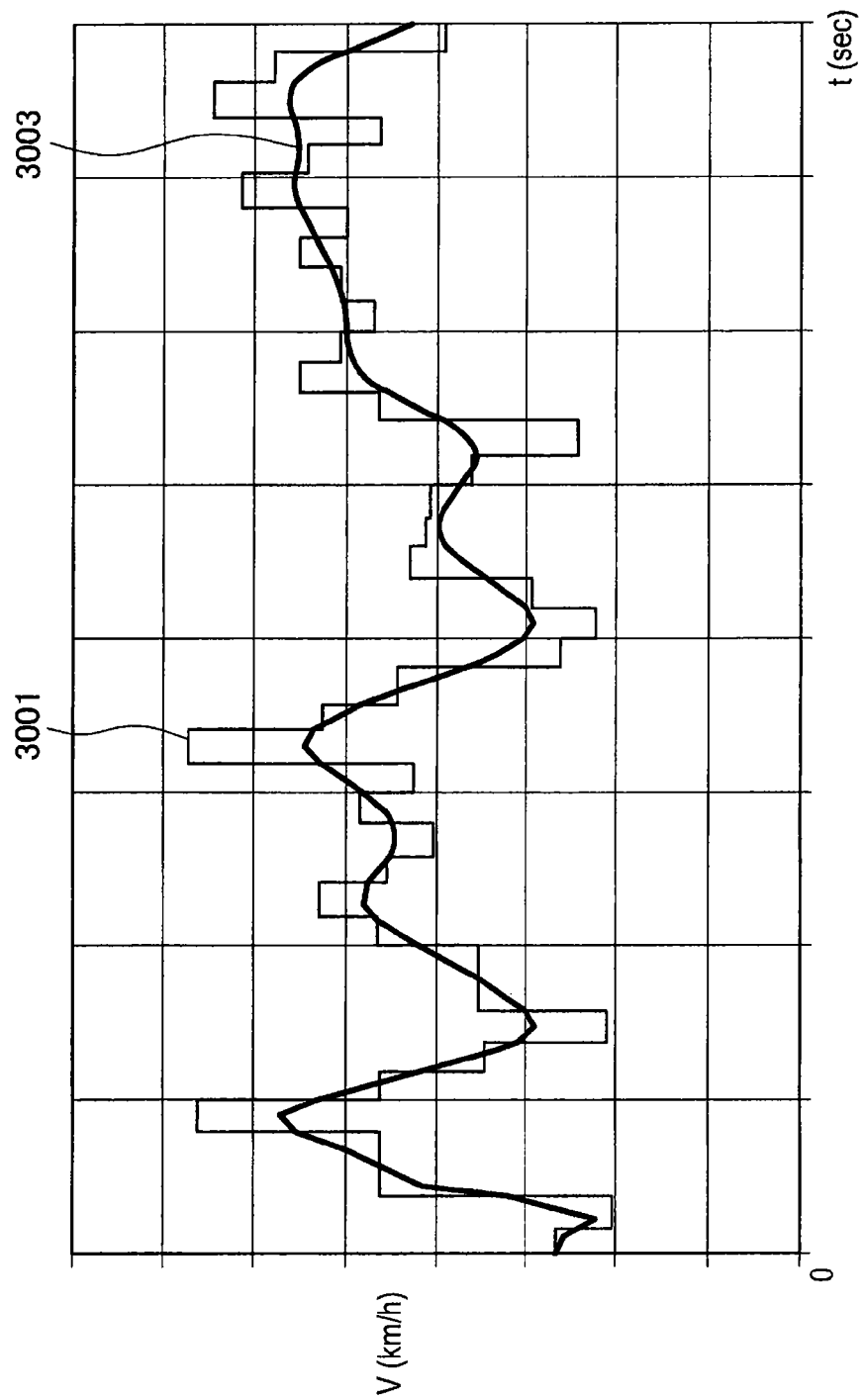
FIG. 36 is a graph illustrating a process of smoothing a moving speed calculated on the basis of a user positional information history.

FIG. 36 is a graph illustrating a process of smoothing a moving speed calculated on the basis of the user positional information history. In this example, the moving speed of the user is calculated by calculating a distance between points indicated by a lapse time (time stamp difference) and data between the nth data and the n−1th data in the user positional information history to find distance/lapse time. Therefore, as shown in FIG. 36, a moving speed 3001 is a discrete value calculated for each period provided with the positional information. The moving speed 3001 like this is smoothed by use of an approach such as curve approximation (Bezier curve approximation or the like) or a low-pass filter, for example, to obtain a smoothing moving speed 3003 from which a speed variation component for a short time is removed.

Figure 37:
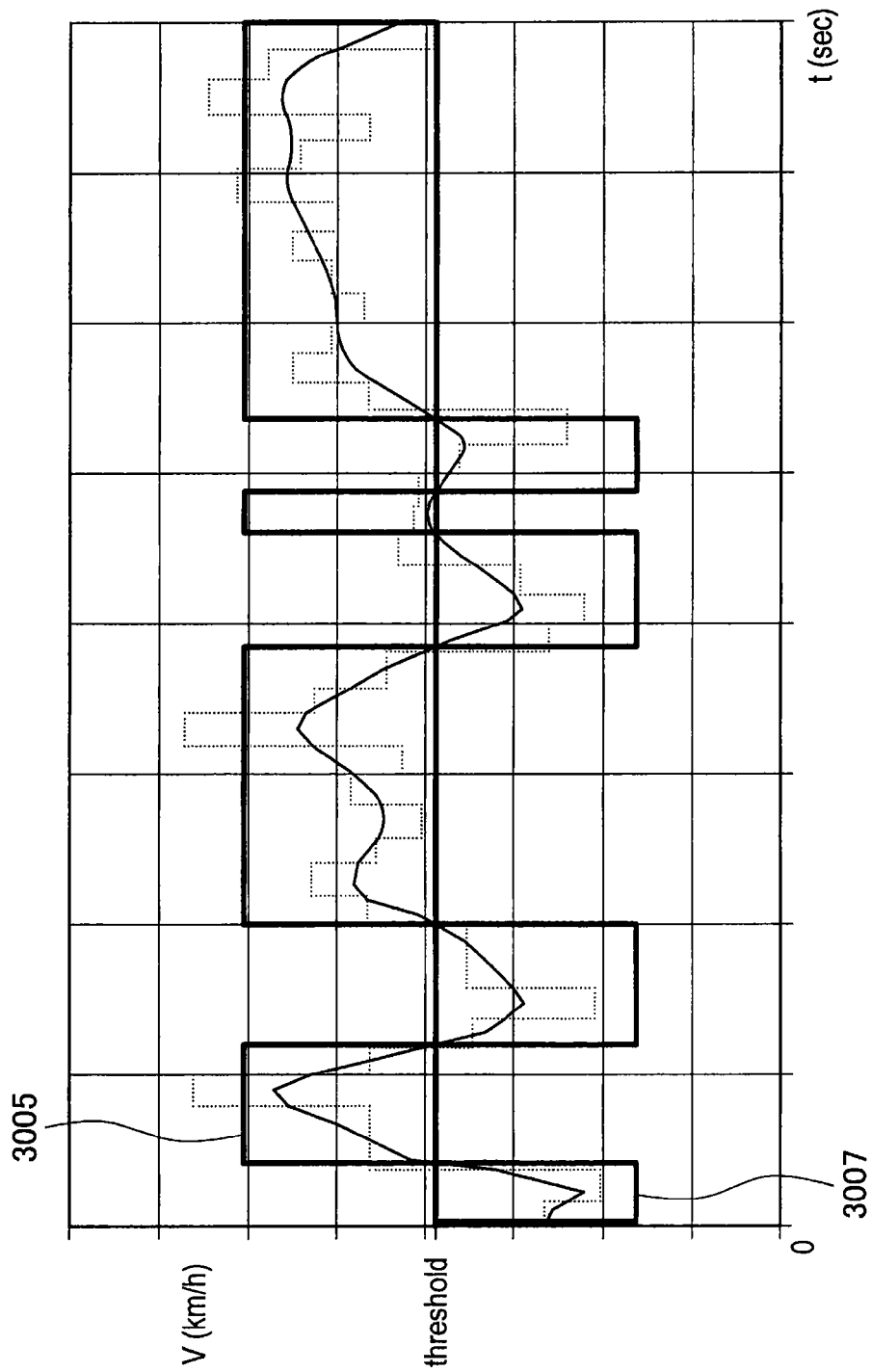
FIG. 37 is a graph illustrating a process of distinguishing between a staying period and a moving period on the basis of a user moving speed.

FIG. 37 is a graph illustrating a process of distinguishing between the staying period and the moving period on the basis of the user moving speed. As shown in FIG. 37, in this example, a threshold is set for the moving speed of the user, and a period larger while the smoothing moving speed 3003 is larger than the threshold is distinguished as a moving period 3005 and a period for which the smoothing moving speed 3003 is smaller than the threshold is distinguished as a staying period 3007. The threshold used here is a threshold for separating a moving speed in a case where the user stays still and a moving speed in a case the user is moving. The threshold may be a value experimentally defined or may be a value calculated on the basis of the frequencies of staying still and moving for each moving speed in a behavior recognition result, as described later.

Figure 38:
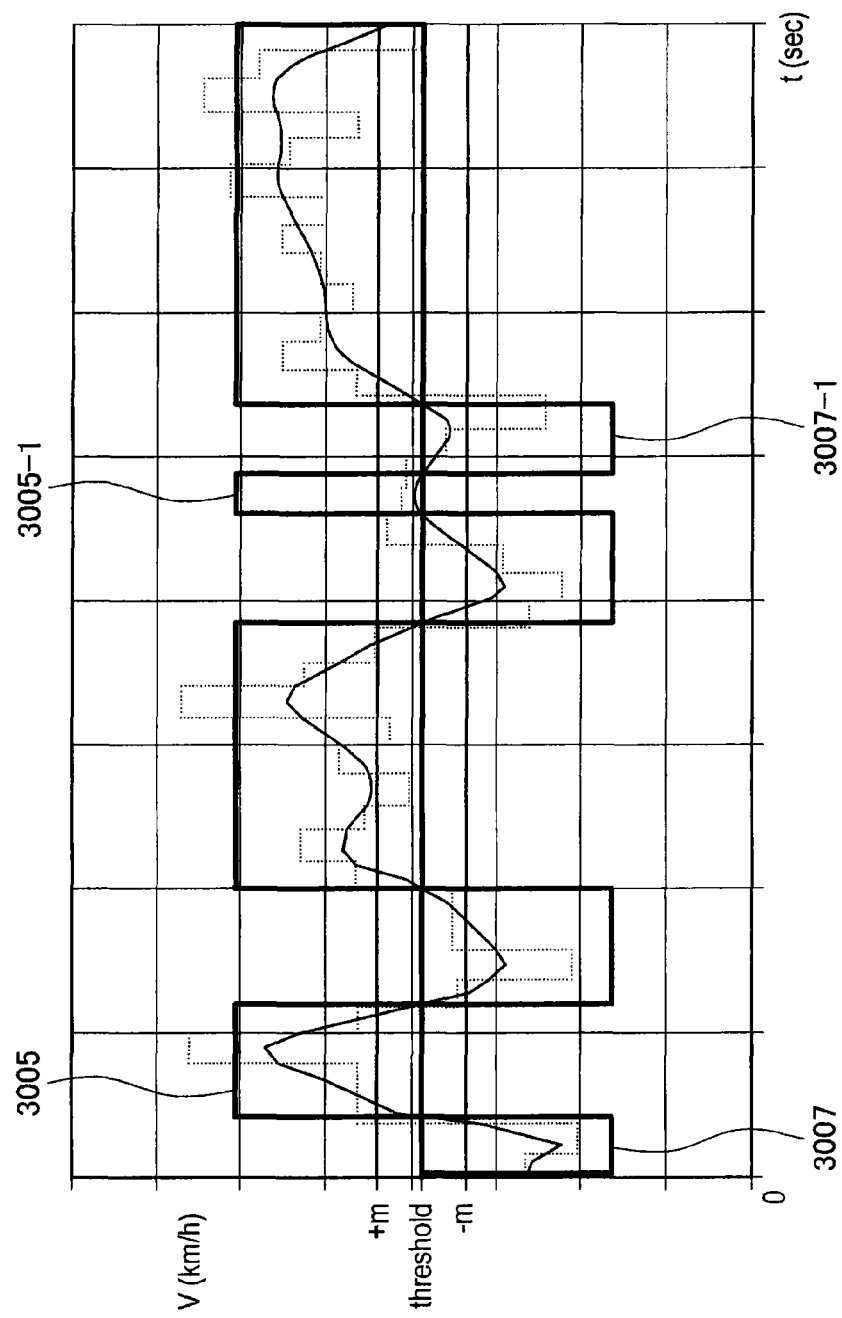
FIG. 38 is a graph illustrating a process of correcting variation around a threshold for the staying period and moving period distinguished on the basis of moving speed.
Figure 39:
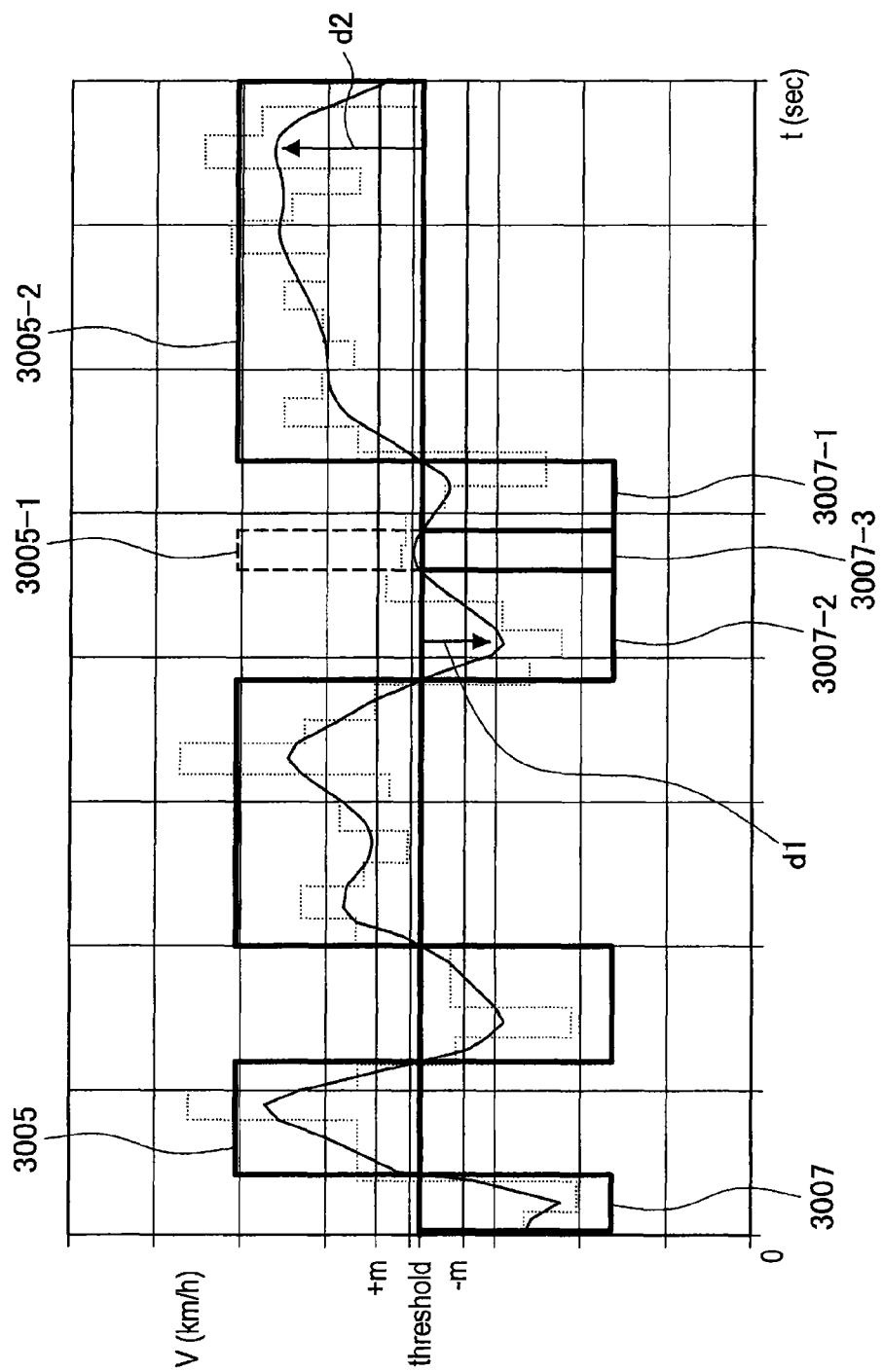
FIG. 39 is a graph illustrating a process of correcting variation around a threshold for the staying period and moving period distinguished on the basis of moving speed.

FIG. 38 and FIG. 39 are a graph illustrating a process of correcting a variation around the threshold for the staying period and moving period distinguished on the basis of the moving speed. If distinguishing between the staying period and a walking period on the basis of the threshold of the moving speed as above, in a case where the moving speed value varies around the threshold, the staying period and the moving period alternately may occur in a short time to bring about the journey division not conforming to the user's behavior in some cases.

Therefore, in this case, as shown in FIG. 38, positive and negative margin values (+m, −m) are set to the threshold, and the moving period 3005 whose local maximum value of the smoothing moving speed 3003 is equal to or less than the positive margin value (threshold+m) is extracted as a candidate moving period 3005-1. Similarly, the staying period 3007 whose a local minimum value of the smoothing moving speed 3003 is equal to or more than the negative margin value (threshold−m) is extracted as a candidate staying period 3007-1.

The extracted candidate moving period 3005-1 and candidate staying period 3007-1 are combined with a previous or next moving period 3005-2 or staying period 3007-2 as shown in FIG. 39. In the example shown, the candidate moving period 3005-1 and the candidate staying period 3007-1 continuous to each other are lumped together and combined with any of the staying period 3007-2 previously positioned or the moving period 3005-2 next positioned.

Here, which period is to be a combined destination may be determined on the basis of a difference between the threshold and the local minimum value or local maximum value of the smoothing moving speed 3003 for each period. For example, the period having smaller difference between the threshold and the local minimum value or local maximum value of the smoothing moving speed 3003 may be selected to be the combined destination. In the case of the example shown, a difference d2 between the threshold and the local minimum value of the smoothing moving speed 3003 in the staying period 3007-2 is smaller than a difference d1 between the threshold and the local maximum value of the smoothing moving speed 3003 in the moving period 3005-2. Therefore, the candidate moving period 3005-1 and the candidate staying period 3007-2 are combined to the staying period 3007-2. In the example shown, the candidate moving period 3005-1 is changed into a staying period 3007-3, and the staying periods 3007-1, 3007-2, and 3007-3 form one continuous staying period.

In the above example shown, as a result of that two candidate periods to be combined continue in the order of the staying period (3007-2) having the local minimum value equal to or less than the margin value→the moving period (3005-1) having the local maximum value less than the margin value→the staying period (3007-1) having the local minimum value exceeding the margin value→the moving period (3005-2) having the local maximum value exceeding the margin value, kinds of the previous or next periods to the candidate period, the staying period and the moving period, are different, and thus, the combined destination is selected on the basis of the difference from the threshold as above This process can be applicable to a case where the number of the continuous candidate periods to be combined is an even.

On the other hand, for example, in a case where there is one candidate period to be combined in the order of the staying period having the local minimum value equal to or less than the margin value→the moving period (i.e. candidate period) having the local maximum value less than the margin value→the staying period having the local minimum value equal to or less than the margin value, kinds of the previous or next periods to the candidate period are both the staying period, and thus, it is not necessary to select which the candidate period is combined with. In such a case, the candidate period is combined with both the previous or next staying periods and three sections are made into one continuous staying period. This process can be applicable to a case where the previous or next periods are the moving period and the candidate period is the staying period and a case where the number of the continuous candidate periods is an odd.

Figure 40:
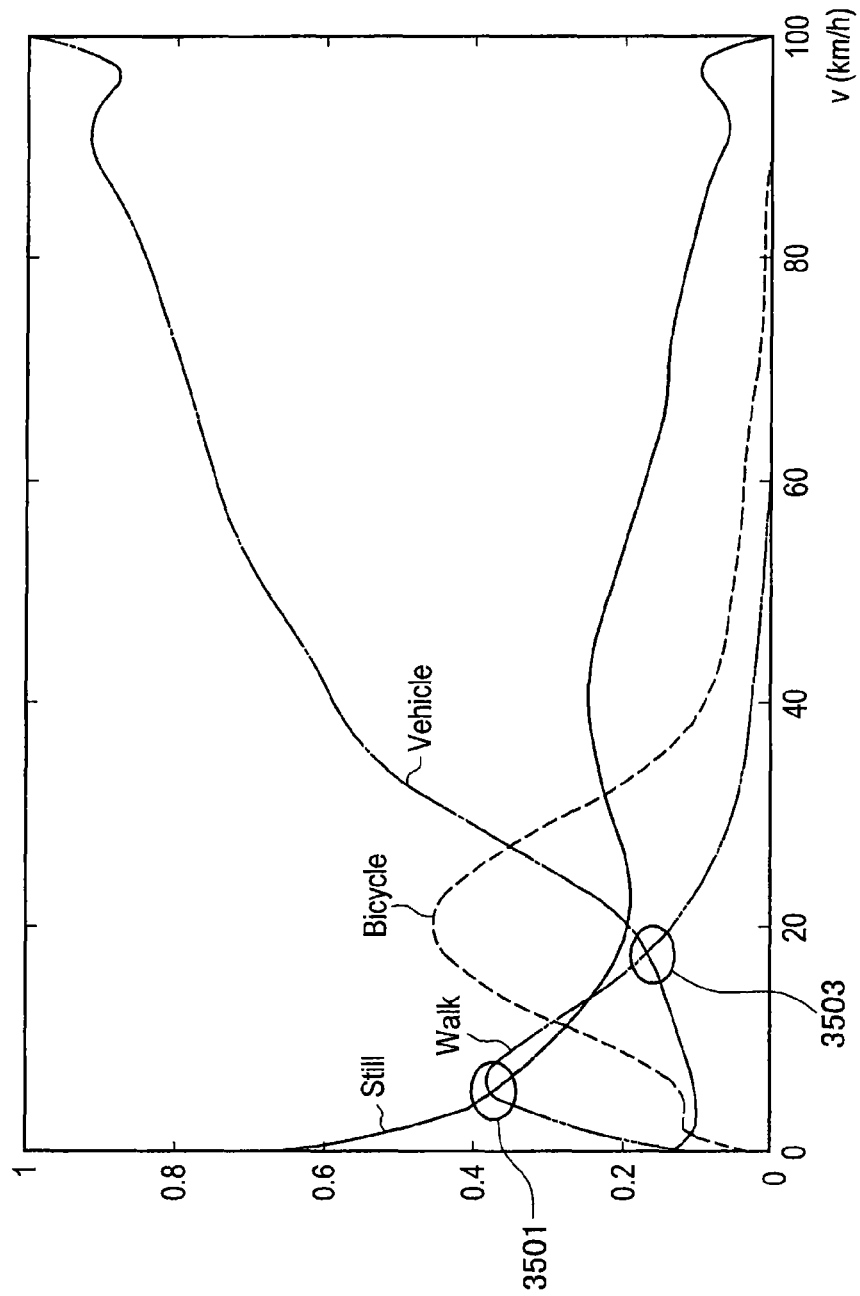
FIG. 40 is a diagram for explaining an example of calculating a threshold of the moving speed for journey division.

FIG. 40 is a diagram for explaining an example of calculating a threshold of the moving speed for the journey division. As described above, the threshold of the moving speed for the journey division may be a value experimentally defined or may be a value calculated on the basis of the frequencies of staying still and moving for each moving speed in a behavior recognition result. FIG. 40 is a behavior frequency for each moving speed of the user calculated by a certain type of behavior recognition engine. In this example, in a case where the moving speed of the user is close to zero, the frequency (still) of the user staying still is the highest. As the moving speed is further larger, the frequency (walk) of the user walking is higher than the above. An intersection 3501 of the frequency of staying still (still) and the frequency of walking (walk) shown on the graph may be used, as a threshold for distinguishing between the staying period and the moving period described above, for example. As another example of the journey division as described above, in a case where a period for which the user is walking and a period for which moving with a vehicle are distinguished, an intersection 3503 of the frequency of walking (walk) and a frequency of vehicle moving (vehicle) shown on the graph may be used as a threshold for distinguishing these periods.

In this way, the setting of the threshold on the basis of the behavior recognition result allows more appropriate threshold to be set in line with the user's behavior. For the setting of the threshold, the behavior recognition result of the user himself/herself may be used, and an average behavior recognition result for a user group including/excluding the user may be used. In the case of using the behavior recognition result of the user himself/herself, in terms of a walking speed or a speed of a vehicle to be ridden, for example, feature of the user's behavior may be reflected to the setting of the threshold to achieve a more appropriate journey division process personalized for the user. In the recognition result from the existing behavior recognition engine shown in FIG. 40, the behavior frequencies of staying still and walking are not clearly separated in a part. However, further improvement of the behavior recognition engine may allow the behaviors to be more accurately classified so that it is expected that a more appropriate value can be set also for the threshold set on the basis of the behavior recognition result in the journey division.

Figure 41:
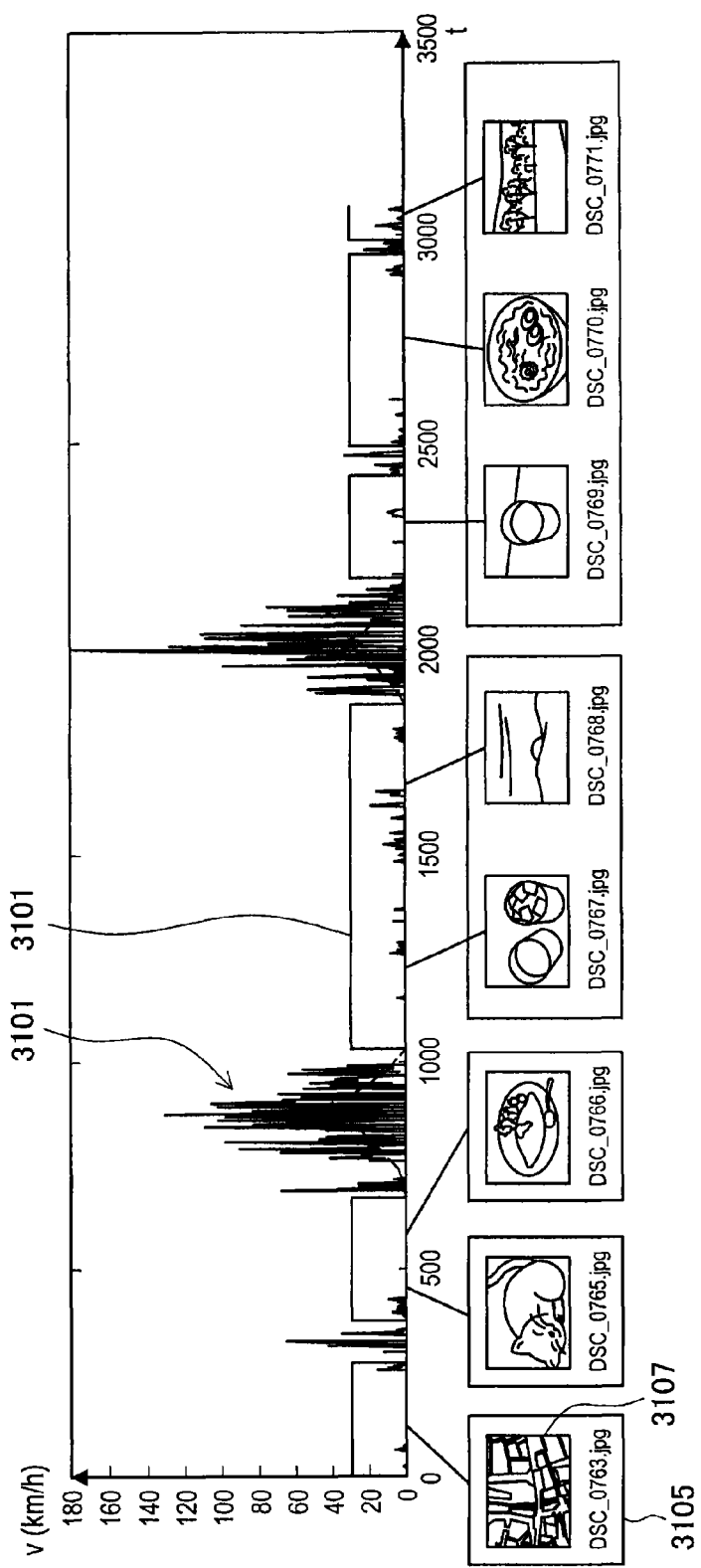
FIG. 41 is a diagram for explaining an embodiment of a journey division technology.

FIG. 41 is a diagram for explaining an embodiment of the journey division technology. In the example shown in FIG. 41, staying periods 3103 in the journey of the user are identified on the basis of moving speeds 3101 calculated on the basis of the user positional information history, on the basis of these staying periods journey sections 3105 are set, and photographs 3107 taken by the user are classified for each of the journey sections 3105. In the example shown, since photographing times of the photographs 3107 (indicated by a line connecting the photograph 3107 and a time axis) are scattered, a single journey section including all the photographs 3107 may be possibly set in the setting of the journey section on the basis of the photographing time, for example. Even in such a case, the journey division technology as above may be used to divide the journey on the basis of the staying period the user, allowing the photographs 3107 taken by the user to be classified into the same journey section 3105 to be able to achieve the more reasonable setting of the journey section 3105.

3-2. Positional Noise Removal

Next, with reference to FIG. 42 to FIG. 47, a description is given of a positional noise removal technology. In the case of utilizing the above described journey division technology, it is not preferable that noise data is included in the positional information because the moving speed calculated on the basis of the user positional information history has an important meaning. If the user is recognized by mistake to have temporarily existed at a position far off the actual moving pathway due to the noise data, the moving speed previous or next thereto becomes larger than it is. The smoothing by the curve approximation or low-pass filter is effective, but accuracy of processing result is obviously improved as the noise data inherently included becomes low.

In application sharing the course information described above, the route the user has gone through is displayed on the map. This route is generated on the basis of the user positional information history, for example, but if the positional information history includes the noise data, an unnatural route partially off the actual moving pathway of the user is generated. For example, in a case where it is determined that the user moves between predetermined landmarks such a cross street, the data for the route off the one in moving between the landmarks can be removed as the noise data, but not in such a case but in a case where it is unknown from where to where the user moves, the noise data is difficult to remove.

However, from the nature of positioning means for acquiring the user positional information, the positional information history frequently includes the noise data. For example, in positioning using an NSS (Navigation Satellite System) including the GPS, if radio wave reception from a satellite is bad, positional accuracy is lowered. In positioning utilizing a radio field intensity from a base station of Wi-Fi, the radio field intensity from the base station varies due to environmental factors such that the positional accuracy is not stable and the base station itself moves possibly to generate large noise data.

Therefore, the example of the present technology proposes a method for easily finding the noise data on the basis of data (time, latitude and longitude) included in the positional information acquired by the user and removing thereof. A description is given below of a procedure of the present technology with reference to specific data examples.

Figure 42:
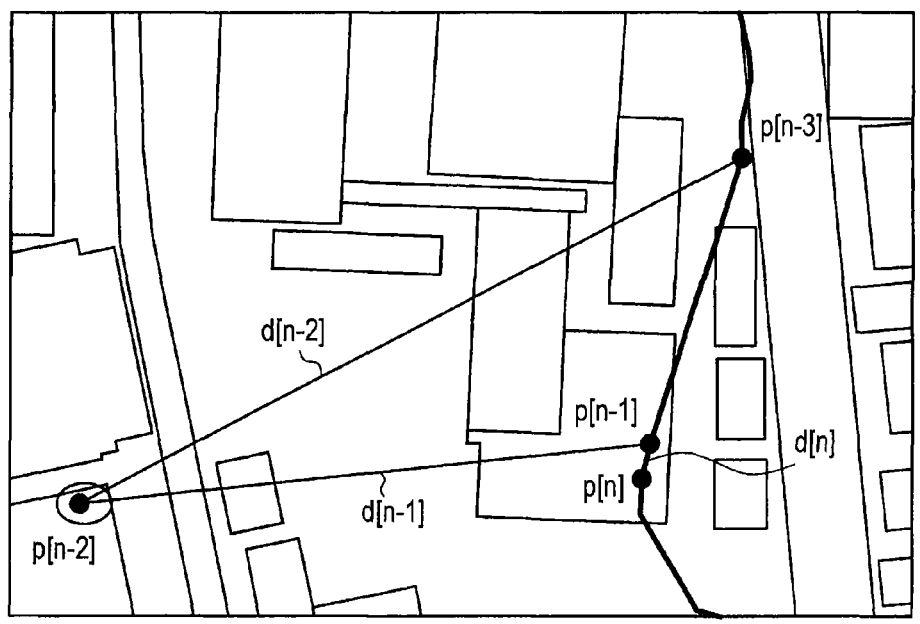
FIG. 42 is a diagram for explaining exemplary noise data mixed into the positional information history.
Figure 43:
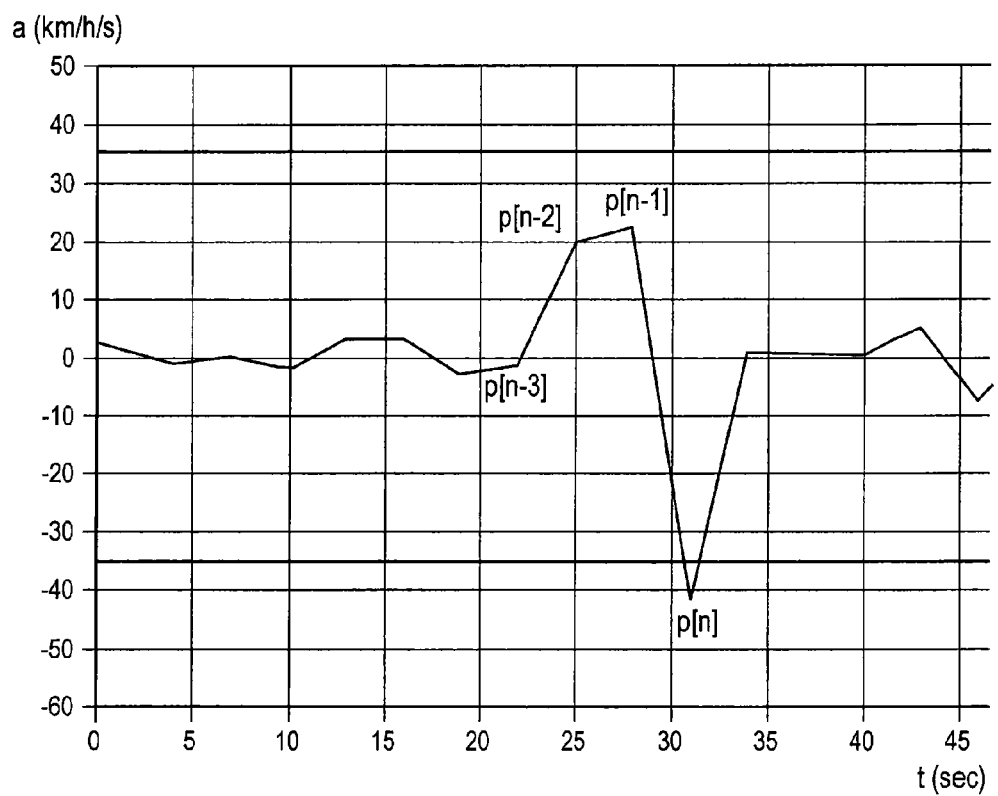
FIG. 43 is a diagram for explaining exemplary noise data mixed into the positional information history.

FIG. 42 and FIG. 43 are a diagram for explaining exemplary noise data mixed into the positional information history. In the example shown in FIG. 42, the positional information is provided for four positions p[n−3] to p[n], where p[n−3], p[n−1], and p[n] are positioned along the actual moving pathway of the user while p[n−2] is far off the moving pathway for the reason described above, for example. In the case like this, the positional information corresponding to p[n−2] is the noise data. Distances to positions previous or next to p[n−2] (distance d[n−2] to p[n−3], and distance d[n−1] to p[n−1]) are large as compare with a distance previous or next thereto, a distance d[n] between p[n−1] and p[n], for example, and therefore, the moving speed of the user calculated on the basis of the distance between the positions also becomes larger the it is.

The example of the present technology uses the moving acceleration of the user shown by the positional information history to identify the noise data like the above p[n−2]. FIG. 43 is a graph indicating variation of the moving acceleration of the user in the example in FIG. 42. The moving acceleration of the user is calculated in a manner that a distance between the points is calculated which are represented by the lapse time (time stamp difference) and the data between the nth data and the n−1th data of the user positional information history to find distance/lapse time such that a moving speed v[n] is calculated, and further a moving speed v[n−1] is obtained by similarly calculating between the n−1th data and the n−2th data of the positional history and information speed variation |v[n]−v[n−1]| is divided by the lapse time. It should be noted here that the lapse time between pieces of the data may not be uniform in some cases. For example, if the radio wave reception of the GPS is bad, a GPS receiver repeatedly tries to receive the radio wave to cause time to be taken for the positional information, or if the positional information is not identified by the GPS, switching to the Wi-Fi is performed to prolong the lapse time between pieces of the data.

Here, in the example in FIG. 43, a large negative acceleration is recorded between p[n−1] and p[n−2]. This indicates that, as shown in FIG. 42, the user instantly moves from p[n−2] off the actual moving pathway to p[n−1] on the moving pathway, which is because the moving speed in this section becomes larger than that previous or next thereto, for example, the moving speed from p[n−1] to p[n]. On the other hand, a large positive acceleration may be considered to be recorded between p[n−3] and p[n−2] for the same reason, but not in fact. This is because, for example, the time is taken for obtaining the positional information at p[n−2] to prolong the lapse time from p[n−3] to p[n−2] as described above. In a process described below, such a case is taken into account and the distance between the points is used as a condition in combination with the moving acceleration to remove the noise data.

Figure 44:
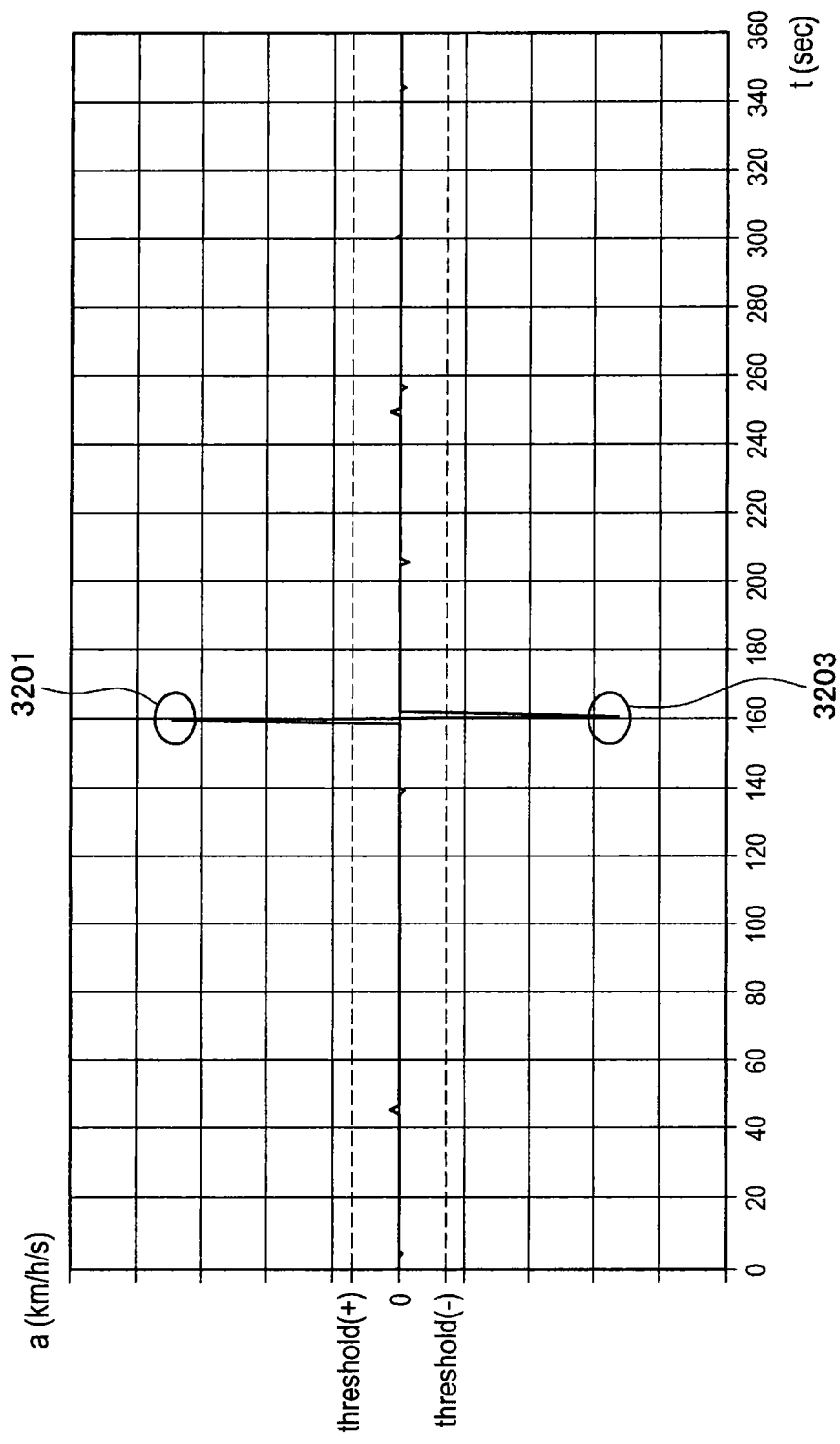
FIG. 44 is a graph for explaining a threshold set to a moving acceleration.

FIG. 44 is a graph for explaining the threshold set for the moving acceleration. In the example shown in FIG. 44, a positive threshold (threshold (+)) and a negative threshold (threshold (−)) are set for the moving acceleration of the user, and a point 3201 where the moving acceleration exceeds the positive threshold and a point 3203 where the moving acceleration falls below the negative threshold are detected. This is because, as described above, since the position detected is far off the actual moving pathway of the user when the noise data is generated, a large positive or negative acceleration is recorded at the point of the noise data or at the points previous or next thereto (not necessarily immediately previous or next to the noise data, unlike the above example).

Figure 45:
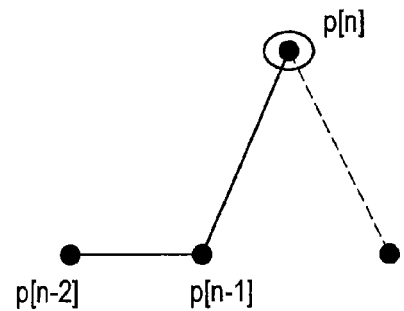
FIG. 45 is a diagram illustrating a first example of a removal process for the noise data.

FIG. 45 is a diagram illustrating a first example of a removal process of the noise data. In the example shown in FIG. 45 acceleration exceeding the positive threshold (threshold (+)) (that is, rapid increase of the moving speed of the user) at the point p[n] is recorded. Such a state occurs when, for example, the accuracy of the positional information is lowered at the point p[n], but an acquisition interval of the positional information is not varied. In moving from the point p[n−1] to the point p[n], the position becomes far off the preceding moving pathway, which causes the moving distance to rapidly increase in spite of the same time interval, recording the large acceleration. Therefore, in this case, data for the point p[n] is estimated to be the noise data. Thus, the data for the point p[n] may be removed as the noise data from the user positional information history.

Figure 46:
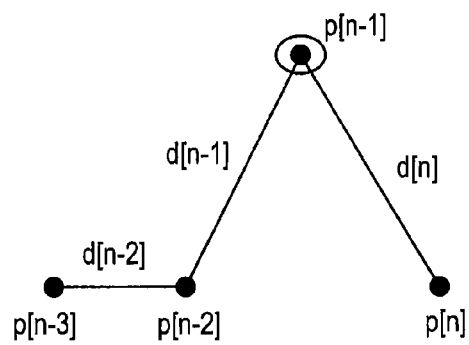
FIG. 46 is a diagram illustrating a second example of a removal process for the noise data.

FIG. 46 is a diagram illustrating a second example of the removal process of the noise data. In the example shown, the acceleration falling below the negative threshold (threshold (−)) (that is, rapid decrease of the moving speed of the user) at the point p[n] is recorded. The distance d[n−2] from the point p[n−3] to the point p[n−2] is the smallest as compared with the moving distances d[n−1] and d[n] in other sections. Such a state may occur when the accuracy of the positional information is lowered at the point p[n−1] as well as the acquisition interval of the positional information is slightly prolonged, and the time is further taken for obtaining the positional information although the accuracy of the positional information is recovered at the point p[n]. Since the acquisition interval of the positional information is longer than that in the example in FIG. 45 above between the point p[n−2] and the point p[n−1], the acceleration as much exceeding the positive threshold (threshold (+)) is not recorded. On the other hand, between the point p[n−1] and the point p[n], even if the moving distance d[n] is comparable with the immediately previous moving distance d[n−1], the acquisition interval of the positional information is further prolonged to decrease an apparent speed and generate a largely reduced speed. Therefore, in this case, data for the point p[n−1] is estimated to be the noise data. Thus, the data for the point p[n−1] may be removed as the noise data from the user positional information history.

Figure 47:
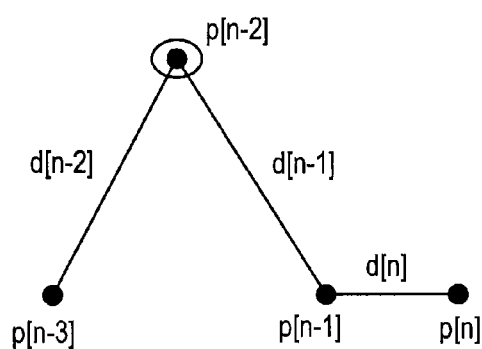
FIG. 47 is a diagram illustrating a third example of a removal process for the noise data.

FIG. 47 is a diagram illustrating a third example of the removal process of the noise data. In the example shown, the acceleration falling below the negative threshold (threshold (−)) at the point p[n] is recorded. The distance d[n] from the point p[n−1] to the p[n] is the smallest as compared with the moving distances d[n−2] and d[n−1] in other sections. Such a state may, which is the same state as the examples shown in FIG. 42 and FIG. 43, occurs when, for example, the accuracy of the positional information is lowered at the point p[n−2] as well as the acquisition interval of the positional information is prolonged, and the accuracy of the positional information and the acquisition interval are recovered at the point p[n−1]. In this case, since the acquisition interval of the positional information is more prolonged between the point p[n−3] and the point p[n−2] than in the above example in FIG. 45, the acceleration as much exceeding the positive threshold is not recorded though the speed is increased. Similarly, the acquisition interval of the positional information is also prolonged between the point p[n−2] and the point p[n−1], large variation of the acceleration is not recorded. However, since the acquisition interval of the positional information is recovered between the point p[n−1] and the point p[n] as well as the position is acquired on the original moving pathway, the moving distance d is also reduced to decrease the apparent speed and generate the largely reduced speed. Therefore, in this case, data for the point p[n−2] is estimated to be the noise data. Thus, the data for the point p[n−2] may be removed as the noise data from the user positional information history.

The procedure of the above described noise data removal process can be summarized as follows.

(1) Time-series data of the acceleration to the point p[n] is generated from the user positional information history.

(2) The acceleration is determined whether or not to exceed the positive or negative threshold in the data for the point p[n] generated at (1).

(3) If the acceleration exceeds the threshold at (2) and is larger than the positive threshold, the data for the relevant point (p[n]) is removed as the noise data.

(4-1) If the acceleration exceeds the threshold at (2) and is smaller than the negative threshold, the moving distances d[n−2] to d[n] among recent 4 points (p[n−3] to p[n]) are calculated.

(4-2) If the distance d[n] is the smallest in the distances calculated at (4-1), the data for the point p[n−2] is removed as the noise data.

(4-3) If the distance d[n−2] is the smallest in the distances calculated at (4-1), the data for the point p[n−1] is removed as the noise data.

(5) n=n+1 is set and the processes from (1) to (4) are repeated.

4. Functional Configuration

Next, a description is given of a functional configuration for achieving some embodiments of the present disclosure described above. FIG. 48 illustrates a functional configuration relating to the above embodiments for the server 100 included in the system 10 shown in FIG. 1. As described above, the server 100 is implemented by one or more server devices, and the functional configurations for which may be dispersively achieved in a plurality of information processing apparatuses. The server 100 may include a functional configuration other than those described here for achieving, for example, a function other than those relating to the above embodiments. A functional configuration of the terminal device 200 can be applied with functional configurations of various known terminal devices, and a detailed description thereof is omitted.

The server 100 includes at least a course setting unit 110, a course information generation unit 120, and a course information provision unit 130. The server 100 may further include a place identification unit 140, a route identification unit 150, and/or a course information update unit 160. Each of these units may be implemented by that a CPU (Central Processing Unit) operates according to a program, in a case where, for example, a server device constituting the server 100 is implemented by a hardware configuration of the information processing apparatus described later. Each unit above refers to, for example, a database such as a course DB 112 or course information DB 122 if necessary which is implemented by a storage device included in the information processing apparatus. Each unit above also receives and transmits information to and from the terminal device 200 via, for example, a transmission unit 132 or reception unit 142 implemented by a communication device included in the information processing apparatus.

(Course Setting Unit)

The course setting unit 110 sets a course containing at least one place which is associated with the positional information. Here, the positional information is information for, for example, identifying a position of a certain place on the ground defined by the latitude and longitude (may include further a height). The place is a point or a geographical area where the user does or is expected to do some activity and is referred to also as the "spot" or "holy site" in the embodiments above. In the embodiments of the present disclosure, the place may be defined as a point identified by single positional information (for example, may be defined as a "bridge", a point and a distance from that point, or a geographical area by use of plural pieces of positional information as a boundary (for example, a "range capable of shooting a bridge centering on the bridge").

The course is defined to contain at least one place as described above. Setting of the course may have many variations. For example, in the above third embodiment, as in the case where the course information is provided by the content creator in advance or as in the case where the model course is provided by a tourist agency or the like in the first and second embodiments, the course setting unit 110 may set a course by reading out a given course stored in the course DB 112. Alternatively, in the above embodiments, as in the case where the course is set on the basis of the result of a trip made by a certain user, the course setting unit 110 may set the course on the basis of the information on the place identified by the place identification unit 140 described later. Here, the course setting unit 110 may store the information on the set course in the course DB 112 and later read out for connecting the course information in terms of the course described later.

In a case where the course is defined to contain a plurality of places, an order of the plurality of places may not be necessarily set. Therefore, for example, in a case where the course is defined to contain an "art museum", a "restaurant", and a "cafe", a user visiting first the "art museum", next the "restaurant", and finally the "cafe" and a user visiting first the "cafe", next the "art museum", and the finally "restaurant" may be considered to visit the identical course in some cases. For example, as described later, in a case where the course is set using the result of each user's behavior, course definition may not be exclusive. In other words, the in the case of the course containing the above "art museum", "restaurant", and "cafe", a user visiting only these places, a user visiting, in addition to these places, the "observatory", and a user visiting, in addition to these places, the "souvenir shop" may be considered to visit the identical course in some cases. How to define the course may be determined, for example, depending on how much range is allowable for the course information connected as the same course from a viewpoint of the user who browses the course information.

(Course Information Generation Unit)

The course information generation unit 120 generates the course information on the course on the basis of user behavior information generated from the behavior of the user visiting the relevant course set by the course setting unit 110. The user behavior information is information such as the photograph or comment uploaded by the user which is received, for example, by the reception unit 142 from the terminal device 200 along with the positional information. The course information generation unit 120, in associating the user behavior information like this with the course, refers the place the user has visited which is identified by the place identification unit 140. If the place the user has visited is contained in the course, the user behavior information such as the photograph or comment generated at the place is associated with the place. As a result, the course information generation unit 120 generates the course information presenting the user behavior information such as photograph or comment provided by the user in association with the place in the course where the relevant user behavior information is generated. Further, the course information generation unit 120 may acquire information on a moving route of the user which is identified by the route identification unit 150 on the basis of the positional information provided from the reception unit 142, and generate the course information presenting the place the user has visited on the moving route of the user. In this way, for example, as the course information screen in the above first to third embodiments, generated is the course information capable of displaying an experience of the user having visited a certain course by way of the course map, the travel report or the like. The course information generation unit 120 may store the generated course information in the course information DB 122.

(Course Information Provision Unit)

The course information provision unit 130 provides the course information generated by the course information generation unit 120 to the user. The course information provision unit 130, for example, reads out the course information from the course information DB 122 to transmit the course information via the transmission unit 132 to the terminal device 200. Here, the user provided with the course information by the course information provision unit 130 (that is, the user of the terminal device 200*b*) may be different from the user who has provided the user behavior information used for generating the course information by the course information generation unit 120 (that is, the user of the terminal device 200*a*). The function of the course information provision unit 130 like this may supply the course information between the different users. The course information provision unit 130 extracts the course information from the course information DB 122 under a condition which is, for example, set as an initial condition or set by the user operation input to the terminal device 200*b*, to provide to the terminal device 200*b*. The condition set here may be, for example, the "recommended course" or "popular course" as shown in the above first and second embodiments, and may be a condition such as the region or keyword input by the user. Alternatively, the course information provision unit 130 may acquire the information on one or more places specified by user from the terminal device 200*b*, and extract the course information connected to the course containing that place by referring, for example, the course DB 112 and the course information DB 122 in combination.

(Place Identification Unit)

The place identification unit 140 identifies the place the user has visited (or is visiting). The place identification unit 140 may utilize, for example, the above journey division technology to distinguish between the staying period and the moving period on the basis of the user moving speed and identify a user location in the staying period as the place the user has visited. In this case, the place identification unit 140 acquires the user positional information from the reception unit 142. Alternatively, the place identification unit 140 may identify the user locations each at the time when the information such as the photograph or comment is uploaded from the user as the place the user has visited. In this case, the place identification unit 140 acquires from the reception unit 142 the user positional information and the time stamp of the information uploaded by the user. Alternatively, in a case where the uploaded information is already associated with the positional information, the place identification unit 140 may identify the place the user has visited from the associated positional information. The information uploaded by the user may be, for example, information transmitted for the purpose of registering the user location as the information transmitted in the check-in operation in the above third embodiment. The place identification unit 140 may provide the information on the identified place to the course setting unit 110 (e.g., in a case where a new course is set on the basis of the place the user has visited), the course information generation unit 120 (e.g. in a case where the information on the place the user actually has visited is added to the course information generated for the existing course), or the course information update unit 160 described later.

In the case of utilizing the above journey division technology, the place identification unit 140 first calculates the moving speed of the user on the basis of the user positional information history received by the reception unit 142 from the terminal device 200*a*. Here, the place identification unit 140 may smooth the moving speed calculated for each point whose positional information is provided by use of the curve approximation, low-pass filter or the like. The place identification unit 140 may apply the above positional noise removal process to the positional information history in calculating the moving speed. The operation of the place identification unit 140 when the positional noise removal process is applied is similar to an operation of the route identification unit 150, and a detailed description thereof is omitted.

Next, the place identification unit 140 distinguishes between the staying period and the moving period of the user on the basis of the moving speed. More specifically, for example, the place identification unit 140 compares the calculated moving speed with a predetermined threshold to distinguish a period having the moving speed larger than the threshold as the moving period and distinguish a period having the moving speed smaller than the threshold as the staying period. The place identification unit 140 may set a margin value having a predetermined range for the threshold, and in a case where the local maximum value or local minimum value of the moving speed in the moving period or staying period does not exceed the margin value, combine the moving period or staying period with a moving period or staying period previous or next thereto.

Here, as described above, in a case where the moving period and staying period continue in which the local maximum value or local minimum value does not exceed the margin value, the place identification unit 140 treats these periods as a series of periods to combine with a moving period or staying period previous or next thereto. The place identification unit 140 may combine a moving period or staying period to be combined with either of the previous or next moving period or staying period which has larger difference than the other between the local maximum value or local minimum value of the moving speed in the relevant moving period or staying period and the threshold of the moving speed. Further, the threshold of the moving speed used for the above distinguish may be set on the basis of the frequency of staying and frequency of moving for each moving speed in the user providing the positional information history or the average behavior recognition result for other users.

(Route Identification Unit)

The route identification unit 150 identifies the moving route of the user. The route identification unit 150 may, for example, trace the point indicated by the user positional information history to identify the moving route of the user. In this case, the route identification unit 150 may acquire the user positional information from the reception unit 142 to perform the above positional noise removal process, and then, identify the moving route from the user positional information history. Alternatively, the route identification unit 150 may automatically estimate from map information or the like a pathway connecting the user locations each at the time when the information such as the photograph or comment is uploaded from the user to identify the moving route of the user. In this case, the route identification unit 150 acquires from reception unit 142 the user positional information and the time stamp of the information uploaded by the user. Alternatively, in a case where the uploaded information is already associated with the positional information, the route identification unit 150 may use the associated positional information. The information uploaded by the user may be, for example, information transmitted for the purpose of registering the user location as the information transmitted in the check-in operation in the above third embodiment. The route identification unit 150 may provide the information on the identified moving route to the course information generation unit 120 (the moving route of the user may be provided as the course information), or the course information update unit 160 described later.

In a case where the above positional noise removal process is used, the route identification unit 150 first calculates the moving acceleration of the user on the basis of the user positional information history received by the reception unit 142 from the terminal device 200*a*. Next, the route identification unit 150 compares the calculated moving acceleration with a predetermined threshold (positive and negative), and perform a further determination if the moving acceleration exceeds the predetermined threshold. In this determination, if the moving acceleration is larger than the positive threshold, the route identification unit 150 removes the data of the point for which the relevant acceleration is recorded as the noise data from the positional information history. On the other hand, if the moving acceleration is smaller than the negative threshold, the route identification unit 150 refers the moving distance history of the last three sections having as the latest one a section toward the point for which the relevant acceleration is recorded to perform a further determination. In this determination, the route identification unit 150 removes the data of the point sandwiched by the sections, of three sections, having the moving distance not the smallest (specifically, see FIG. 46 and FIG. 47) as the noise data from the positional information history.

(Course Information Update Unit)

The course information update unit 160 updates the course information generated by the course information generation unit 120 on the basis of the user behavior information generated from the behavior of the user (other user than the user providing the user behavior information when the course information is generated). The user behavior information is similar to, for example, the user behavior information acquired by the course information generation unit 120, and is the information such as the photograph or comment uploaded by the user which is received by the reception unit 142 from the terminal device 200 together with the positional information. The course information update unit 160, for example, in a case where the place the user having visited identified by the place identification unit 140 on the basis of the received positional information above is contained in the course corresponding to the course information stored in the course information DB 122, additionally makes the user behavior information such as the photograph or comment provided by the user correspond to a place in the course for which the relevant user behavior information is generated to update the course information. Here, if the place the user has visited is not contained in the course, the course information update unit 160 may add a new place to the course information and make the photograph or comment correspond to the added place. The course information update unit 160 may reflect to the course information the user behavior information provided by a second user different from a first user who have provided the user behavior information used when the course information generation unit 120 generates the course information, for example.

Whether the user behavior information provided by the second user is provided to the course information update unit 160 to update the existing course information, or whether the same is provided to the course information generation unit 120 to generate new course information, for example, may be determined depending on properties of the course information, for example. As the above third embodiment, in a case where the users visiting the course have a common purpose, the course information interesting for the user may be generated rather by updating the course information to reflect behaviors taken by various users in the course. Alternatively, as a part of the course shown in the above first and second embodiments, in a case the purpose of the user visiting the course is various, or an experience at the place in the course is varied depending on the season, the course information suitable to various tastes or situations of the user is preferably generated rather by separately generating new course information according to deference in the place or time of the visiting.

(Reception Unit/Transmission Unit)

In the server 100, the reception unit 142 receives the positional information and the updated information from the terminal device 200 and the transmission unit 132 the course information to the terminal device 200. The above description describes assuming that the terminal device 200 transmitting the information to server 100 is the terminal device 200a, and the terminal device 200 receiving the course information from the server 100 is the terminal device 200b in some cases, but as described above, the terminal device 200a is compatible with the terminal device 200b. In other words, as shown in the figure, there may be the terminal device 200a transmitting the information mostly to the reception unit 142, or the terminal device 200b receiving the course information mostly from the transmission unit 132, and there may be the terminal device 200a/200b receiving the course information from the transmission unit 132 as well as transmitting the information the reception unit 142.

5. Hardware Configuration

A hardware configuration of the information processing apparatus according to the embodiment of the present disclosure will be described with reference to FIG. 49. FIG. 49 is a block diagram for explaining a hardware configuration of the information processing apparatus. The illustrated information processing apparatus 900 may be implemented as a server device including the server 20 and the terminal device in the embodiments described above, for example.

The information processing apparatus 900 includes a CPU (Central Processing Unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. Further, the information processing apparatus 900 may include an imaging device 933 and a sensor 935 as necessary. The information processing apparatus 900 may include a processing circuit such as a DSP (Digital Signal Processor), alternatively or in addition to the CPU 901.

The CPU 901 serves as an operation processor and a controller, and controls all or some operations in the information processing apparatus 900 in accordance with various programs recorded in the ROM 903, the RAM 905, the storage device 919 or a removable recording medium 927. The ROM 903 stores programs and operation parameters which are used by the CPU 901. The RAM 905 primarily stores program which are used in the execution of the CPU 901 and parameters which is appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 may be a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing apparatus 900. Furthermore, the input device 915 includes an input control circuit which generates an input signal on the basis of the information which is input by a user and outputs the input signal to the CPU 901. By operating the input device 915, a user can input various types of data to the information processing apparatus 900 or issue instructions for causing the information processing apparatus 900 to perform a processing operation.

The output device 917 includes a device capable of visually or audibly notifying the user of acquired information. The output device 917 may include a display device such as LCD (Liquid Crystal Display), PDP (Plasma Display Panel), and organic EL (Electro-Luminescence) displays, an audio output device such as speaker and headphone, and a peripheral device such as printer. The output device 917 may output the results obtained from the process of the information processing apparatus 900 in a form of a video such as text or image, and an audio such as voice or sound.

The storage device 919 is a device for data storage which is configured as an example of a storage unit of the information processing apparatus 900. The storage device 919 includes, for example, a magnetic storage device such as HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing apparatus 900 or attached externally thereto. The drive 921 reads information recorded in the removable recording medium 927 attached thereto, and outputs the read information to the RAM 905. Further, the drive 921 can write in the removable recording medium 927 attached thereto.

The connection port 923 is a port used to directly connect devices to the information processing apparatus 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing apparatus 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, a sound sensor, or an atmospheric pressure, for example. The sensor 935 acquires information regarding the state of the information processing apparatus 900, such as the orientation of the case of the information processing apparatus 900, as well as information regarding the environment surrounding the information processing apparatus 900, such as the brightness or noise surrounding the information processing apparatus 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing apparatus 900. Each of the above components may be realized using general-purpose members, but may also be realized in hardware specialized in the function of each component. Such a configuration may also be modified as appropriate according to the technological level at the time of the implementation.

5. Supplemental Remarks

Embodiments of the present disclosure encompass an information processing apparatus and system as described in the foregoing, an information processing method executed by an information processing apparatus or system, a program for causing an information processing apparatus to function, and a non-transitory tangible medium storing such a program, for example.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An information processing apparatus including:

a course setting unit that sets a course containing at least one place associated with positional information;

a course information generation unit that generates first course information regarding the course on the basis of first user behavior information generated from a behavior of a first user having visited the course; and a course information provision unit that provides the first course information to a second user different from the first user.

(2)

The information processing apparatus according to (1), further including:

a place identification unit that identifies the place the first user has visited, wherein the course information generation unit generates the first course information which displays, in association with the place, the first user behavior information generated at the place in a case where the place the first user has visited is contained in the course.

(3)

The information processing apparatus according to (2), wherein the place identification unit further identifies the place the second user has visited, and the information processing apparatus further includes a course information update unit that updates the first course information by additionally associating second user behavior information generated from a behavior of the second user at the place with the place in a case where the place the second user has visited is contained in the course.

(4)

The information processing apparatus according to (3), wherein the course information update unit updates the first course information by adding a new place to the first course information and associating the second user behavior information with the place in a case where the place the second user has visited is not contained in the course.

(5)

The information processing apparatus according to (4), wherein the course information update unit adds a new place to the first course information and also adds the place to the course.

(6)

The information processing apparatus according to any one of (2) to (5), wherein the course setting unit sets the course containing the place the first user has visited.

(7)

The information processing apparatus according to (2), wherein the place identification unit further identifies a place the second user has visited, and in a case where the place the second user has visited is contained in the course, the course information generation unit generates second course information regarding the course, the second course information displaying, in association with the place, second user behavior information generated from a behavior of the second user at the place.

(8)

The information processing apparatus according to any one of (2) to (7), wherein the place identification unit calculates a moving speed of the first user on the basis of a history of positional information of the first user, distinguishes between a staying period and a moving period of the first user on the basis of the moving speed, and identifies a location of the first user in the staying period as the place the first user has visited.

(9)

The information processing apparatus according to (8), wherein the place identification unit distinguishes a period in which the moving speed is smaller than a first threshold as the staying period and distinguishes a period in which the moving speed is larger than the first threshold as the moving period.

(10)

The information processing apparatus according to (9), wherein in a case where a difference between the first threshold and a local maximum value or a local minimum value of the moving speed in a first staying period or a first moving period is smaller than or equal to a predetermined value, the place identification unit combines the first staying period or the first moving period with a second staying period or a second moving period before or after the first staying period or the first moving period.

(11)

The information processing apparatus according to (10), wherein the place identification unit combines the first staying period or the first moving period with one of the second staying period and the second moving period which has a larger difference between the first threshold and the local maximum value or the local minimum value of the moving speed in the period than the other has.

(12)

The information processing apparatus according to (11), wherein the first threshold is set on the basis of a frequency of staying and a frequency of moving for each moving speed in a behavior recognition result for the first user or a behavior recognition result for an average user.

(13)

The information processing apparatus according to any one of (8) to (12), wherein the place identification unit calculates a moving acceleration of the first user on the basis of the history of the positional information, removes noise data from the history of the positional information on the basis of the moving acceleration, and then, calculates the moving speed of the first user on the basis of the history of the positional information.

(14)

The information processing apparatus according to any one of (2) to (13), further including:

a route identification unit that identifies a moving route of the first user, wherein the course information generation unit generates the first course information which displays, on the moving route, the place the first user has visited.

(15)

The information processing apparatus according to (14), wherein the route identification unit calculates a moving acceleration of the first user on the basis of a history of the positional information, removes noise data from the history of the positional information on the basis of the moving acceleration, and then, traces the history of the positional information to identify the moving route.

(16)

The information processing apparatus according to (15), wherein in a case where the moving acceleration when the first user moves from a first point to a second point is larger than a positive threshold, the route identification unit removes data corresponding to the second point as the noise data.

(17)

The information processing apparatus according to (15) or (16), wherein in a case where the moving acceleration when the first user moves from a first point to a second point is smaller than a negative threshold, the route identification unit refers to a history of a moving distance of the last three sections having, as the latest section, a section from the first point to the second point, and removes, as the noise data, data corresponding to a point sandwiched by sections of the last three sections the moving distance of which is not the smallest.

(18)

An information processing method including:

setting a course containing at least one place associated with positional information;

generating first course information regarding the course on the basis of first user behavior information generated from a behavior of a first user having visited the course; and providing the first course information to a second user different from the first user.

(19)

A program causing a computer to execute:

a function of setting a course containing at least one place associated with positional information;

a function of generating first course information regarding the course on the basis of first user behavior information generated from a behavior of a first user having visited the course; and a function of providing the first course information to a second user different from the first user.

REFERENCE SIGNS LIST 10 system
100 server
110 course setting unit
120 course information generation unit
130 course information provision unit
132 transmission unit
140 place identification unit
142 reception unit
150 route identification unit
160 course information update unit
200 terminal device

The invention claimed is:

1. An information processing apparatus comprising:
    circuitry configured to
        set a course containing at least one place associated with positional information,
        generate first course information regarding the course on the basis of first user behavior information generated from a behavior of a first user having visited the course, calculate a moving speed of the first user on the basis of a history of positional information of the first user,
distinguish between a staying period and a moving period of the first user on the basis of the moving speed,
identify a location of the first user in the staving period as a place the first user has visited, and
provide the first course information to a second user different from the first user.

2. The information processing apparatus according to claim 1, wherein the circuitry is configured to
generate the first course information which displays, in association with the place, the first user behavior information generated at the place when the place the first user has visited is contained in the course.

3. The information processing apparatus according to claim 2, wherein the circuitry is configured to
further identify a place the second user has visited, and
update the first course information by additionally associating, with the place, second user behavior information generated from a behavior of the second user at the place when the place the second user has visited is contained in the course.

4. The information processing apparatus according to claim 3, wherein
the circuitry is configured to update the first course information by adding a new place to the first course information and associating the second user behavior information with the place when the place the second user has visited is not contained in the course.

5. The information processing apparatus according to claim 4, wherein
the circuitry is configured to add a new place to the first course information and also add the place to the course.

6. The information processing apparatus according to claim 2, wherein
the circuitry is configured to set the course containing the place the first user has visited.

7. The information processing apparatus according to claim 2, wherein the circuitry is configured to
further identify a place the second user has visited, and
when the place the second user has visited is contained in the course, generate second course information regarding the course, the second course information displaying, in association with the place, second user behavior information generated from a behavior of the second user at the place.

8. The information processing apparatus according to claim 2, wherein the circuitry is configured to
identify a moving route of the first user, and
generate the first course information which displays, on the moving route, the place the first user has visited.

9. The information processing apparatus according to claim 8, wherein
the circuitry is configured to calculate a moving acceleration of the first user on the basis of a history of the positional information, remove noise data from the history of the positional information on the basis of the moving acceleration, and then, trace the history of the positional information to identify the moving route.

10. The information processing apparatus according to claim 9, wherein
when the moving acceleration when the first user moves from a first point to a second point is larger than a positive threshold, the circuitry is configured to remove data corresponding to the second point as the noise data.

11. The information processing apparatus according to claim 9, wherein
when the moving acceleration when the first user moves from a first point to a second point is smaller than a negative threshold, the circuitry is configured to refer to a history of a moving distance of the last three sections having, as a latest section, a section from the first point to the second point, and remove, as the noise data, data corresponding to a point sandwiched by sections of the last three sections the moving distance of which is not smallest.

12. The information processing apparatus according to claim 1, wherein
the circuitry is configured to distinguish a period in which the moving speed is smaller than a first threshold as the staying period and distinguish a period in which the moving speed is larger than the first threshold as the moving period.

13. The information processing apparatus according to claim 12, wherein
when a difference between the first threshold and a local maximum value or a local minimum value of the moving speed in a first staying period or a first moving period is smaller than or equal to a predetermined value, the circuitry is configured to combine the first staying period or the first moving period with a second staying period or a second moving period before or after the first staying period or the first moving period.

14. The information processing apparatus according to claim 13, wherein
the circuitry is configured to combine the first staying period or the first moving period with one of the second staying period and the second moving period which has a larger difference between the first threshold and the local maximum value or the local minimum value of the moving speed in the period than the other has.

15. The information processing apparatus according to claim 14, wherein
the first threshold is set on the basis of a frequency of staying and a frequency of moving for each moving speed in a behavior recognition result for the first user or a behavior recognition result for an average user.

16. The information processing apparatus according to claim 1, wherein
the circuitry is configured to calculate a moving acceleration of the first user on the basis of the history of the positional information, remove noise data from the history of the positional information on the basis of the moving acceleration, and then, calculate the moving speed of the first user on the basis of the history of the positional information.

17. An information processing method comprising:
setting a course containing at least one place associated with positional information;
generating first course information regarding the course on the basis of first user behavior information generated from a behavior of a first user having visited the course;
calculating a moving speed of the first user on the basis of a history of positional information of the first user;
distinguishing between a staying period and a moving period of the first user on the basis of the moving speed;
identifying a location of the first user in the staying period as a place the first user has visited; and
providing the first course information to a second user different from the first user.

18. A non-transitory computer-readable storage medium including computer executable instructions, wherein the instructions, when executed by a computer, cause the computer to perform a method, the method comprising:

setting a course containing at least one place associated with positional information;

generating first course information regarding the course on the basis of first user behavior information generated from a behavior of a first user having visited the course;

calculating a moving speed of the first user on the basis of a history of positional information of the first user;

distinguishing between a staying period and a moving period of the first user on the basis of the moving speed;

identifying a location of the first user in the staying period as a place the first user has visited; and providing the first course information to a second user different from the first user.

\* \* \* \* \*